United States Patent
Zhou et al.

(10) Patent No.: US 11,622,333 B2
(45) Date of Patent: Apr. 4, 2023

(54) USER EQUIPMENT GROUP SELECTION FOR DIRECT LINK OR SIDELINK PACKET TRANSMISSION IN BROADCAST

(71) Applicant: QUALCOMM Incorporated, San Diego, CA (US)

(72) Inventors: Shanyu Zhou, San Diego, CA (US); Jelena Damnjanovic, Del Mar, CA (US); Arumugam Chendamarai Kannan, San Diego, CA (US); Tao Luo, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 17/379,648

(22) Filed: Jul. 19, 2021

(65) Prior Publication Data

US 2022/0030519 A1    Jan. 27, 2022

Related U.S. Application Data

(60) Provisional application No. 63/067,871, filed on Aug. 19, 2020, provisional application No. 63/067,843,
(Continued)

(51) Int. Cl.
*H04W 52/02* (2009.01)
*H04W 4/02* (2018.01)
(Continued)

(52) U.S. Cl.
CPC ....... *H04W 52/0235* (2013.01); *H04W 4/023* (2013.01); *H04W 24/08* (2013.01); *H04W 72/30* (2023.01); *H04W 72/52* (2023.01)

(58) Field of Classification Search
CPC ............. H04W 24/08; H04W 36/0058; H04W 52/0261; H04W 72/005; H04W 72/0426
(Continued)

(56) References Cited

U.S. PATENT DOCUMENTS 11,357,064 B2 * 6/2022 Pan .......................... H04W 4/40
2008/0247375 A1 * 10/2008 Muharemovic ... H04W 72/0426
370/344
(Continued)

FOREIGN PATENT DOCUMENTS

EP            3675533 B1 * 3/2021 ........ H04W 28/0268
WO   WO-2021087134 A1 * 5/2021 ........... H04L 1/1854
(Continued)

OTHER PUBLICATIONS

Pizzi S, Rinaldi F, Molinaro A, Iera A, Araniti G. Energy-Efficient Multicast Service Delivery Exploiting Single Frequency Device-To-Device Communications in 5G New Radio Systems. Sensors (Basel). Jul. 9, 2018;18(7):2205. doi: 10.3390/s18072205. PMID: 29987221; PMCID: PMC6068625. (Year: 2018).*
(Continued)

*Primary Examiner* — William D Cumming
(74) *Attorney, Agent, or Firm* — Holland & Hart LLP

(57) ABSTRACT

Methods, systems, and devices for wireless communications are described. A base station may identify one or more user equipments (UEs) subscribed to receive broadcast transmissions. The base station may determine a first subset of the UEs is to receive broadcast transmissions via a direct link and a second subset of the UEs is to receive the packets from the broadcast transmission via a sidelink connection based on selection criteria. The base station may transmit an indication that the broadcast transmissions are to be received via either the direct link or sidelink connection to at least one of the first subset of UEs or the second subset of UEs. The
(Continued)

base station may transmit the broadcast transmissions to the first subset of UEs via direct links, and the first subset of UEs may transmit the broadcast transmissions to one or more other UEs via sidelink connections.

30 Claims, 29 Drawing Sheets

Related U.S. Application Data filed on Aug. 19, 2020, provisional application No. 63/067,849, filed on Aug. 19, 2020, provisional application No. 63/067,860, filed on Aug. 19, 2020, provisional application No. 63/060,918, filed on Aug. 4, 2020, provisional application No. 63/054,540, filed on Jul. 21, 2020.

(51) Int. Cl.
*H04W 24/08* (2009.01)
*H04W 72/30* (2023.01)
*H04W 72/52* (2023.01)

(58) Field of Classification Search
USPC .......................................................... 370/344
See application file for complete search history.

(56) References Cited

U.S. PATENT DOCUMENTS

| | | | | |
|---|---|---|---|---|
| 2019/0364492 | A1* | 11/2019 | Azizi | H04W 48/16 |
| 2020/0205209 | A1* | 6/2020 | Pan | H04W 76/14 |
| 2020/0229205 | A1* | 7/2020 | Bharadwaj | H04W 72/02 |
| 2021/0337455 | A1* | 10/2021 | Zhou | H04W 36/0058 |
| 2022/0030519 | A1* | 1/2022 | Zhou | H04W 72/005 |
| 2022/0174690 | A1* | 6/2022 | Wang | H04W 72/1263 |
| 2022/0264677 | A1* | 8/2022 | Pan | H04W 72/005 |

FOREIGN PATENT DOCUMENTS

| | | | | |
|---|---|---|---|---|
| WO | WO-2021163527 | A1 * | 8/2021 | H04W 24/08 |
| WO | WO-2022020298 | A1 * | 1/2022 | H04W 24/08 |

OTHER PUBLICATIONS

G. Nardini, G. Stea, A. Virdis, D. Sabella and M. Caretti, "Broadcasting in LTE-Advanced networks using multihop D2D communications," 2016 IEEE 27th Annual International Symposium on Personal, Indoor, and Mobile Radio Communications (PIMRC), 2016, pp. 1-6, doi: 10.1109/PIMRC.2016.7794788. (Year: 2016).*
Asadi A., et al., "WiFi Direct and LTE D2D in Action", 2013 IFIP Wireless Days (WD), Nov. 1, 2013 (Nov. 1, 2013), 8 pages, XP055186549, DOI: 10.1109/WD.2013.6686520, ISBN: 978-1-47-990543-0, the whole document.
International Search Report and Written Opinion—PCT/US2021/042293—ISA/EPO—dated Oct. 18, 2021 (206402WO).
Kar U.N., et al., "An Overview of Device-to-Device Communication in Cellular Networks", ICT Express, vol. 4, No. 4, Dec. 1, 2018 (Dec. 1, 2018), pp. 203-208, XP055831642, ISSN: 2405-9595, DOI: 10.1016/j.icte.2017.08.002, Retrieved from the Internet: URL: https://www.sciencedirect.com/science/article/pii/S2405959517301467/pdfft?md5=c15bc95c88dd22da76fef3066d80f3a9&pid=1-s2.0-S2405959517301467-main.pdf the whole document.
Lin Z., et al., "Hybrid Architecture Performance Analysis for Device-to-Device Communication in 5G Cellular Network", Mobile Networks and Applications, ACM, New York, NY, US, vol. 20, No. 6, Jan. 29, 2015 (Jan. 29, 2015), pp. 713-724, XP035924153, ISSN: 1383-469X, DOI: 10.1007/S11036-015-0566-7 [retrieved on Jan. 29, 2015], the whole document.
Shrivastava V.K., et al., "Joint Optimization of Energy Efficiency and Scheduling Strategies for Side-Link Relay System," 2017 IEEE Wireless Communications and Networking Conference (WCNC), IEEE, Mar. 19, 2017 (Mar. 19, 2017), 6 pages, XP033095705, DOI: 10.1109/WCNC.2017.7925661 [retrieved on May 10, 2017], the whole document.

* cited by examiner

Broadcast Listening Duration

USER EQUIPMENT GROUP SELECTION FOR DIRECT LINK OR SIDELINK PACKET TRANSMISSION IN BROADCAST

CROSS REFERENCE

The present Application for Patent claims the benefit of U.S. Provisional Patent Application No. 63/054,540 by ZHOU et al., entitled "USER EQUIPMENT GROUP SELECTION FOR DIRECT LINK OR SIDELINK PACKET TRANSMISSION IN BROADCAST," filed Jul. 21, 2020, and the benefit of U.S. Provisional Patent Application No. 63/060,918 by ZHOU et al., entitled "SUBSET UE SELECTION AND SIGNALING IN RATE CONTROL OF BROADCASTING" filed Aug. 4, 2020, and the benefit of U.S. Provisional Patent Application No. 63/067,871 by ZHOU et al., entitled "TECHNIQUES FOR CSI-RS BASED UE SUBSET SELECTION FOR RATE CONTROL IN BROADCASTING WITH SIDELINK" filed Aug. 19, 2020 and the benefit of U.S. Provisional Patent Application No. 63/067,843 by ZHOU et al., entitled "TECHNIQUES FOR UE CAPABILITY-BASED UE SUBSET SELECTION FOR RATE CONTROL IN BROADCASTING WITH SIDELINK" filed Aug. 19, 2020, and the benefit of U.S. Provisional Patent Application No. 63/067,849 by ZHOU et al., entitled "TECHNIQUES FOR CLUSTER-BASED UE SUBSET SELECTION FOR RATE CONTROL IN BROADCASTING WITH SIDELINK" filed Aug. 19, 2020, and the benefit of U.S. Provisional Patent Application No. 63/067,860 by ZHOU et al., entitled "TECHNIQUES FOR TRAFFIC LOAD-BASED UE SUBSET SELECTION FOR RATE CONTROL IN BROADCASTING WITH SIDELINK" filed Aug. 19, 2020, each of which is assigned to the assignee hereof, and is expressly incorporated by reference herein.

FIELD OF TECHNOLOGY

The following relates to wireless communications, including user equipment (UE) group selection for direct link or sidelink packet transmission in broadcast.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support user equipment (UE) group selection for direct link or sidelink packet transmission in broadcast. Generally, the described techniques provide for a base station to divide a plurality of UEs into a subset of UEs that receive broadcast transmissions via a direct link and a subset of UEs that receive the packets from the broadcasted transmissions from other UEs via a sidelink connection (e.g., via a unicast, groupcast, or broadcast message over the sidelink connection). In some cases, the base station may divide the UEs based on selection criteria. For example, the base station may divide the UEs based on a report from each UE including a modulation and coding scheme (MCS) value, a capability report from each UE including a power capability, balancing the traffic load among UEs on sidelink connections, a distance between each UE and the base station, clusters of UEs, or a combination of factors. In some cases, the base station may transmit an indication to UEs selected for receiving the broadcast transmissions via a direct link. The UEs may prepare to receive the broadcast transmissions from direct links based on the indication, and the base station may send the broadcast transmissions to the UEs via the direct links. Additionally or alternatively, the base station may transmit an indication to UEs selected for receiving the packets from the broadcasted transmissions from other UEs via a sidelink connection. The UEs may ignore data transmitted on the direct links based on the indication and may prepare to receive the packets from the broadcast transmissions via sidelink connections. In some cases, the UEs that receive the broadcast transmissions via the direct links may transmit the packets from the broadcast transmissions to one or more other UEs via one or more sidelink connections.

A method of wireless communications at a base station is described. The method may include identifying a set of UEs subscribed to receive broadcast transmissions from the base station, determining, based on a selection criteria, that a first subset of UEs of the set of UEs is to receive the broadcast transmissions via direct link communications from the base station and that a second subset of UEs of the set of UEs is to receive the broadcast transmissions via sidelink communications from the first subset of UEs, transmitting, to at least one of the first subset of UEs or the second subset of UEs, an indication that the broadcast transmissions are to be received via either the direct link communications or the sidelink communications, and transmitting the broadcast transmissions to the first subset of UEs.

An apparatus for wireless communications at a base station is described. The apparatus may include a processor, memory coupled with the processor, and instructions stored in the memory. The instructions may be executable by the processor to cause the apparatus to identify a set of UEs subscribed to receive broadcast transmissions from the base station, determine, based on a selection criteria, that a first subset of UEs of the set of UEs is to receive the broadcast transmissions via direct link communications from the base station and that a second subset of UEs of the set of UEs is to receive the broadcast transmissions via sidelink communications from the first subset of UEs, transmit, to at least one of the first subset of UEs or the second subset of UEs, an indication that the broadcast transmissions are to be received via either the direct link communications or the sidelink communications, and transmit the broadcast transmissions to the first subset of UEs.

Another apparatus for wireless communications at a base station is described. The apparatus may include means for identifying a set of UEs subscribed to receive broadcast transmissions from the base station, determining, based on a selection criteria, that a first subset of UEs of the set of UEs is to receive the broadcast transmissions via direct link communications from the base station and that a second subset of UEs of the set of UEs is to receive the broadcast transmissions via sidelink communications from the first subset of UEs, transmitting, to at least one of the first subset of UEs or the second subset of UEs, an indication that the broadcast transmissions are to be received via either the direct link communications or the sidelink communications, and transmitting the broadcast transmissions to the first subset of UEs.

A non-transitory computer-readable medium storing code for wireless communications at a base station is described. The code may include instructions executable by a processor to identify a set of UEs subscribed to receive broadcast transmissions from the base station, determine, based on a selection criteria, that a first subset of UEs of the set of UEs is to receive the broadcast transmissions via direct link communications from the base station and that a second subset of UEs of the set of UEs is to receive the broadcast transmissions via sidelink communications from the first subset of UEs, transmit, to at least one of the first subset of UEs or the second subset of UEs, an indication that the broadcast transmissions are to be received via either the direct link communications or the sidelink communications, and transmit the broadcast transmissions to the first subset of UEs.

Some examples of the method, apparatuses, and non-transitory computer-readable medium described herein may further include operations, features, means, or instructions for receiving, from each UE of the set of UEs, a report including a maximum MCS for communicating between the base station and respective UEs, and selecting, for the first subset of UEs, a minimum MCS from among the maximum MCSs of each of the first subset of UEs.

Some examples of the method, apparatuses, and non-transitory computer-readable medium described herein may further include operations, features, means, or instructions for determining the first subset of UEs based on the maximum MCS associated with each of the first subset of UEs, where the selection criteria includes a threshold MCS.

In some examples of the method, apparatuses, and non-transitory computer-readable medium described herein, determining the first subset of UEs further may include operations, features, means, or instructions for determining that a distance between each UE in the first subset of UEs and the base station satisfies a threshold distance, where the selection criteria includes the threshold distance.

In some examples of the method, apparatuses, and non-transitory computer-readable medium described herein, determining the first subset of UEs further may include operations, features, means, or instructions for determining a set of clusters of UEs of the set of UEs, and determining that a first UE of each cluster of UEs may be included within the first subset of UEs, while a remainder of UEs within each cluster of UEs may be included within the second subset of UEs.

In some examples of the method, apparatuses, and non-transitory computer-readable medium described herein, the set of clusters of UEs may be determined based on a location of each UE of the set of UEs, and where the first UE of each cluster of UEs may be a central UE to each cluster of UEs.

In some examples of the method, apparatuses, and non-transitory computer-readable medium described herein, the set of clusters of UEs may be determined based on a signal quality measured at each UE of the set of UEs, and where the first UE of each cluster of UEs may have a signal quality better than an average signal quality determined based on the signal quality measured at each UE of the set of UEs.

Some examples of the method, apparatuses, and non-transitory computer-readable medium described herein may further include operations, features, means, or instructions for receiving, from each UE of the set of UEs, a message including a power capability associated with the UE, where the power capability includes a data rate, a processing power, a full duplex power, a half duplex power, a time division duplex power, a frequency division duplex power, or a combination thereof.

In some examples of the method, apparatuses, and non-transitory computer-readable medium described herein, determining the first subset of UEs further may include operations, features, means, or instructions for determining that the power capability for each UE in the first subset of UEs satisfies a threshold power capability, where the selection criteria includes the threshold power capability.

Some examples of the method, apparatuses, and non-transitory computer-readable medium described herein may further include operations, features, means, or instructions for determining a traffic load for each UE of the set of UEs.

In some examples of the method, apparatuses, and non-transitory computer-readable medium described herein, determining the first subset of UEs further may include operations, features, means, or instructions for determining that the traffic load for each UE of the first subset of UEs satisfies a threshold traffic load, where the selection criteria includes the threshold traffic load.

In some examples of the method, apparatuses, and non-transitory computer-readable medium described herein, the selection criteria includes a threshold MCS, a threshold distance, a threshold relative location, a threshold power capability, a threshold traffic load, or a combination thereof.

In some examples of the method, apparatuses, and non-transitory computer-readable medium described herein, transmitting the indication further may include operations, features, means, or instructions for transmitting, to at least one of the first subset of UEs or the second subset of UEs, control information via a medium access control-control element (MAC-CE), downlink control information (DCI), a wakeup signal (WUS), or a combination thereof, the control information corresponding to the broadcast transmissions.

A method of wireless communications at a UE is described. The method may include subscribing, to a base station, to receive broadcast transmissions from the base station, receiving, from the base station, an indication that the broadcast transmissions are to be received via either direct link communications from the base station or via sidelink communications from a first subset of UEs receiving the broadcast transmissions via the direct link communications from the base station, and receiving the broadcast transmissions in accordance with the indication or an opportunistic reception mode.

An apparatus for wireless communications at a UE is described. The apparatus may include a processor, memory coupled with the processor, and instructions stored in the memory. The instructions may be executable by the processor to cause the apparatus to subscribe, to a base station, to receive broadcast transmissions from the base station, receive, from the base station, an indication that the broadcast transmissions are to be received via either direct link communications from the base station or via sidelink communications from a first subset of UEs receiving the broadcast transmissions via the direct link communications from the base station, and receive the broadcast transmissions in accordance with the indication or an opportunistic reception mode.

Another apparatus for wireless communications at a UE is described. The apparatus may include means for subscribing, to a base station, to receive broadcast transmissions from the base station, receiving, from the base station, an indication that the broadcast transmissions are to be received via either direct link communications from the base station or via sidelink communications from a first subset of UEs receiving the broadcast transmissions via the direct link communications from the base station, and receiving the broadcast transmissions in accordance with the indication or an opportunistic reception mode.

A non-transitory computer-readable medium storing code for wireless communications at a UE is described. The code may include instructions executable by a processor to subscribe, to a base station, to receive broadcast transmissions from the base station, receive, from the base station, an indication that the broadcast transmissions are to be received via either direct link communications from the base station or via sidelink communications from a first subset of UEs receiving the broadcast transmissions via the direct link communications from the base station, and receive the broadcast transmissions in accordance with the indication or an opportunistic reception mode.

Some examples of the method, apparatuses, and non-transitory computer-readable medium described herein may further include operations, features, means, or instructions for receiving, from the base station, the broadcast transmissions via the direct link communications based on the indication.

Some examples of the method, apparatuses, and non-transitory computer-readable medium described herein may further include operations, features, means, or instructions for transmitting, to one or more UEs, the broadcast transmissions via the sidelink communications using a unicast transmission technique, a groupcast transmission technique, a broadcast transmission technique, or a combination.

Some examples of the method, apparatuses, and non-transitory computer-readable medium described herein may further include operations, features, means, or instructions for receiving, from a UE in the first subset of UEs, the broadcast transmissions via the sidelink communications.

Some examples of the method, apparatuses, and non-transitory computer-readable medium described herein may further include operations, features, means, or instructions for transmitting, to the base station, a report including a maximum MCS for communicating between the base station and the UE.

Some examples of the method, apparatuses, and non-transitory computer-readable medium described herein may further include operations, features, means, or instructions for receiving the broadcast transmissions based on the reported MCS.

Some examples of the method, apparatuses, and non-transitory computer-readable medium described herein may further include operations, features, means, or instructions for transmitting, to the base station, a message including a power capability associated with the UE, where the power capability includes a data rate, a processing power, a full duplex power, a half duplex power, a time division duplex power, a frequency division duplex power, or a combination thereof.

In some examples of the method, apparatuses, and non-transitory computer-readable medium described herein, receiving the indication further may include operations, features, means, or instructions for receiving, from the base station, control information via a MAC-CE, DCI, a WUS, or a combination thereof, the control information corresponding to the broadcast transmissions.

DETAILED DESCRIPTION

Figure 1:
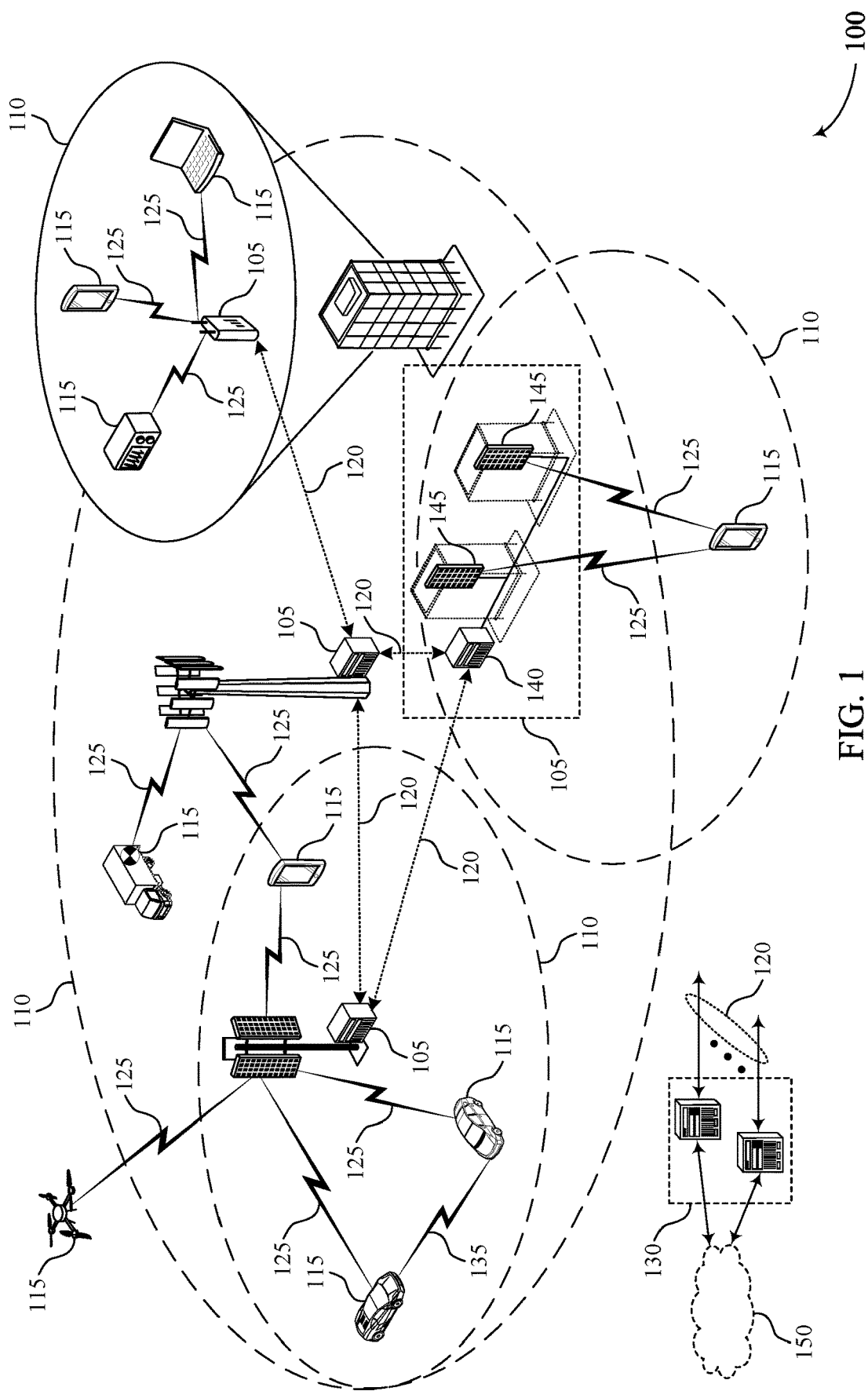
FIGS. 1 through 4 illustrate examples of wireless communications systems that support user equipment (UE) group selection for direct link or sidelink packet transmission in broadcast in accordance with aspects of the present disclosure.

In some cases, UEs may transmit and receive communications as scheduled by a base station. The UEs may communicate with the base station via direct links and other UEs via sidelink connections. The base station may send broadcast transmissions to the UEs via the direct links. In some cases, the base station may perform rate control for direct links (e.g., when transmitting or retransmitting the broadcast transmissions). For example, the base station may select a modulation and coding scheme (MCS) for the broadcast transmissions based on reports from the UEs regardless of the type of communication link. In some cases, the base station may select an MCS value that satisfies a percentile of the reporting UEs, based on the reports. However, in selecting an MCS value for a broadcast, there may be a tradeoff between coverage and data rate. For example, a lower MCS value may improve coverage (e.g., due to increased redundancy in the packet transmission) but may reduce the data rate, while a higher MCS value may reduce coverage but may improve the data rate. Thus, if the base station 105 considers MCS values from each UE in the coverage area in selection of the MCS value for the broadcast communication, then either the data rate may be slower than preferred, or the coverage may be less than desired.

Additionally, in a broadcast system, some UEs that receive a broadcast transmission from a base station via direct link may also be configured to retransmit the packets from the broadcast transmission to other UEs via a sidelink connection. Thus, some UEs may receive the packets from the broadcast transmission as a sidelink communication from another UE. UEs that are less able to communicate directly with the base station may be more likely to receive packets from a broadcast transmission via sidelink only. Nevertheless, these sidelink-only UEs may still report a preferred MCS value to the base station, and the preferred MCS value may be lower than those reported by UEs more able to communicate with the base station. In determining an MCS value for use in broadcast transmissions, the base station may consider the reported MCS values from all of the subscribed UEs within a coverage area. However, the consideration of UEs which just receive the broadcast transmissions via sidelink may skew the MCS pool considered by the base station. As a result, the base station may select a relatively low MCS value, which may cause unnecessary duplication of packets and inefficient communications (e.g., increased latency).

As described herein, a base station may divide a plurality of UEs into a subset of UEs receiving the broadcast transmissions via a direct link and a subset of UEs receiving the packets from the broadcast transmissions via a sidelink connection. In some cases, the base station may divide the UEs based on selection criteria. For example, the base station may divide the UEs based on a report from each UE including an MCS value (e.g., a channel state information (CSI) report), a capability report from each UE including a power capability, balancing the traffic load among UEs on sidelink connections, a distance between each UE and the base station, clusters of UEs, or a combination of the same. In some cases, the base station may transmit an indication to UEs selected for receiving the broadcast transmissions via a direct link. The UEs may prepare to receive the broadcast transmissions from direct links based on the indication, and the base station may send the broadcast transmissions to the UEs via the direct links. Additionally or alternatively, the base station may transmit an indication to UEs selected for receiving the packets from the broadcast transmission from other UEs via a sidelink connection. The UEs may ignore data transmitted on the direct links based on the indication and may prepare to receive the packets from the broadcast transmissions via sidelink connections. In some cases, the UEs that receive the broadcast transmissions via the direct links may transmit the packets from the broadcast transmissions to one or more other UEs via one or more sidelink connections.

Aspects of the disclosure are initially described in the context of wireless communications systems. Additional aspects of the disclosure are described with reference to a process flow. Aspects of the disclosure are further illustrated by and described with reference to apparatus diagrams, system diagrams, and flowcharts that relate to UE group selection for direct link or sidelink packet transmission in broadcast.

FIG. 1 illustrates an example of a wireless communications system 100 that supports UE group selection for direct link or sidelink packet transmission in broadcast in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multi-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, UEs 115 may transmit and receive communications as scheduled by a network entity, such as a base station 105, a network node, a transmitter, or the like. In some cases, the UEs 115 may communicate with the base station 105 via direct links, which may be examples of communication links 125. Additionally, the UEs 115 may communicate directly with one another via sidelink connections without transmitting through the base station 105. In some cases, the wireless communications system 100 may support broadcasting transmissions (e.g., including packets) by the base station 105 to the UEs 115 via the direct links. In some cases, the base station 105 may perform rate control for direct links (e.g., when transmitting or retransmitting the broadcast transmissions). For example, the base station 105 may select an MCS for the broadcast transmissions based on reports from UEs 115 in a coverage area 110 of the base station 105 regardless of the type of communication link. In some cases, the base station 105 may select a minimum MCS value or an MCS value as a percentile based on the reports. However, there may be a tradeoff between coverage and data rate by selecting the minimum MCS value from the MCS pool or selecting the MCS value as a percentile. For example, a lower MCS value may improve coverage (e.g., due to increased redundancy in the packet transmission) but may reduce the data rate, while a higher MCS value may reduce coverage but may improve the data rate. Thus, if the base station 105 considers MCS values from each UE 115 in the coverage area to select the MCS value for communication via direct links without using sidelink connections, the base station 105 may select a relatively low MCS value, which may cause unnecessary duplication of packets and inefficient communications (e.g., increased latency).

As described herein, wireless communications system 100 may support the use of techniques in which a base station 105 divides a plurality of UEs 115 in a coverage area 110 into a subset of UEs 115 receiving the broadcast transmissions via a direct link and a subset of UEs 115 receiving the packets from the broadcast transmissions via a sidelink connection. In some cases, the base station 105 may divide the UEs 115 based on selection criteria. For example, the base station 105 may divide the UEs 115 based on a report from each UE 115 including an MCS value (e.g., a CSI report), a capability report from each UE 115 including a power capability, balancing the traffic load among UEs 115 on sidelink connections, a distance between each UE 115 and the base station 105, clusters of UEs 115, or a combination of the same.

In some cases, the base station 105 may transmit control information including an indication of the subset to one or more of the UEs 115. For example, the base station 105 may transmit the indication to UEs 115 selected for receiving the broadcast transmissions via a direct link. The UEs 115 may prepare to receive the broadcast transmissions from direct links based on the indication, and the base station 105 may send the broadcast transmissions to the UEs 115 via the direct links. Additionally or alternatively, the base station 105 may transmit the indication to UEs 115 selected for receiving the packets from the broadcast transmission from other UEs via a sidelink connection. The UEs 115 may ignore data transmitted on the direct links based on the indication and may prepare to receive the packets from the broadcast transmissions via sidelink connections. In some cases, the UEs 115 that receive the broadcast transmissions via the direct links may transmit the packets from the broadcast transmissions to one or more other UEs 115 via one or more sidelink connections. In some cases, the base station 105 may select an MCS value for the broadcast transmissions via the direct links based on the MCS values of the subset of UEs 115 that are to receive the broadcast transmissions via the direct links.

Figure 2:
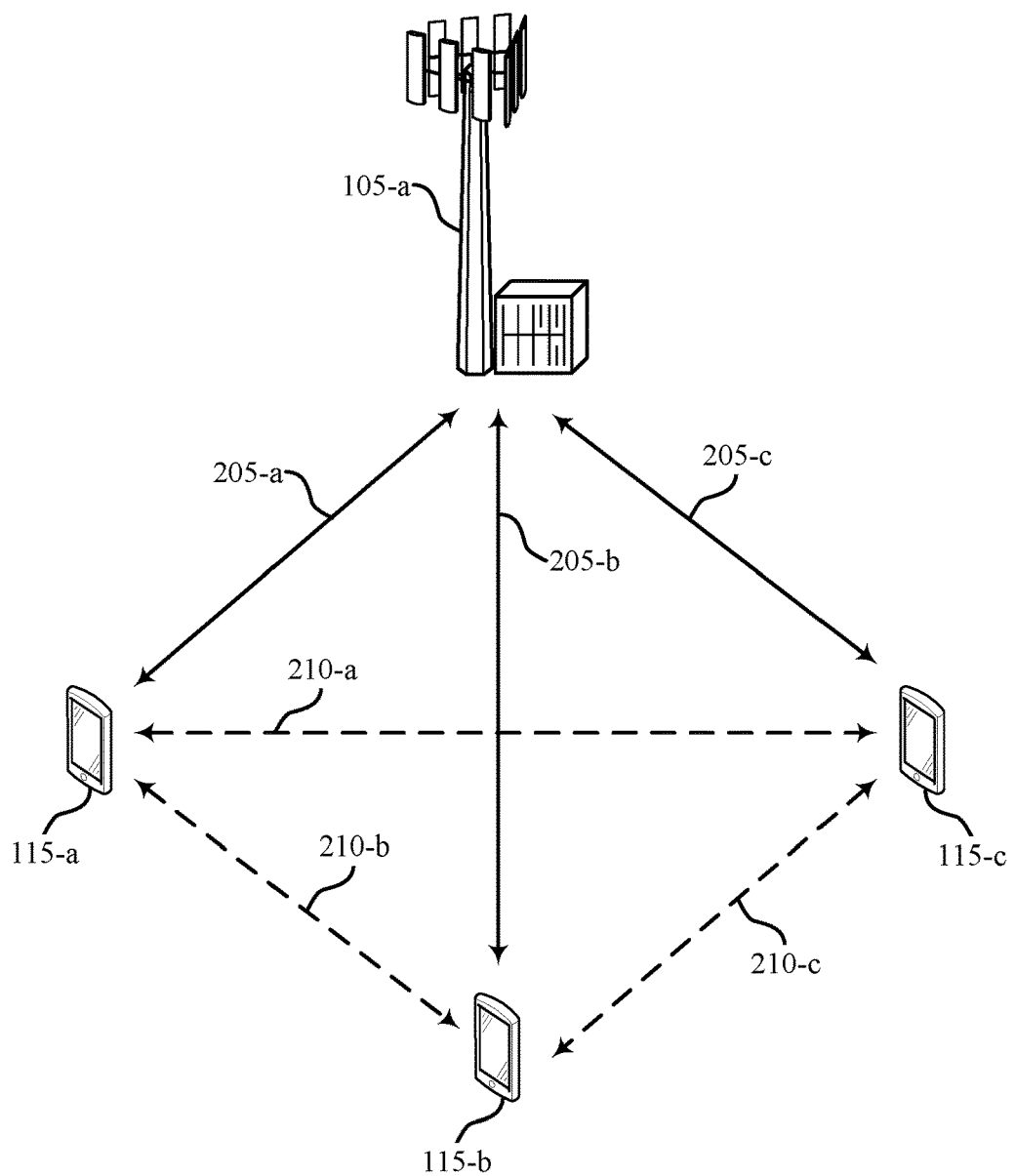

FIG. 2 illustrates an example of a wireless communications system 200 that supports UE group selection for direct link or sidelink packet transmission in broadcast in accordance with aspects of the present disclosure. In some examples, wireless communications system 200 may implement aspects of wireless communications system 100 and may include UE 115-*a*, UE 115-*b*, UE 115-*c*, and base station 105-*a*, which may be examples of UEs 115 and a base station 105 as described with reference to FIG. 1.

The UEs 115 may transmit and receive communications as scheduled by a network entity, such as the base station 105, a network node, a transmitter, or the like. In some cases, the UEs 115 may communicate with the base station 105 via direct links 205 (e.g., communication links 125 described with reference to FIG. 1). For example, base station 105-*b* may transmit packets to UE 115-*a*, UE 115-*b*, and UE 115-*c* via direct link 205-*a*, direct link 205-*b*, and direct link 205-*c*, respectively. Additionally, the UEs 115 may communicate directly with one another via sidelink connections 210 without transmitting through the base station 105. For example, UE 115-*a*, UE 115-*b*, and UE 115-*c* may communicate with each other via sidelink connection 210-*a*, sidelink connection 210-*b*, and sidelink connection 210-*c*, as shown in FIG. 2. The sidelink connections 210 may illustrate examples of D2D communication, V2X communication, or another example of sidelink communication in the wireless communications system 200.

In some cases, the wireless communications system 200 may support broadcasting transmissions (e.g., including packets) by the base station 105 to the UEs 115 via the direct links 205. The UEs 115 may provide feedback to the base station 105, and in some cases, the UEs 115 may request for a retransmission of the broadcast transmissions. For example, the UEs 115 may provide a PDCP status report, an RLC status report, a HARQ status report, or a combination to the base station 105. In some cases, the base station 105 may perform rate control for direct links 205 (e.g., when transmitting or retransmitting the broadcast transmissions). For example, each UE 115 in a coverage area for the base station 105 may include a maximum MCS for communicating with the base station 105 in a CSI report. The base station 105 may select an MCS for the broadcast transmissions based on the reports (e.g., reports from UEs 115 in a coverage area of the base station 105 regardless of the type of communication link). In some cases, the base station 105 may construct a pool of MCS values with the union of the MCS values in the CSI reports from each UE 115. The base station 105 may select the minimum MCS value from the MCS pool to use for the broadcast transmissions. In some other cases, the base station 105 may select an MCS value as a percentile of the MCS pool (e.g., a $50^{th}$ or $100^{th}$ percentile), thus covering a percent of the UEs 115. However, there may be a tradeoff between coverage and data rate by selecting the minimum MCS value or selecting the MCS value as a percentile. For example, a lower MCS value may improve coverage by increasing a quantity (e.g., percentage) of UEs 115 which are able to decode the transmissions, but may reduce the data rate. Conversely, a higher MCS value may reduce coverage (e.g., reduce a quantity/percentage of UEs 115 which are able to decode the transmissions) but may improve the data rate. Thus, if the base station 105 *a* considers MCS values from each UE 115 in the coverage area to select the MCS value for communication via direct links 205 without considering the sidelink connections 210, the base station 105 *a* may select a relatively low MCS value, which may cause unnecessary duplication of packets and inefficient communications (e.g., increased latency).

In some cases, it may be beneficial to divide the UEs 115 in a coverage area of a base station 105 into a subset of UEs 115 receiving the broadcast transmissions via a direct link 205 and a subset of UEs 115 receiving the packets from the packets from the broadcast transmission via a sidelink connection 210. For example, base station 105-*a* may determine UE 115-*a* and UE 115-*c* are to receive broadcast transmissions via direct link 205-*a* and direct link 205-*c*, respectively, and UE 115-*c* is to receive the packets from the broadcast transmissions from UE 115-*a* or UE 115-*c* via one of sidelink connection 210-*b* or sidelink connection 210-*c*. In some cases, the base station 105 may divide the UEs 115 based on selection criteria. For example, base station 105-*a* may receive a report including MCS values (e.g., a CSI-reference signal (CSI-RS) report) from UE 115-*a*, UE 115-*b*, and UE 115-*c*. Base station 105-*a* may determine UE 115-*a* and UE 115-*c* are to receive the broadcast transmissions based on the MCS value (e.g., UE 115-*a* and UE 115-*c* may have an MCS value above a threshold MCS value). Base station 105-*a* may select an MCS value for the broadcast transmissions based on the MCS values of the subset of UEs 115 that are to receive the broadcast transmissions via direct links 205, such as UE 115-*a* and UE 115-*c*. For example, base station 105-*a* may select the minimum MCS value reported by UE 115-*a* and UE 115-*c*, but may not consider the MCS value reported by UE 115-*b* (e.g., because UE 115-*b* may have an MCS value below the threshold MCS value).

In some cases, the UEs 115 in the coverage area of the base station 105 may transmit a capability report to the base station 105. For example, UE 115-*a*, UE 115-*b*, and UE 115-*c* may report a capability corresponding to a data rate, a processing power, a full duplex power, a half duplex power, a TDD power, an FDD power, or a combination to base station 105-*a*. Base station 105-*a* may divide the UEs 115 into a subset for receiving the broadcast transmissions via a direct link 205 and a subset for receiving the packets from the broadcast transmission via a sidelink connection 210 based on the capability report. In some cases, if the reported capability (e.g., a power capability) is greater than a threshold, the base station 105 may include the UE 115 in the subset of UEs 115 to receive the broadcast transmissions via a direct link 205, while UEs 115 with a reported capability less than the threshold may be included in the subset of UEs 115 to receive the packets from the broadcast transmissions via a sidelink connection 210. For example, UE 115-*a* and UE 115-*c* may have a capability that satisfies (e.g., is greater than) a threshold power, while UE 115-*b* may have a capability less than the threshold power. Thus, UE 115-*a* and UE 115-*c* may receive the broadcast transmissions from base station 105-*a* via direct link 205-*a* and direct link 205-*c* respectively. In some examples, UE 115-*b* may receive the packets from the broadcast transmissions from one of UE 115-*a* or UE 115-*c* via sidelink connection 210-*b* or sidelink connection 210-*c*, respectively. In some cases, if a UE 115 has a higher capability (e.g., a higher power capability), the UE 115 may be able to serve more neighboring UEs 115.

In some examples, the base station 105 may divide the UEs 115 into a subset for receiving the broadcast transmissions via a direct link 205 and a subset for receiving the packets from the broadcast transmission via a sidelink connection 210 based on balancing the traffic load among UEs 115 on sidelink connections 210. For example, base station 105-*a* may determine UE 115-*a* and UE 115-*c* are to receive the broadcast transmissions via direct link 205-*a* and direct link 205-*c* based on UE 115-*a* and UE 115-*c* having a traffic load below a threshold value. That is, base station 105-*a* may determine UE 115-*a* and UE 115-*c* have extra space to process traffic load for UE 115-*c* on sidelink connection 210-*b* or sidelink connection 210-*c*.

Figure 3:
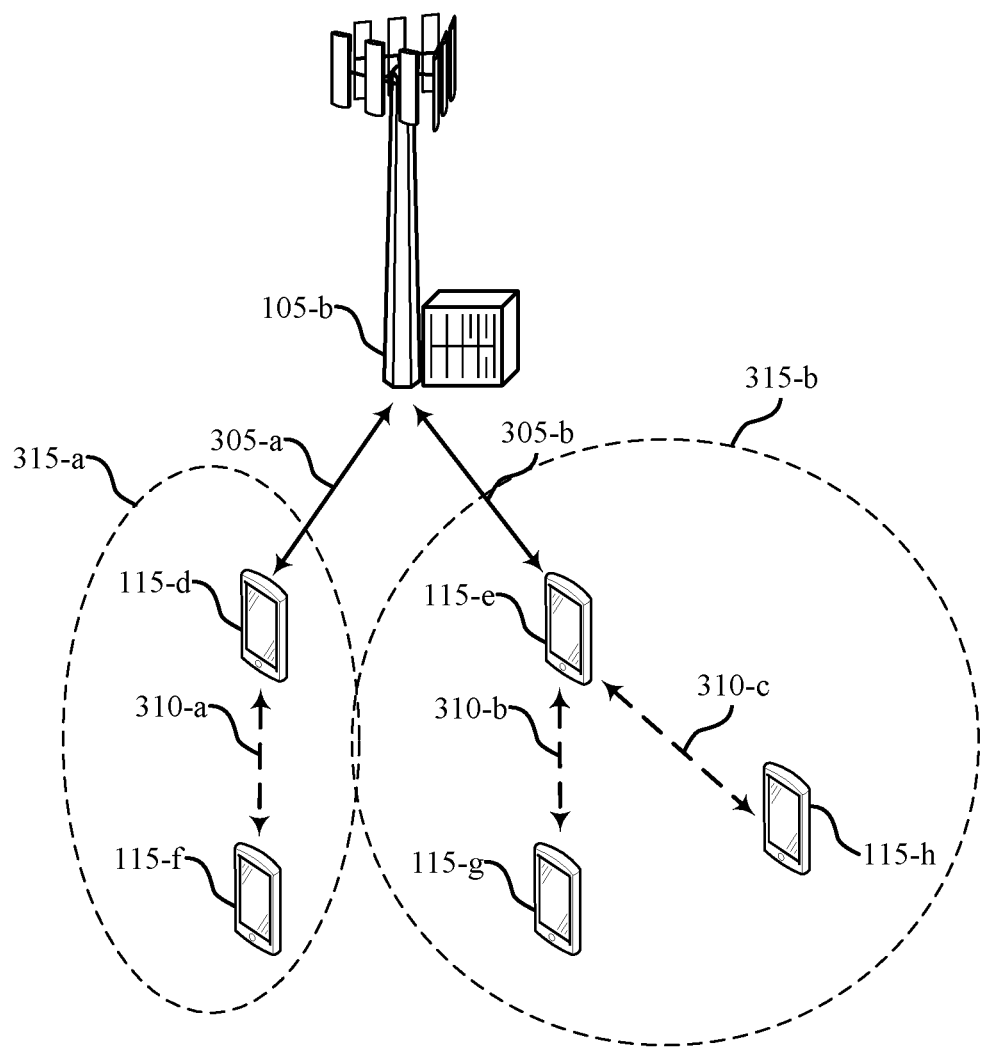
Figure 3:
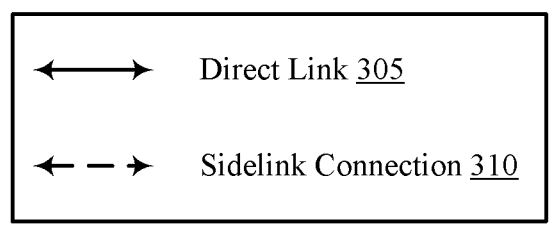

In some examples, the base station 105 may divide the UEs 115 into subsets to receive the packets from the broadcast transmissions via direct links 205 or sidelink connections 210 based on a distance between the UE 115 and the base station 105, which is described in further detail with respect to FIG. 3. In some other examples, the base station 105 may divide the UEs 115 into subsets based on clusters of UEs 115, which is described in further detail with respect to FIG. 4. In some cases, the base station 105 may divide the UEs 115 into a subset for receiving the broadcast transmissions via a direct link 205 and a subset for receiving the packets from the broadcast transmission via a sidelink connection 210 based on a threshold MCS, a threshold distance, a threshold relative location, a threshold capability (e.g., a threshold power capability, or other such UE capability), a threshold traffic load, or a combination. In some cases, which method the base station 105 uses to divide the UEs 115 may depend on a geographic location of the UEs 115 and base station 105, a wireless communications type, or the like.

In some cases, the base station 105 may transmit an indication of the subset to the UE 115. For example, the base station 105 may transmit control information prior to the broadcast transmissions. The control information may be included in a MAC-control element (MAC-CE), downlink control information (DCI), or a wakeup signal (WUS). In some examples, the base station 105 may transmit the indication to UEs 115 selected for receiving the broadcast transmissions via a direct link 205. The UEs 115 may prepare to receive the broadcast transmissions (e.g., packets) from the direct link 205 based on the indication. Additionally or alternatively, the base station 105 may transmit the indication to UEs 115 selected for receiving the packets from the broadcast transmission from other UEs via a sidelink connection 210. The UEs 115 may ignore data transmitted on the direct link 205 based on the indication. For example, if base station 105-*a* selects UE 115-*b* to receiving the packets from the broadcast transmission via a sidelink connection 210 (e.g., sidelink connection 210-*b* or sidelink connection 210-*c*), then UE 115-*b* may ignore data transmitted on direct link 205-*b* and may get ready to receive data via the sidelink connection 210. In some cases, the UEs 115 that receive the broadcast transmissions via a direct link 205 may transmit the packets from the broadcast transmissions to one or more other UEs 115 via one or more sidelink connections 210. In some cases, the UEs 115 may transmit the sidelink transmission using unicast techniques, groupcast techniques, broadcast techniques, or a combination.

In some cases, it may be beneficial to categorize (e.g., divide) the UEs 115 in a coverage area of a base station 105-*a* into a first subset of UEs 115 receiving the broadcast transmissions via a direct link 205 and a second subset of UEs 115 receiving the packets from the packets from the broadcast transmission via a sidelink connection 210. For example, the base station 105-*a* may determine UE 115-*a* and UE 115-*c* are to receive broadcast transmissions via direct link 205-*a* and direct link 205-*c*, respectively, and UE 115-*c* is to receive the packets from the broadcast transmissions from UE 115-*a* or UE 115-*c* via one of sidelink connection 210-*b* or sidelink connection 210-*c*. In some cases, the base station 105-*a* may categorize the UEs 115 based on selection criteria, including an MCS associated with each respective UE 115.

For example, base station 105-*a* may receive a report including one or more parameters associated with a maximum MCS value (e.g., a CSI-RS report) from UE 115-*a*, UE 115-*b*, and UE 115-*c*. Parameters associated with maximum MCS values may include received signal strength indicator (RSSI) measurements, reference signal received power (RSRP) measurements, reference signal received quality (RSRQ) measurements, signal-to-noise ratio (SNR) measurements, signal-to-interference-plus-noise ratio (SINR) measurements, and the like. In this example, the base station 105-*a* may categorize the UEs 115 based on whether or not the MCS associated with each respective UE 115 satisfies (e.g., is greater than or equal to) a threshold MCS. For instance, the base station 105-*a* may determine that MCSs associated with UE 115-*a* and UE 115-*c* satisfy the threshold MCS, and may thereby categorize the UE 115-*a* and UE 115-*c* into the first subset of UEs 115 which are to receive the broadcast transmissions via the direct link 205-*a* and direct link 205-*c*, respectively. Conversely, the base station 105-*a* may determine that an MCS associated with UE 115-*b* fails to satisfy the threshold MCS, and may thereby categorize the UE 115-*b* into the second subset of UEs 115 which are to receive the broadcast transmissions via the sidelink connection 210-*b*, sidelink connection 210-*c*, or both.

In some aspects, the base station 105-*a* may determine the threshold MCS based on a time delay budget report by the UE for transmitting the broadcast transmissions, a data rate requirement for transmitting the broadcast transmissions, UE 115 capabilities, or any combination thereof. In this regard, by selectively adjusting the threshold MCS based on the various parameters, the base station 105-*a* may selectively adjust a quantity (e.g., percentage) of UEs 115 which are categorized into the first subset of UEs 115 and the second subset of UEs 115.

Techniques described herein may enable more efficient and reliable distribution of broadcast transmissions. In particular, by categorizing UEs 115 subscribed to receive broadcast transmissions according to MCSs associated with the respective UEs 115, a base station 105 of the wireless communications system 200 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115, further improving broadcast distribution within the wireless communications system 200.

In some cases, the base station 105-*a* may categorize the UEs 115 based on selection criteria, including a UE capabilities associated with each respective UE 115. For example, base station 105-*a* may receive a report including one or more parameters associated with UE capabilities for each of the UE 115-*a*, UE 115-*b*, and UE 115-*c*. Parameters associated with UE capabilities may include the number of antennas or antenna panels configured at the UE 115, supported processing power (e.g., the number of processor or processor units, power capabilities, memory capacity including processor and other memory, etc.), full duplexing or half duplexing capability, time or frequency domain duplexing capability, or a combination of these. In this example, the base station 105-*a* may categorize the UEs 115 based on whether or not the UE capability associated with each respective UE 115 satisfies (e.g., is greater than or equal to) a threshold UE capability. For instance, the base station 105-*a* may determine that UE capabilities associated with UE 115-*a* and UE 115-*c* satisfy the threshold UE capability, and may thereby categorize the UE 115-*a* and UE 115-*c* into the first subset of UEs 115 which are to receive the broadcast transmissions via the direct link 205-*a* and direct link 205-*c*, respectively. Conversely, the base station 105-*a* may determine that a UE capability associated with UE 115-*b* fails to satisfy the threshold UE capability, and may thereby categorize the UE 115-*b* into the second subset of UEs 115 which are to receive the broadcast transmissions via the sidelink connection 210-*b*, sidelink connection 210-*c*, or both. As the direct link UEs 115 may be categorized based on having higher capabilities, the higher processing and throughput (e.g., via receiving direct link communications in combination with relaying communications via sidelink) may be allocated to more capable UEs 115, which may improve communication reliability and efficiency.

In some examples, the base station 105-*a* or the respective UEs 115 may determine UE capability metric. For example, each of the values indication by the UE 115 may be used to calculate the capability metric using weights associated with each value. More particularly, a first weight may be applied to the indication of the number of antennas/antenna panels, a second weight may be applied to the indication or processing power, a third weight applied to half or full duplexing capability, etc. The base station 105 may determine the metric by averaging the values resulting from the weights applied to the indicated values. Thus, the calculated capability metric may be compared to the threshold UE capability to categorize the UEs 115 into respective subsets. In some examples, the UEs 115 calculate the metric an indicate the calculated metric to the base station 105-*a*. In such cases, the base station 105 may transmit a configuration that indicates the weights/algorithm that the UE 115 is to use for calculating the metric. This configuration may be transmitted via control signaling, such as MAC-CE, RRC, etc. As the capability that corresponds to half duplexing capability, full duplexing capability, TDD capability and FDD capability may be a "yes" or "no," meaning that the UE is capable performing these features or not, the UE 115 may report a "1" or "0" value for some or all of these capabilities. Further, the weight may be applied to the indication.

In some aspects, the base station 105-*a* may determine the threshold UE capability based on a time delay budget reported by the UE for transmitting the broadcast transmissions, a data rate requirement for transmitting the broadcast transmissions, UE 115 capabilities, broadcast channel conditions, or any combination thereof. In this regard, by selectively adjusting the threshold UE capability based on the various parameters, the base station 105-*a* may selectively adjust a quantity (e.g., percentage) of UEs 115 which are categorized into the first subset of UEs 115 and the second subset of UEs 115.

Techniques described herein may enable more efficient and reliable distribution of broadcast transmissions. In particular, by categorizing UEs 115 subscribed to receive broadcast transmissions according to UE capabilities associated with the respective UEs 115, a base station 105 of the wireless communications system 200 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115, further improving broadcast distribution within the wireless communications system 200.

In some cases, the base station 105 *a* may categorize the UEs 115 based on selection criteria, including an MCS associated with each respective UE 115, distances (e.g., average distances) between each respective UE 115 and the remaining UEs 115 of the UE cluster, channel qualities associated with communications between the respective UEs 115, channel qualities associated with communications between the base station 105 *a* and the respective UEs 115, or any combination thereof.

For example, base station 105 *a* may determine (e.g., autonomously or based on signaling from the UEs 115) average distances between the UEs 115 of the UE cluster. In this regard, the base station 105 *a* may categorize the UEs 115 of the UE cluster illustrated in FIG. 2 based on comparing the average distances between the respective UEs 115. In particular, the base station 105 *a* may select the UE 115 of the UE cluster which exhibits the smallest average distance between the remaining UEs 115 of the UE cluster as a direct-receiving UE 115, and may categorize the remaining UEs 115 as sidelink receiving UEs 115. By way of another example, the base station 105 *a* may select the UE 115 of the UE cluster with the best average channel quality for communications with the remaining UEs 115 of the UE cluster as a direct-receiving UE 115, and may categorize the remaining UEs 115 as sidelink receiving UEs 115.

In some cases, the base station 105-*a* may categorize the UEs 115 based on selection criteria, including a traffic load associated with each respective UE 115. For example, base station 105-*a* may receive a report including a traffic load from UE 115-*a*, UE 115-*b*, and UE 115-*c*. In this example, the base station 105-*a* may categorize the UEs 115 based on whether or not the traffic load associated with each respective UE 115 satisfies (e.g., is less than or equal to) a threshold traffic load. For instance, the base station 105-*a* may determine that traffic load associated with UE 115-*a* and UE 115-*c* satisfy the threshold traffic load (e.g., are less than the threshold), and may thereby categorize the UE 115-*a* and UE 115-*c* into the first subset of UEs 115 which are to receive the broadcast transmissions via the direct link 205-*a* and direct link 205-*c*, respectively. Conversely, the base station 105-*a* may determine that a traffic load associated with UE 115-*b* fails to satisfy the threshold traffic load (e.g., are greater than the threshold), and may thereby categorize the UE 115-*b* into the second subset of UEs 115 which are to receive the broadcast transmissions via the sidelink connection 210-*b*, sidelink connection 210-*c*, or both.

In some aspects, the base station 105-*a* may determine the threshold traffic load-based on a time delay budget reported by the UE for transmitting the broadcast transmissions, a data rate requirement for transmitting the broadcast transmissions, channel conditions, UE 115 capabilities, or any combination thereof. In this regard, by selectively adjusting the threshold traffic load-based on the various parameters, the base station 105-*a* may selectively adjust a quantity (e.g., percentage) of UEs 115 which are categorized into the first subset of UEs 115 and the second subset of UEs 115.

Techniques described herein may enable more efficient and reliable distribution of broadcast transmissions. In particular, by categorizing UEs 115 subscribed to receive broadcast transmissions according to traffic loads associated with the respective UEs 115, a base station 105 of the wireless communications system 200 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115, further improving broadcast distribution within the wireless communications system 200.

FIG. 3 illustrates an example of a wireless communications system 300 that supports UE group selection for direct link or sidelink packet transmission in broadcast in accordance with aspects of the present disclosure. In some examples, wireless communications system 300 may implement aspects of wireless communications system 100, wireless communications system 200, or both. For example, wireless communications system 300 may illustrate an example of a base station 105 selecting UEs 115 for a mode of communication for broadcast transmissions. Wireless communications system 300 may include UE 115-d through UE 115-h and base station 105-b, which may be examples of UEs 115 and a base station 105 as described with reference to FIGS. 1 and 2.

The UEs 115 may transmit and receive communications as scheduled by a network entity, such as the base station 105, a network node, a transmitter, or the like. In some cases, the UEs 115 may communicate with the base station 105 via direct links 305 and with each other via sidelink connections 310, which may be examples of direct links 205 and sidelink connections 210 as described with reference to FIG. 2. In some examples, the wireless communications system 300 may support broadcasting transmissions (e.g., including packets) by the base station 105 to the UEs 115 via the direct links 305, and the UEs 115 may transmit the packets from the broadcast transmissions to other UEs 115 via the sidelink connections 310. In some cases, the base station 105 may divide the UEs 115 into subsets to receive the packets from the broadcast transmissions via direct links 305 or sidelink connections 310 based on a distance between the UE 115 and the base station 105.

For example, as illustrated in FIG. 3, UE 115-d and UE 115-e may be closer in proximity to base station 105-b relative to UE 115-f, UE 115-g, and UE 115-h. Thus, the distance between UE 115-d and base station 105-b as well as the distance between UE 115-e and base station 105-b may satisfy a threshold distance (e.g., may be equal to or shorter than the threshold distance), which may correspond to a better MCS value for broadcast transmissions. That is, base station 105-b may select UE 115-d and UE 115-e to be in the subset of UEs 115 to receive the broadcast transmission via direct link 305-a and direct link 305-b, respectively. Base station 105-b may send broadcast transmissions to UE 115-d and UE 115-e using a minimum MCS based on reports from UE 115-d and UE 115-e including an MCS corresponding to communications between UE 115-d, UE 115-e, and base station 105-b. In some cases, base station 105-b may place UE 115-f, UE 115-g, and UE 115-h in the subset of UEs 115 to receive packets from the broadcast transmission via sidelink connection 310-a, sidelink connection 310-b, and sidelink connection 310-c, respectively, if the distance between UE 115-f, UE 115-g, UE 115-h, and base station 105-b does not satisfy the threshold distance. Thus, UE 115-f may receive the packets from the broadcast transmissions from UE 115-d via sidelink connection 310-a, and UE 115-g and UE 115-h may receive the packets from the broadcast transmission from UE 115-e via sidelink connection 310-b and sidelink connection 310-c.

In some cases, the UEs 115 may transmit a location report to the base station 105. The base station 105 may determine the distance between the UEs 115 and the base station 105 based on the location report. The base station 105 may compare the distance to the threshold distance to select the UEs 115 to receive the packets from the broadcast transmissions via a direct link 305 or a sidelink connection 310.

In some cases, the base station 105-b may categorize (e.g., divide) the UEs 115 into subsets to receive the packets from the broadcast transmissions via direct links 305 or sidelink connections 310 based on MCSs associated with each of the respective UEs 115.

For example, the base station 105-b may categorize the UE 115-d and the UE 115-e into a first subset of UEs 115 which are to receive broadcast transmissions from the base station 105-b via direct link communications (e.g., via direct links 305-a and 305-b, respectively). The base station 105-b may categorize the UE 115-d and the UE 115-e into the first subset of UEs 115 based on MCSs associated with the UE 115-d and UE 115-e satisfying a threshold MCS. In some cases, an MCS may satisfy the threshold MCS if the MCS is greater than or equal to the threshold MCS (e.g., threshold MCS satisfied if $MCS \geq MCS_{Thresh}$).

Conversely, the base station 105-b may categorize the UE 115-f, UE 115-g, and UE 115-h into a second subset of UEs 115 which are to receive broadcast transmissions via sidelink communications from the first subset of UEs 115 (e.g., via sidelink connection 310-a, sidelink connection 310-b, and sidelink connection 310-c, respectively). The base station 105-b may categorize the UE 115-f, 115-g, and the UE 115-h into the second subset of UEs 115 based on MCSs associated with the UE 115-f, 115-g, and the UE 115-h failing to satisfy the threshold MCS. In some cases, an MCS may fail to satisfy the threshold MCS if the MCS is less than the threshold MCS (e.g., threshold MCS not satisfied if $MCS < MCS_{Thresh}$).

Techniques described herein may enable more efficient and reliable distribution of broadcast transmissions. In particular, by categorizing UEs 115 subscribed to receive broadcast transmissions according to MCSs associated with the respective UEs 115, a base station 105 of the wireless communications system 300 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115, further improving broadcast distribution within the wireless communications system 300.

In some cases, the base station 105-b may categorize (e.g., divide) the UEs 115 into subsets to receive the packets from the broadcast transmissions via direct links 305 or sidelink connections 310 based on UE capabilities associated with each of the respective UEs 115. These UE capabilities may be periodically reported to the base station 105-b using control signaling such as MAC-CE messaging, RRC messaging, UCI, or the like.

For example, the base station 105-b may categorize the UE 115-d and the UE 115-e into a first subset of UEs 115 which are to receive broadcast transmissions from the base station 105-b via direct link communications (e.g., via direct links 305-a and 305-b, respectively). The base station 105-b may categorize the UE 115-d and the UE 115-e into the first subset of UEs 115 based on UE capabilities associated with the UE 115-d and UE 115-e satisfying a threshold UE capability. In some cases, a UE capability may satisfy the threshold UE capability if the UE capability (e.g., a calculated capability metric) is greater than or equal to the threshold UE capability (e.g., threshold UE capability satisfied if $Capability \geq Capability_{Thresh}$).

Conversely, the base station 105-b may categorize the UE 115-f, UE 115-g, and UE 115-h into a second subset of UEs 115 which are to receive broadcast transmissions via sidelink communications from the first subset of UEs 115 (e.g., via sidelink connection 310-a, sidelink connection 310-b, and sidelink connection 310-c, respectively). The base station 105-b may categorize the UE 115-f, 115-g, and the UE 115-h into the second subset of UEs 115 based on UE capabilities associated with the UE 115-f, 115-g, and the UE 115-h failing to satisfy the threshold UE capability. In some cases, a UE capability may fail to satisfy the threshold UE capability if the UE capability is less than the threshold UE capability (e.g., threshold UE capability not satisfied if $Capability < Capability_{Thresh}$).

Techniques described herein may enable more efficient and reliable distribution of broadcast transmissions. In particular, by categorizing UEs 115 subscribed to receive broadcast transmissions according to UE capabilities associated with the respective UEs 115, a base station 105 of the wireless communications system 300 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115, further improving broadcast distribution within the wireless communications system 300.

The base station 105-b may categorize the UEs 115 of each respective UE cluster 315 into the first subset of UEs 115 (e.g., direct-receiving UEs 115) and the second subset of UEs 115 (e.g., sidelink-receiving UEs 115) based on distances between the respective UEs 115 within each UE cluster 315, channel qualities for communications between the respective UEs 115 of each UE cluster 315, channel qualities for communications between the base station 105-b and the respective UEs 115 of each UE cluster 315, or any combination thereof.

Techniques described herein may enable more efficient and reliable distribution of broadcast transmissions. In particular, by categorizing UEs 115 subscribed to receive broadcast transmissions according to MCSs associated with the respective UEs 115, a base station 105 of the wireless communications system 300 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115, further improving broadcast distribution within the wireless communications system 300.

In some cases, the base station 105-b may categorize (e.g., divide) the UEs 115 into subsets to receive the packets from the broadcast transmissions via direct links 305 or sidelink connections 310 based on traffic loads associated with each of the respective UEs 115.

For example, the base station 105-b may categorize the UE 115-d and the UE 115-e into a first subset of UEs 115 which are to receive broadcast transmissions from the base station 105-b via direct link communications (e.g., via direct links 305-a and 305-b, respectively). The base station 105-b may categorize the UE 115-d and the UE 115-e into the first subset of UEs 115 based on traffic loads associated with the UE 115-d and UE 115-e satisfying a threshold traffic load. In some cases, a traffic may satisfy the threshold traffic load if the traffic load is less than or equal to the threshold traffic load (e.g., threshold traffic load satisfied if $trafficLoad \leq TrafficLoad_{Thresh}$).

Conversely, the base station 105-b may categorize the UE 115-f, UE 115-g, and UE 115-h into a second subset of UEs 115 which are to receive broadcast transmissions via sidelink communications from the first subset of UEs 115 (e.g., via sidelink connection 310-a, sidelink connection 310-b, and sidelink connection 310-c, respectively). The base station 105-b may categorize the UE 115-f, 115-g, and the UE 115-h into the second subset of UEs 115 based on traffic load associated with the UE 115-f, 115-g, and the UE 115-h failing to satisfy the threshold traffic load. In some cases, a traffic load may fail to satisfy the threshold traffic load if the traffic load is less than the threshold traffic load (e.g., threshold traffic load not satisfied if $trafficLoad > TrafficLoad_{Thresh}$).

Techniques described herein may enable more efficient and reliable distribution of broadcast transmissions. In particular, by categorizing UEs 115 subscribed to receive broadcast transmissions according to traffic loads associated with the respective UEs 115, a base station 105 of the wireless communications system 300 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115, further improving broadcast distribution within the wireless communications system 300.

Figure 4:
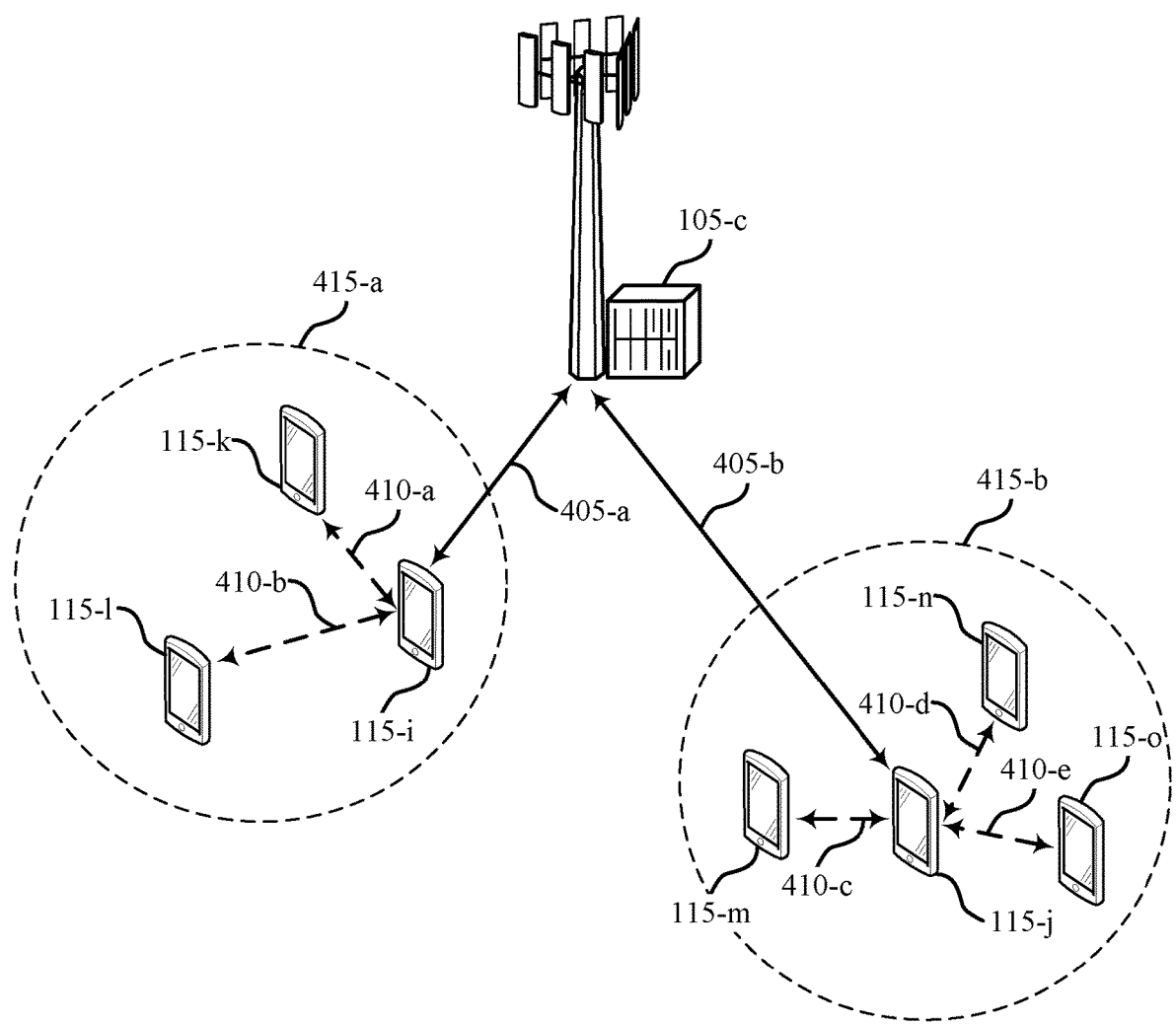

FIG. 4 illustrates an example of a wireless communications system 400 that supports UE group selection for direct link or sidelink packet transmission in broadcast in accordance with aspects of the present disclosure. In some examples, wireless communications system 400 may implement aspects of wireless communications system 100, wireless communications system 200, wireless communications system 300, or a combination. For example, wireless communications system 400 may illustrate an example of a base station 105 selecting UEs 115 for a mode of communication for broadcast transmissions. Wireless communications system 400 may include UE 115-i through UE 115-o and base station 105-c, which may be examples of UEs 115 and a base station 105 as described with reference to FIGS. 1, 2, and 3.

The UEs 115 may transmit and receive communications as scheduled by a network entity, such as the base station 105, a network node, a transmitter, or the like. In some cases, the UEs 115 may communicate with the base station 105 via direct links 405 and with each other via sidelink connections 410, which may be examples of direct links 205 and sidelink connections 210 as described with reference to FIG. 2. In some examples, the wireless communications system 400 may support broadcasting transmissions (e.g., including packets) by the base station 105 to the UEs 115 via the direct links 405, and the UEs 115 may transmit the broadcast transmissions to other UEs 115 via the sidelink connections 410. In some cases, the base station 105 may divide the UEs 115 into subsets to receive the packets from the broadcast transmissions via direct links 405 or sidelink connections 410 based on clusters of UEs 115.

For example, as illustrated in FIG. 4, base station 105-c may divide UE 115-i through UE 115-o into clusters 415. In some cases, base station 105-c may determine the clusters based on any combination of a CSI report including MCS information from each UE 115, a location of each UE 115, a capability report including a power capability from each UE 115, the traffic load of each UE 115, or the like. For example, base station 105-c may divide UE 115-i, UE 115-k, and UE 115-l into cluster 415-a and UE 115-j, UE 115-m, UE 115-n, and UE 115-o into cluster 415-b. Base station 105-c may select a UE 115 from each cluster as the access UE. The access UE may communicate with the base station 105 via a direct link 405, while the other UEs 115 in the cluster 415 may communicate with the access UE 115 via sidelink connections 410. For example, base station 105-c may select UE 115-i to be the access UE for cluster 415-a and UE 115-j to be the access UE for cluster 415-b (e.g., based on an MCS value, location, capability, traffic load, or the like corresponding to UE 115-i and UE 115-j). In some cases, the access UE may be at the center of the cluster. Base station 105-c may send broadcast transmissions to UE 115-i and UE 115-j via direct link 405-a and direct link 405-b, respectively. In some cases, UE 115-i may send packets from the broadcast transmissions to the other UEs 115 in cluster 415-a via sidelink connections 410, such as to UE 115-k via sidelink connection 410-a and to UE 115-1 via sidelink connection 410-b. Similarly, UE 115-j may send the packets from the broadcast transmissions to the other UEs 115 in cluster 415-b via sidelink connections 410, such as UE 115-m via sidelink connection 410-c, UE 115-n via sidelink connection 410-d, and UE 115-o via sidelink connection 410-e.

In some cases, the base station 105-c may categorize (e.g., divide) the UEs 115 into subsets to receive the packets from the broadcast transmissions via direct links 405 or sidelink connections 410 based on MCSs associated with each of the respective UEs 115.

For example, one or more UEs 115 (e.g., UEs 115-i through UE 115-o) may subscribe to receive broadcast transmissions from the base station 105-c. In some aspects, the UEs 115 of the wireless communications system 400 may subscribe to receive broadcast transmissions from the base station 105-c by transmitting uplink transmissions including an indication of the subscriptions to the base station 105-c. In some cases, base station 105-c may identify that UEs 115 (e.g., UEs 115-i through UE 115-o) are subscribed to receive broadcast transmissions including packets of data.

In some aspects, the UEs 115 (e.g., UEs 115-i through UE 115-o) may exchange aperiodic CSI (A-CSI) requests to the other UE 115. In some aspects, the UEs 115 may exchange A-CSI requests via the sidelink connections 410 in order to determine channel qualities associated with communications between the respective UEs 115. A-CSI requests may indicate for a receiving UE 115 of each A-CSI request to transmit a channel quality report to the transmitting UE 115 of each A-CSI request. For example, the UE 115-i may transmit an A-CSI requests to the UE 115-k, UE 115-1, UE 115-m, or any combination thereof, where the A-CSI requests include an indication for the UE 115-k to transmit a channel quality report to the UE 115-i. In some cases, the A-CSI request may include an indication for the receiving UE 115 of the A-CSI request to measure reference signals (e.g., CSI-RS) from the transmitting UE 115, and to generate the channel quality report based on the performed measurements. In some aspects, each of the UEs 115 may transmit and/or receive A-CSI reports from any quantity of other UEs 115 subscribed to receive broadcasts from the base station 105-d.

In some aspects, the UEs 115 of the wireless communications system 300 may transmit channel quality reports to other UEs 115 within the wireless communications system 300. In some aspects, the UEs 115 may transmit the channel quality reports based on (e.g., in response to) receiving the A-CSI requests from other UEs 115. For example, upon receiving an A-CSI request from the UE 115-i, the UE 115-k may measure reference signals received from the UE 115-i via sidelink connection 410-a, and may generate a channel quality report associated with the sidelink connection based on the measurements. Subsequently, the UE 115-k may transmit the channel quality report to the UE 115-i, where the channel quality report includes an indication of channel quality associated with communications between the UE 115-i and the UE 115-k. In some aspects, the channel quality report may include, but is not limited to, an indication of a maximum MCS associated with sidelink communications between the respective UEs 115.

The UEs 115 of the wireless communications system 300 may determine a channel quality between the respective UEs 115 based on exchanging the A-CSI requests, channel quality reports, or both. In this regard, each UE 115 may determine a channel quality associated with communications between the respective UE 115 and any quantity of additional UEs 115 subscribed to receive broadcasts from the base station 105-c. In some aspects, the channel quality may include, but is not limited to, a maximum MCS associated with sidelink communications between the respective UEs 115. Channel qualities between UEs 115 of the wireless communications system 300 may be used for distributing broadcast transmissions between the UEs 115, as will be discussed in further detail herein.

In some cases, the UEs 115 of the wireless communications system 300 may determine channel qualities based on additional or alternative signaling exchanged between the UEs 115, including sidelink control information (SCI) signaling, demodulation reference signal (DMRS) signaling, physical sidelink feedback channel (PSFCH) signaling, or any combination thereof. In particular, each of the UE 115 (e.g., UEs 115-i through UE 115-o) may perform measurements on SCI signaling, DMRS signaling, and/or PSFCH signaling received from the other UE 115, and may determine a channel quality based on the measurements. Measurements used to determine channel qualities may include, but are not limited to, RSRP measurements, RSRQ measurements, SNR measurements, SINR measurements, or any combination thereof.

In some aspects, the channel quality reports and other signaling exchanged by the UEs 115 may each include a source identifier (e.g., source ID) associated with the UE 115 which transmitted the respective channel quality report. Each UE 115 may be associated with a unique source identifier. For example, the UE 115-k may transmit a channel quality report to the UE 115-i, where the channel quality report includes a source identifier associated with the UE 115-k. In some aspects, the source identifiers may be used to calculate which resources may be used to transmit signals (e.g., feedback messages, channel quality reports) via a PSFCH. Moreover, when transmitting sidelink signals (e.g., ACK, negative acknowledgement (NACK), channel quality reports) to other UEs 115, the sidelink signals may include an indication of a source identifier associated with the UE 115 transmitting the feedback. In this regard, UEs 115 receiving feedback or other signaling may be able to use source identifiers indicated in the feedback or other signaling in order to identify which UE 115 the feedback is being received from.

In some aspects, UEs 115 may be configured to determine destination identifiers associated with each UE 115 based on the received source identifiers. For example, the UE 115-i may be configured to maintain a correspondence table, data object, database, or other configuration mapping source identifiers with destination identifiers. By maintaining associations between source identifiers and destination identifiers, UEs 115 may be able to efficiently determine where received signals (e.g., channel quality reports) are received from, and where feedback signaling needs to be transmitted.

For example, the UE 115-$i$ may transmit an A-CSI request to the UE 115-$k$, where the A-CSI request includes a source identifier associated with the UE 115-$i$. The UE 115-$k$ may subsequently determine a destination identifier associated with the UE 115-$i$ based on (e.g., using) the received source identifier and a configuration (e.g., correspondence table) mapping source identifiers to destination identifiers. In this example, the UE 115-$k$ may transmit the channel quality report to the UE 115-$i$, where the channel quality report includes an indication of the destination identifier associated with the UE 115-$i$, a source identifier associated with the UE 115-$k$, or both.

In some aspects, one or more UEs 115 of the wireless communications system 300 may transmit a report including an indication of one or more parameters associated with a maximum MCS associated for communications between the base station 105-$c$ and the respective UE 115. Parameters associated with maximum MCSs may include RSSI measurements, RSRP measurements, RSRQ measurements, SNR measurements, SINR measurements, or any combination thereof. For example, the UE 115-$i$ may transmit a report including an indication of parameters associated with a maximum MCS for communications between the base station 105-$c$ and the UE 115-$i$, and the UE 115-$k$ may transmit a report including an indication of one or more parameters associated with a maximum MCS for communications between the base station 105-$c$ and the UE 115-$k$. In some aspects, the UEs 115 may transmit reports to the base station 105-$c$ indicating parameters associated with maximum MCSs based on subscribing to receive broadcast transmissions from the base station 105-$c$, exchanging the A-CSI requests and/or channel quality reports between other UEs 115, or any combination thereof. In some aspects, the reports indicating the parameters associated with maximum MCSs associated with the respective UEs 115 may include CSI-RS reports.

Additionally or alternatively, one or more UEs 115 may transmit reports (e.g., channel quality reports) indicating a channel quality associated with communications between the respective UE 115 and one or more other UEs 115. For example, the UE 115-$i$ may transmit a report to the base station 105-$c$, where the report indicates channel qualities associated with communications between the UE 115-$i$ and the UE 115-$k$, UE 115-1, and/or UE 115-$m$, respectively. In some aspects, the reports indicating channel qualities between UEs 115 may include indications of source identifiers, destination identifiers, or both, associated with the respective UEs 115. For example, the report transmitted to the base station 105-$c$ from the UE 115-$i$ may indicate source identifiers, destination identifiers, or both, associated with the UE 115-$i$, UE 115-$k$, UE 115-1, UE 115-$m$, or any combination thereof.

In some aspects, the base station 105-$c$ may determine a maximum MCS associated with each UE 115 subscribed to receive broadcasts from the base station 105-$c$. The base station 105-$c$ may additionally determine a threshold MCS (e.g., $MCS_{Thresh}$) which will be used to categorize the UEs 115. In some aspects, the base station 105-$c$ may determine the maximum MCSs and/or threshold MCS based on identifying UEs 115 subscribed to receive broadcast transmissions from the base station 105-$c$, receiving the reports indicating parameters associated with maximum MCSs and/or channel qualities between UEs 115, or any combination thereof. In some aspects, the base station 105-$c$ may determine the threshold MCS based on a time delay budget report by the UE for transmitting the broadcast transmissions, a data rate requirement for transmitting the broadcast transmissions, or both.

In some aspects, the base station 105-$c$ may categorize the UEs 115 (e.g., UEs 115-$i$ through UE 115-$o$) into a first subset of UEs 115 that is to receive the broadcast transmissions via direct link communications from the base station 105-$c$, and into a second subset of UEs 115 that is to receive the broadcast transmissions via sidelink communications from the first subset of UEs 115. In some aspects, the base station 105-$c$ may categorize the UEs 115 into the first and second subsets of UEs 115 based on identifying UEs 115 subscribed to receive broadcast transmissions from the base station 105-$c$, receiving the reports indicating parameters associated with MCSs and/or channel qualities between UEs 115, determining the maximum MCSs for the UEs, determining the threshold MCS, or any combination thereof.

For example, the base station 105-$c$ may categorize the UEs 115 into the first and second subsets of UEs 115 based on determined MCSs associated with each of the respective UEs 115. In this regard, the base station 105-$c$ may categorize the UEs 115 based on receiving the reports indicating parameters associated with maximum MCSs for with each of the respective UEs 115. Specifically, the base station 105-$c$ may categorize the UEs 115 into the first and second subsets of UEs 115 based on whether or not a maximum MCS associated with each of the respective UE 115 satisfies the threshold MCS. For example, the base station 105-$c$ may categorize the UE 115-$i$ and the UE 115-$j$ into a first subset of UEs 115 which are to receive broadcast transmissions from the base station 105-$d$ via direct link communications (e.g., via direct links 405-$a$ and direct link 405-$b$, respectively) based on determining that the MCSs associated with the UE 115-$i$ and UE 115-$j$ satisfy the threshold MCS. For instance, the base station 105-$c$ may categorize the UE 115-$i$ and UE 115-$j$ into the first subset of UEs 115 based on determining that the MCSs associated with the UE 115-$i$ and UE 115-$j$ are each greater than or equal to the threshold MCS (e.g., threshold MCS satisfied based on $MCS_{UE} \geq MCS_{Thresh}$).

Conversely, the base station 105-$c$ may categorize the UEs 115-$k$ through UE 115-$o$ into a second subset of UEs 115 which are to receive broadcast transmissions via sidelink communications (e.g., via sidelink connections 410-$a$ through 410-$e$) from the first subset of UEs 115 based on determining that the MCSs associated with the UEs 115-$k$ through UE 115-$o$ fail to satisfy the threshold MCS. For instance, the base station 105-$c$ may categorize the UEs 115-$k$ through UE 115-$o$ into the second subset of UEs 115 based on determining that the MCSs associated with the UEs 115-$k$ through UE 115-$o$ are each less than the threshold MCS (e.g., threshold MCS not satisfied based on $MCS_{UE} < MCS_{Thresh}$).

In some cases, the base station 105-$c$ may determine one or more sidelink transmission groups for 415 distribution of the broadcast transmissions. For example, the base station 105-$c$ may determine a first sidelink transmission group 415-$a$ and a second sidelink transmission group 415-$b$. In some aspects, each sidelink transmission group 415 may include one or more UEs 115 from the first subset of UEs 115 (e.g., one or more direct-receiving UEs 115) and one or more UEs 115 from the second subset of UEs 115 (e.g., one or more sidelink-receiving UEs 115). In this regard, each sidelink transmission group 415 may indicate which UEs 115 of the second subset of UEs 115 (e.g., which sidelink-receiving UEs 115) are to receive the broadcast transmissions from which UEs 115 of the first subset of UEs 115

(e.g., which direct-receiving UEs 115). In some aspects, the base station 105-c may determine the sidelink transmission groups based on identifying the UEs 115 subscribed to receive broadcasts from the base station 105-c, receiving the reports indicating parameters associated with MCSs and/or channel qualities between UEs 115, determining the maximum MCSs and/or threshold MCS, categorizing the UEs 115 into the respective subsets, or any combination thereof.

In some aspects, the base station 105-c may determine a group identifier (e.g., group ID) associated with each sidelink transmission group 415. The group identifier may be common across each UE 115 included within the respective sidelink transmission group 415. For example, the first sidelink transmission group 415-a may include a first group identifier and the second sidelink transmission group 415-b may include a second group identifier. Additionally, the base station 105-c may determine a destination identifier, a source identifier, or both, associated with each UE 115 within each respective sidelink transmission group.

For example, as noted previously herein, the UE 115-i may transmit a report indicating channel qualities between the UE 115-i and the UE 115-k and UE 115-1, where the report includes source identifiers and/or destination identifiers associated with the UE 115-i, UE 115-k, and/or UE 115-1. In this example, the base station 105-c may determine destination identifiers and/or source identifiers associated with the UE 115-i, UE 115-k, and/or UE 115-1 based on the indications of the source identifiers and/or destination identifiers received in the reports, a configuration (e.g., correspondence table) mapping source identifiers to destination identifiers, or any combination thereof.

In some cases, the base station 105-c may determine a sidelink transmission group for each UE 115 of the first subset of UEs 115. For example, the base station 105-c may categorize the UE 115-i and UE 115-j into the first subset of UEs 115 (e.g., direct-receiving UEs 115) and may categorize the UEs 115-k through UE 115-o into the second subset of UEs 115 (e.g., sidelink-receiving UEs 115). In this example, the base station 105-c may determine a first sidelink transmission group 415-a associated with the UE 115-i and a second sidelink transmission group 415-b associated with the UE 115-j based on the categorization, the channel qualities between the respective UEs 115, or any combination thereof. In this example, the base station 105-c may determine group identifiers associated with each of the respective sidelink transmission groups 415. Additionally, the base station 105-c may determine destination identifiers associated with the UEs 115 of each respective sidelink transmission group 415, source identifiers associated with UEs 115 of each respective sidelink transmission group 415, or any combination thereof.

In some aspects, the base station 105-cd may transmit, to one or more UEs 115 of the wireless communications system 400, an indication (e.g., control information) that the broadcast transmissions are to be received via either direct link communications or sidelink communications. In this regard, the base station 105-c may indicate whether each UE 115 has been categorized into the first subset of UEs 115 (e.g., direct-receiving UEs 115) or the second subset of UEs 115 (e.g., sidelink-receiving UEs 115). In some aspects, the indication of direct-receiving or sidelink-receiving may include control information associated with (e.g., corresponding to) the broadcast transmissions, where the control information is transmitted via MAC-CE signaling, DCI, a WUS, or any combination thereof. For example, the base station 105-c may transmit an indication to the UE 115-i and/or UE 115-j indicating that the respective UE 115 is to receive broadcast transmissions via direct link communications (e.g., via direct links 405-a or 405-b, respectively). Additionally or alternatively, the base station 105-c may transmit an indication to one or more of the UEs 115-k through UE 115-o indicating that the respective UE 115 is to receive broadcast transmissions via sidelink communications (e.g., via sidelink connections 410-a through 410-e) from the first subset of UEs 115 (e.g., from the UE 115-i or UE 115-j).

Additionally or alternatively, the base station 105-c may transmit, to one or more UEs 115 of the wireless communications system 400, information associated with the determined sidelink transmission groups 415. In this regard, the base station 105-c may indicate which sidelink transmission group 415 each of the UEs 115 belongs to. The information associated with the determined sidelink transmission groups 415 may include, but is not limited to, a group identifier associated with the respective sidelink transmission groups 415, destination identifiers and/or source identifiers associated with each UE 115 within the respective sidelink transmission group 415, or any combination thereof. For example, in cases where the base station 105-c determines the UE 115-i, UE 115-k, and UE 115-1 are included within the first sidelink transmission group 415-a, the base station 105-c may transmit, to the UE 115-i, UE 115-k, and/or UE 115-1, an indication of the group identifier associated with the sidelink transmission group 415-a, a source identifier associated with the UE 115-i, UE 115-k, and UE 115-1, a destination identifier associated with the UE 115-i, UE 115-k, and UE 115-1, or any combination thereof.

The base station 105-c may transmit, to one or more UEs 115 of the wireless communications system 400, resource allocations to be used by the UEs 115 to transmit and/or receive the broadcast transmissions. The resource allocations may include sets of time resources, sets of frequency resources, sets of spatial resources, or any combination thereof. In some aspects, the base station 105-c may transmit the resource allocations based on determining the MCSs and/or threshold MCS, categorizing the UEs 115, determining the sidelink transmission groups 415, transmitting the indications of direct-receiving UEs/sidelink-receiving UEs, transmitting the indications of the information associated with the sidelink transmission groups 415 (e.g., group identifiers, destination identifiers, source identifiers), or any combination thereof.

For example, the base station 105-c may transmit a first resource allocation to the UE 115-i and a second resource allocation to the UE 115-j, where the first and second resource allocations are to be used by the UE 115-i and UE 115-j, respectively, to receive the broadcast transmissions from the base station 105-c. Similarly, the base station 105-c may transmit a third resource allocation to the UE 115-i and a fourth resource allocation to the UE 115-j, where the third and fourth resource allocations are to be used by the UE 115-i and UE 115-j, respectively, to transmit the broadcast transmissions to the other UEs 115 within the respective sidelink transmission groups 415. Moreover, in some cases, the base station 105-c may transmit additional resource allocations to one or more of the UEs 115 of the second subset of UEs 115 (e.g., UEs 115-k through UE 115-o), where the additional resource allocations are to be used by each of the respective UEs 115 for receiving the broadcast transmissions from the UE 115-i and UE 115-j.

In some aspects, the base station 105-c may transmit the broadcast transmissions to the first subset of UEs 115. For example, in cases where the UE 115-i and UE 115-j are categorized into the first subset of UEs 115, the base station 105-c may transmit the broadcast transmissions to the UE 115-i and UE 115-j. In some aspects, the base station 105-c may transmit the broadcast transmissions based on (e.g., in accordance with) the indications of direct-receiving UEs 115 and/or sidelink-receiving UEs 115. Additionally or alternatively, the base station 105-c may transmit the broadcast transmissions to the first subset of UEs 115 based on determining the MCSs and/or threshold MCS, categorizing the UEs 115, determining the sidelink transmission groups, transmitting the resource allocations, or any combination thereof. For example, the base station 105-c may transmit the broadcast transmissions, and the first subset of UEs 115 may receive the broadcast transmissions, using the resource allocations indicated to the first subset of UEs 115.

In some aspects, each UE 115 of the first subset of UEs 115 (e.g., UE 115-i and UE 115-j) may determine one or more target parameters for transmitting the broadcast transmissions to the second subset of UEs 115 (e.g., UE 115-k through UE 115-o, respectively). Parameters for transmitting the broadcast transmissions to the second subset of UEs 115 may include, but are not limited to, a target data rate, a target MCS, or both. In some aspects, the first subset of UEs 115 may determine the one or more parameters based on the determined channel qualities between each of the UE 115-i and UE 115-j and the other UEs 115 within each of the respective sidelink transmission groups 415.

For example, the UE 115-i may determine a target data rate for transmitting the sidelink transmissions to the second subset of UEs 115 (e.g., UE 115-k and UE 115-1) within the sidelink transmission group 415-a. The target data rate may include a data rate which satisfies a threshold data rate. By way of another example, the UE 115-i may determine a target MCS for transmitting the sidelink transmissions to the second subset of UEs 115 (e.g., UE 115-k and UE 115-1) within the sidelink transmission group 415-a. In this example, the target MCS may include an MCS which allows for sidelink communications with a threshold quantity and/or threshold percentage of UEs 115 of the second subset of UEs 115 within the sidelink transmission group 415-a. In this regard, the UE 115-i may select the target MCS as a percentile of the MCS pool (e.g., a $50^{th}$ or $100^{th}$ percentile) of the second subset of UEs 115 within the sidelink transmission group 415-a, thus allowing for sidelink communications with the determined percentile of the second subset of UEs 115 within the sidelink transmission group 415-a. However, as noted previously herein, there may be a tradeoff between coverage and data rate, where a lower target MCS may improve coverage but may reduce the data rate, while a higher target MCS may reduce coverage but may improve the data rate.

Additionally or alternatively, each UE 115 of the first subset of UEs 115 (e.g., UE 115-i and UE 115-j) may determine a set of resources for transmitting the broadcast transmissions to the second subset of UEs 115 (e.g., UE 115-k through UE 115-o) within each of the respective sidelink transmission groups 415. The set of resources (e.g., set of sidelink resources) may include a set of time resources, a set of frequency resources, a set of spatial resources, or any combination thereof. In cases where the UEs 115 of the first subset of UEs 115 are to transmit the broadcast transmissions to each UE 115 of the second subset of UEs 115 via unicast transmissions (e.g., unicast signaling), the UEs 115 may select the set (or subset) of resources which will achieve the highest data rate. Comparatively, in cases where the UEs 115 of the first subset of UEs 115 are to transmit the broadcast transmissions to each UE 115 of the second subset of UEs 115 via groupcast transmissions or broadcast transmissions, the UEs 115 may select the set (or subset) of resources by weighing effects of data rate and coverage, as will be discussed in further detail herein.

In some aspects, each UE 115 of the first subset of UEs 115 (e.g., UE 115-i and UE 115-j) may determine the set of resources for transmitting the broadcast transmissions to the second subset of UEs 115 within the respective sidelink transmission groups 415 based on determining the channel qualities between respective UEs 115, receiving the resource allocations from the base station 105-c, receiving the broadcast transmissions from the base station 105-c, determining the target parameters for the sidelink transmissions, or any combination thereof.

For example, the UE 115-i may receive a resource allocation from the base station 105-c, where the resource allocation is to be used by the UE 115-i for transmitting the broadcast transmissions to the UE 115-k and UE 115-1. In this example, the UE 115-i may determine at least a subset of the resource allocation which may include (e.g., exhibit, match, exceed) the target data rate determined by the UE 115-i for transmitting the broadcast transmissions. In this regard, the UE 115-i may determine at least a subset of the resource allocation which includes a data rate which satisfies (e.g., is greater than or equal to) the determined target data rate. By way of another example, the UE 115-i may determine a channel quality between the UE 115-i and the UE 115-k, UE 115-1, or both. The channel quality may include a maximum MCS for communications between the UE 115-i and each of the respective UE 115-k and UE 115-1. In this example, the UE 115-i may determine a set of sidelink resources for transmitting the broadcast transmissions to the UE 115-k and UE 115-1 based on the determined channel qualities (e.g., determined maximum MCSs).

Upon determining the target parameters, the sets of sidelink resources, or both, the first subset of UEs 115 (e.g., UE 115-i and UE 115-j) may transmit the broadcast transmissions to the second subset of UEs 115 (e.g., UE 115-k through UE 115-o) within each of the respective sidelink transmission groups 415 via sidelink connections 410-a through 410-e. For example, the first subset of UEs 115 may transmit sidelink transmissions to the second subset of UEs 115, where the sidelink transmissions include the broadcast information received from the base station 105-c. The sidelink transmissions including the broadcast information may be transmitted using unicast techniques, groupcast techniques, broadcast techniques, or any combination thereof. Each of the first set of UEs 115 may transmit the broadcast transmissions to the second subset of UEs 115 within each respective sidelink transmission group via unicast transmissions, groupcast transmissions, and/or broadcast transmissions.

For example, the UE 115-i may determine a target data rate, target MCS, set of sidelink resources, or any combination thereof, for transmitting the broadcast transmissions, and may transmit the broadcast transmissions to the UE 115-k and/or UE 115-1 based on (e.g., using, according to) the determined target data rate, target MCS, and/or set of sidelink resources. By way of another example, the UE 115-j may determine a target data rate, target MCS, set of sidelink resources, or any combination thereof, for transmitting the broadcast transmissions, and may transmit the broadcast transmissions to the UE 115-m, UE 115-n, and/or UE 115-o based on (e.g., using, according to) the determined target data rate, target MCS, and/or set of sidelink resources.

Techniques described herein may enable more efficient and reliable distribution of broadcast transmissions. In particular, by categorizing UEs 115 subscribed to receive broadcast transmissions according to MCSs associated with the respective UEs 115, a base station 105 of the wireless communications system 300 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115, further improving broadcast distribution within the wireless communications system 300.

In some aspects, one or more UEs 115 of the wireless communications system 300 may transmit a report including an indication UE capabilities of the respective UE 115. Parameters associated with UE capabilities may include a number of antennas or antenna panels configured at the UE 1115, supported processing power (e.g., the number of processor or processor units, power capabilities, memory including processor and other memory, etc.), full duplexing or half duplexing capability, time or frequency domain duplexing capability, or a combination of these. For example, the UE 115-$i$ may transmit a report including an indication of parameters associated with UE capabilities, and the UE 115-$k$ may transmit a report including an indication of the UE capabilities. In some aspects, the UEs 115 may transmit reports to the base station 105-$c$ indicating parameters associated with UE capabilities based on subscribing to receive broadcast transmissions from the base station 105-$c$, exchanging the A-CSI requests and/or channel quality reports between other UEs 115, or any combination thereof. In some aspects, the reports indicating the parameters associated with UE capabilities associated with the respective UEs 115 may be transmitted via UCI, RRC, or MAC-CE signaling.

The base station 105-$c$ may determine a threshold UE capability (e.g., Capability Thresh) which will be used to categorize the UEs 115. In some aspects, the base station 105-$c$ may determine the threshold UE capability based on identifying UEs 115 subscribed to receive broadcast transmissions from the base station 105-$c$, receiving the reports indicating parameters associated UE capabilities and/or channel qualities between UEs 115, or any combination thereof. In some aspects, the base station 105-$c$ may determine the threshold UE capability based on a time delay budget reported by the UE for transmitting the broadcast transmissions, a data rate requirement for transmitting the broadcast transmissions, channel qualities, or a combination of these.

In some aspects, the base station 105-$c$ may categorize the UEs 115 into the first and second subsets of UEs 115 based on identifying UEs 115 subscribed to receive broadcast transmissions from the base station 105-$c$, receiving the reports indicating parameters associated with UE capabilities and/or channel qualities between UEs 115, determining the threshold UE capability, or any combination thereof.

For example, the base station 105-$c$ may categorize the UEs 115 into the first and second subsets of UEs 115 based on determined UE capabilities (e.g., a capability metric) associated with each of the respective UEs 115. In this regard, the base station 105-$c$ may categorize the UEs 115 based on receiving the reports indicating parameters associated with UE capabilities for with each of the respective UEs 115. Specifically, the base station 105-$c$ may categorize the UEs 115 into the first and second subsets of UEs 115 based on whether or not a UE capability metric associated with each of the respective UE 115 satisfies the threshold UE capability. For example, the base station 105-$c$ may categorize the UE 115-$i$ and the UE 115-$j$ into a first subset of UEs 115 which are to receive broadcast transmissions from the base station 105-$d$ via direct link communications (e.g., via direct links 405-$a$ and direct link 405-$b$, respectively) based on determining that the UE capabilities associated with the UE 115-$i$ and UE 115-$j$ satisfy the threshold UE capability. For instance, the base station 105-$c$ may categorize the UE 115-$i$ and UE 115-$j$ into the first subset of UEs 115 based on determining that the UE capabilities associated with the UE 115-$i$ and UE 115-$j$ are each greater than or equal to the threshold UE capability (e.g., threshold UE capability satisfied based on Capability$_{UE}$≥Capability$_{Thresh}$).

Conversely, the base station 105-$c$ may categorize the UEs 115-$k$ through UE 115-$o$ into a second subset of UEs 115 which are to receive broadcast transmissions via sidelink communications (e.g., via sidelink connections 410-$a$ through 410-$e$) from the first subset of UEs 115 based on determining that the UE capability metrics associated with the UEs 115-$k$ through UE 115-$o$ fail to satisfy the threshold UE capability. For instance, the base station 105-$c$ may categorize the UEs 115-$k$ through UE 115-$o$ into the second subset of UEs 115 based on determining that the UE capabilities associated with the UEs 115-$k$ through UE 115-$o$ are each less than the threshold UE capability (e.g., threshold UE capability not satisfied based on Capability$_{UE}$<Capability$_{Thresh}$).

In some aspects, the base station 105-$c$ may determine sidelink transmission groups based on identifying the UEs 115 subscribed to receive broadcasts from the base station 105-$c$, receiving the reports indicating parameters associated with UE capabilities and/or channel qualities between UEs 115, determining the threshold UE capability, categorizing the UEs 115 into the respective subsets, or any combination thereof.

In some aspects, the base station 105-$c$ may transmit the broadcast transmissions based on (e.g., in accordance with) the indications of direct-receiving UEs 115 and/or sidelink-receiving UEs 115. Additionally or alternatively, the base station 105-$c$ may transmit the broadcast transmissions to the first subset of UEs 115 based on determining or receiving the UE capabilities and/or threshold UE capability, categorizing the UEs 115, determining the sidelink transmission groups, transmitting the resource allocations, or any combination thereof. For example, the base station 105-$c$ may transmit the broadcast transmissions, and the first subset of UEs 115 may receive the broadcast transmissions, using the resource allocations indicated to the first subset of UEs 115.

Techniques described herein may enable more efficient and reliable distribution of broadcast transmissions. In particular, by categorizing UEs 115 subscribed to receive broadcast transmissions according to UE capabilities associated with the respective UEs 115, a base station 105 of the wireless communications system 300 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115, further improving broadcast distribution within the wireless communications system 400.

In some aspects, the UEs 115, the base station 105-$c$, or any combination thereof, may determine distances between the respective UEs 115. In particular, the UEs 115 and/or base station 105-$c$ may determine distances between each of the UEs 115 within each respective UE clusters 415. UEs 115 within each UE cluster 415 may determine distances to other UEs 115 by performing measurements (e.g., received signal strength indication (RSSI) measurements, RSRP measurements, RSRQ measurements, SNR measurements, SINR measurements) on SRSs or other signals received from other UEs 115.

In some aspects, the UEs 115 and/or the base station 105-c may determine an average distance (or median distance) between each UE 115 and the remaining UEs 115 within each respective UE cluster 415. For example, the UEs 115 and/or the base station 105-c may determine a distance between the UE 115-i and the UE 115-k and UE 115-1, respectively, and may determine an average distance between the UE 115-i and the remaining UEs 115 of the UE cluster 415-a. Average distances between each of the UE 115-k and the UE 115-1 to other UEs 115 within the UE cluster 415 may similarly be calculated. Moreover, average distances between each of the UEs 115 of the UE cluster 415-b and the other UEs 115 of the UE cluster 415-b may similarly be determined. In some aspects, each UE 115 may determine an average distance between the UE 115 and the remaining UEs 115 within the respective UE cluster 415 by performing measurements on signals received from the remaining UEs 115. Additionally, the UEs 115 may each communicate determined average distances to the other UEs 115 within the respective UE cluster 415 by transmitting a report indicating the determined average distance. In this regard, UEs 115 within each UE cluster 415 may be configured to compare the determined average distances between UEs 115 by comparing their own determined average distance with average distances of other UEs 115 indicated in the received reports.

In some aspects, the UEs 115 of each respective UE cluster 415 may self-select categorizations (e.g., categorizations of direct-receiving UEs 115 and sidelink-receiving UEs 115) for each respective UE cluster 415, and may transmit categorization information to the base station 105-c. For example, the UEs 115 of the first UE cluster 415-a may determine the UE 115-is to be included in the first subset of UEs 115 (e.g., direct-receiving UE 115), and the UE 115-k and UE 115-1 are to be included in the second subset of UEs 115 (e.g., sidelink-receiving UEs 115). In this example, the UE 115-i, UE 115-k, and/or UE 115-1 may transmit categorization information to the base station 105-c. The categorization information may include an indication of the first subset of UEs 115 of the UE cluster 415-a (e.g., indication of the UE 115-i), an indication of the second subset of UEs 115 of the UE cluster 415-a (e.g., indication of UE 115-k and/or UE 115-1), or both.

In some aspects, one or more UEs 115 of the wireless communications system 300 may transmit a report including an indication of an average traffic associated with communications between the base station 105-c and the respective UE 115. For example, the UE 115-i may transmit a report including an indication of an average traffic associated with communications between the base station 105-c and the UE 115-i, and the UE 115-k may transmit a report including an indication of an average traffic load associated with communications between the base station 105-c and the UE 115-k. In some aspects, the UEs 115 may transmit reports to the base station 105-c indicating the average traffic loads based on subscribing to receive broadcast transmissions from the base station 105-c, exchanging the A-CSI requests and/or channel quality reports between other UEs 115, or any combination thereof. In some aspects, the average traffic load may correspond to an average throughput, an average buffer size, or both during some predetermined time period. For example, the time period may be defined based on the time since the last report of the traffic load, some set time period, or the like.

In some aspects, the base station 105-c may determine a maximum traffic load associated with each UE 115 subscribed to receive broadcasts from the base station 105-c. The base station 105-c may additionally determine a threshold traffic load (e.g., $TrafficLoad_{Thresh}$) which will be used to categorize the UEs 115. In some aspects, the base station 105-c may determine the maximum traffic load and/or threshold traffic load-based on identifying UEs 115 subscribed to receive broadcast transmissions from the base station 105-c, receiving the reports indicating traffic loads and/or channel qualities between UEs 115, or any combination thereof. In some aspects, the base station 105-c may determine the threshold traffic load-based on a maximum time delay (e.g., a time delay budget) for transmitting the broadcast transmissions, a data rate requirement for transmitting the broadcast transmissions, channel conditions, or a combination thereof.

In some aspects, the base station 105-c may categorize the UEs 115 (e.g., UEs 115-i through UE 115-o) into a first subset of UEs 115 that is to receive the broadcast transmissions via direct link communications from the base station 105-c, and into a second subset of UEs 115 that is to receive the broadcast transmissions via sidelink communications from the first subset of UEs 115. In some aspects, the base station 105-c may categorize the UEs 115 into the first and second subsets of UEs 115 based on identifying UEs 115 subscribed to receive broadcast transmissions from the base station 105-c, receiving the reports indicating traffic loads and/or channel qualities between UEs 115, determining the threshold traffic load, or any combination thereof.

For example, the base station 105-c may categorize the UEs 115 into the first and second subsets of UEs 115 based on determined traffic loads associated with each of the respective UEs 115. Specifically, the base station 105-c may categorize the UEs 115 into the first and second subsets of UEs 115 based on whether or not an average traffic load associated with each of the respective UE 115 satisfies the threshold traffic load. For example, the base station 105-c may categorize the UE 115-i and the UE 115-j into a first subset of UEs 115 which are to receive broadcast transmissions from the base station 105-h via direct link communications (e.g., via direct links 405-a and direct link 405-b, respectively) based on determining that the traffic loads associated with the UE 115-i and UE 115-j satisfy the threshold traffic load. For instance, the base station 105-c may categorize the UE 115-i and UE 115-j into the first subset of UEs 115 based on determining that the traffic loads associated with the UE 115-i and UE 115-j are each less than or equal to the threshold traffic load (e.g., threshold traffic load satisfied based on $TrafficLoad_{UE} \leq TrafficLoad_{Thresh}$). In some cases, the various UEs 115 may periodically report the traffic load indications. The indication of the traffic load may be transmitted via an uplink control information message, a MAC-CE message, a buffer status report, or a combination of these.

Conversely, the base station 105-c may categorize the UEs 115-k through UE 115-o into a second subset of UEs 115 which are to receive broadcast transmissions via sidelink communications (e.g., via sidelink connections 410-a through 410-e) from the first subset of UEs 115 based on determining that the traffic loads associated with the UEs 115-k through UE 115-o fail to satisfy the threshold traffic load. For instance, the base station 105-c may categorize the UEs 115-k through UE 115-o into the second subset of UEs 115 based on determining that the traffic loads associated with the UEs 115-*k* through UE 115-*o* are each greater than the threshold traffic load (e.g., threshold traffic load not satisfied based on TrafficLoad$_{UE}$>TrafficLoad$_{Thresh}$).

In some cases, the base station 105-*c* may determine one or more sidelink transmission groups for 415 distribution of the broadcast transmissions. For example, the base station 105-*c* may determine a first sidelink transmission group 415-*a* and a second sidelink transmission group 415-*b*. In some aspects, each sidelink transmission group 415 may include one or more UEs 115 from the first subset of UEs 115 (e.g., one or more direct-receiving UEs 115) and one or more UEs 115 from the second subset of UEs 115 (e.g., one or more sidelink-receiving UEs 115). In this regard, each sidelink transmission group 415 may indicate which UEs 115 of the second subset of UEs 115 (e.g., which sidelink-receiving UEs 115) are to receive the broadcast transmissions from which UEs 115 of the first subset of UEs 115 (e.g., which direct-receiving UEs 115). In some aspects, the base station 105-*c* may determine the sidelink transmission groups based on identifying the UEs 115 subscribed to receive broadcasts from the base station 105-*c*, receiving the reports indicating traffic loads and/or channel qualities between UEs 115, determining a threshold traffic loads, categorizing the UEs 115 into the respective subsets, or any combination thereof. As described, as the UEs 115 may periodically report the traffic loads (e.g., via uplink control information, MAC-CE, or buffer status report)< the base station 105-*c* may periodically recategorize the UEs 115 in respective subsets such as to maintain a traffic load balance between the UEs.

The base station 105-*c* may transmit, to one or more UEs 115 of the wireless communications system 400, resource allocations to be used by the UEs 115 to transmit and/or receive the broadcast transmissions. The resource allocations may include sets of time resources, sets of frequency resources, sets of spatial resources, or any combination thereof. In some aspects, the base station 105-*c* may transmit the resource allocations based on determining the traffic loads and/or threshold traffic loads, categorizing the UEs 115, determining the sidelink transmission groups 415, transmitting the indications of direct-receiving UEs/sidelink-receiving UEs, transmitting the indications of the information associated with the sidelink transmission groups 415 (e.g., group identifiers, destination identifiers, source identifiers), or any combination thereof.

Techniques described herein may enable more efficient and reliable distribution of broadcast transmissions. In particular, by categorizing UEs 115 subscribed to receive broadcast transmissions according to traffic loads associated with the respective UEs 115, a base station 105 of the wireless communications system 300 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and traffic loads for transmitting broadcast transmissions to other UEs 115, further improving broadcast distribution within the wireless communications system 300.

Figure 5:
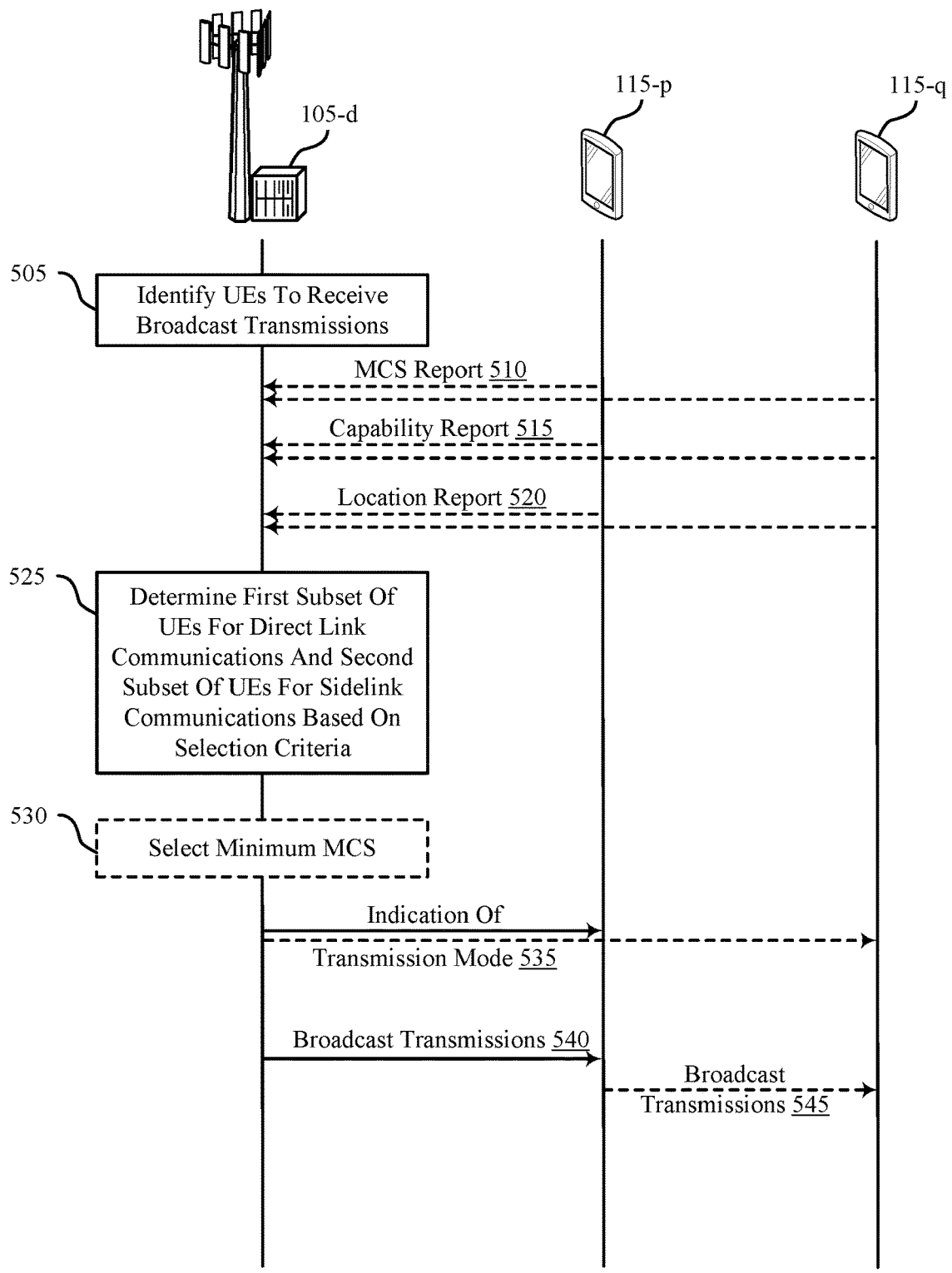
FIG. 5 illustrates an example of a process flow that supports UE group selection for direct link or sidelink packet transmission in broadcast in accordance with aspects of the present disclosure.

FIG. 5 illustrates an example of a process flow 500 that supports UE group selection for direct link or sidelink packet transmission in broadcast in accordance with aspects of the present disclosure. In some examples, process flow 500 may implement aspects of wireless communications system 100, wireless communications system 200, wireless communications system 300, or wireless communications system 400. The process flow 500 may illustrate an example of a base station 105, such as base station 105-*d*, determining a subset of UEs (e.g., including UE 115-*p*) for direct link communications and another subset of UEs 115 (e.g., including UE 115-*q*) for sidelink communications, then transmitting broadcast transmissions to the UEs 115. Alternative examples of the following may be implemented, where some processes are performed in a different order than described or are not performed. In some cases, processes may include additional features not mentioned below, or further processes may be added.

At 505, one or more UEs 115 may subscribe to receive broadcast transmissions from base station 105-*d*. In some cases, base station 105-*d* may identify UE 115-*p* and UE 115-*q* are subscribed to receive broadcast transmissions including packets of data.

At 510, base station 105-*d* may receive a report (e.g., a CSI report) from each UE 115 in a coverage area associated with base station 105-*d*. For example, base station 105-*d* may receive a report from UE 115-*p* and UE 115-*q* comprising a maximum MCS for communicating between UE 115-*p* and base station 105-*d* and UE 115-*q* and base station 105-*d*.

At 515, base station 105-*d* may receive an indication of a capability, such as a power capability or the like, from each UE 115 in a coverage area, including UE 115-*p* and UE 115-*q*. In some cases, the capability may include a data rate, a processing power, a full duplex power, a half duplex power, a TDD power, an FDD power, or a combination.

At 520, base station 105-*d* may receive an indication of a location from each UE 115 in a coverage area, including UE 115-*p* and UE 115-*q*. For example, UE 115-*p* and UE 115-*q* may transmit a location report to base station 105-*d*.

At 525, base station 105-*d* may determine that a first subset of UEs 115 is to receive the broadcast transmissions via direct link communications from base station 105-*d* and that a second subset of UEs 115 is to receive packets from the broadcast transmissions via sidelink communications from the first subset of UEs based on a selection criteria. For example, UE 115-*p* may be in the first subset of UEs 115 so may receive the broadcast transmissions via a direct link between base station 105-*d* and UE 115-*p*, while UE 115-*q* may be in the second subset of UEs 115 so may receive the packets from the broadcast transmission from other UEs 115 via a sidelink connection between base station 105-*d* and UE 115-*q*.

In some cases, base station 105-*d* may determine the first subset of UEs 115 based on the MCS from each of the first subset of UEs 115. In some examples, base station 105-*d* may determine a distance between each UE 115 in the first subset of UEs 115 and base station 105-*d* satisfies a threshold distance. Base station 105-*d* may determine the distance based on the location report at 520. In some cases, base station 105-*d* may determine one or more clusters of UEs 115. Base station 105-*d* may determine a UE 115 in each cluster of UEs 115 is included within the first subset of UEs 115, while a remainder of UEs 115 within each cluster of UEs 115 are included within the second subset of UEs 115. In some cases, base station 105-*d* may determine the clusters based on the location of each UE 115, where the UE 115 included within the first subset of UEs 115 from each cluster is the central UE 115 to the cluster. In some other cases, base station 105-*d* may determine the clusters based on a signal quality measured at each UE 115, where the UE 115 included within the first subset of UEs 115 from each cluster has a better than average signal quality (e.g., the best signal quality of the UEs 115 in the cluster).

In some cases, base station 105-*d* may determine the capability for each UE 115 in the first subset of UEs 115 (e.g., a power capability received in the capability report at 515), such as UE 115-*p*, satisfies a threshold capability. In some examples, base station 105-*d* may determine a traffic load for each UE 115. Base station 105-*d* may determine the traffic load for each UE 115 in the first subset of UEs 115 (e.g., including UE 115-*p*) satisfies a threshold traffic load. In some examples, the selection criteria for selecting the first subset of UEs 115 and the second subset of UEs 115 may be a combination of the threshold MCS, the threshold distance, a threshold relative location, the threshold power capability, the threshold traffic load, or a combination.

At 530, base station 105-*d* may select a minimum MCS from among the maximum MCS from each of the first subset of UEs 115 for transmitting the broadcast transmissions to the first subset of UEs 115 (e.g., to UE 115-*p*).

At 535, base station 105-*d* may transmit an indication that the packets from the broadcast transmissions are to be received via the direct link communications or the sidelink communications to UE 115-*p*, UE 115-*q*, or both. In some cases, UE 115-*q* may refrain from monitoring a direct link with base station 105-*d* based on the indication. In some cases, base station 105-*d* may transmit control information to UE 115-*p*, UE 115-*q*, or both (i.e., to at least one of the first subset of UEs 115 or the second subset of UEs 115) via a MAC-CE, DCI, a WUS, or a combination. The control information may correspond to the broadcast transmissions.

At 540, base station 105-*d* may transmit the broadcast transmissions to the first subset of UEs 115, including UE 115-*p*. At 545, UE 115-*p* may transmit the packets from the broadcast transmissions to UE 115-*q* via the sidelink communications using a unicast transmission technique, a groupcast transmission technique, a broadcast transmission technique, or a combination.

Figure 6:
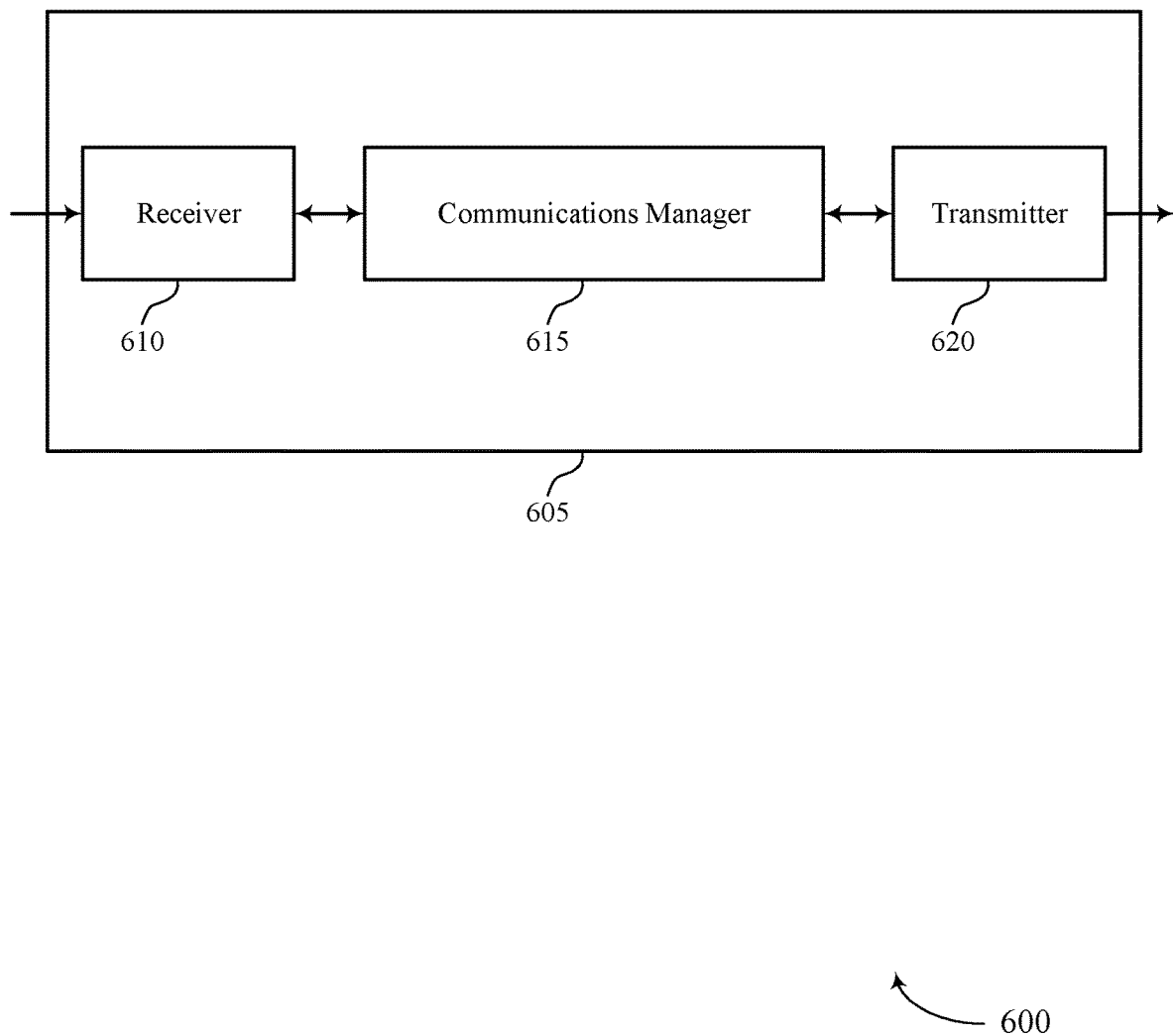
FIGS. 6 and 7 show block diagrams of devices that support UE group selection for direct link or sidelink packet transmission in broadcast in accordance with aspects of the present disclosure.

FIG. 6 shows a block diagram 600 of a device 605 that supports UE group selection for direct link or sidelink packet transmission in broadcast in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to UE group selection for direct link or sidelink packet transmission in broadcast, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may subscribe, to a base station, to receive broadcast transmissions from the base station, receive, from the base station, an indication that the broadcast transmissions are to be received via either direct link communications from the base station or via sidelink communications from a first subset of UEs receiving the broadcast transmissions via the direct link communications from the base station, and receive the broadcast transmissions in accordance with the indication. The communications manager 615 may be an example of aspects of the communications manager 910 described herein.

The actions performed by the communications manager 615 as described herein may be implemented to realize one or more potential advantages. One implementation may enable a base station to divide UEs into subsets based on a communication mode (e.g., communicating via a direct link or sidelink connection). Dividing the UEs may allow the base station to send the broadcast transmissions via a direct link to UEs selected based on a selection criteria, which may reduce signaling overhead (e.g., related to unnecessary packet duplication), among other advantages.

Based on selecting UEs for subsets corresponding to transmission modes as described herein, a processor of a UE or base station (e.g., a processor controlling the receiver 610, the communications manager 615, the transmitter 620, or a combination thereof) may reduce the impact or likelihood of inefficient resource utilization related to broadcast transmissions while ensuring relatively efficient communications. For example, the base station may leverage selection criteria such as an MCS value, distance, traffic load, power capability, relative location, or the like to determine UEs for direct link communications and sidelink communications, thereby reducing signaling overhead by improving the signal quality for direct link communications (e.g., using a higher MCS value), which may improve latency associated with retransmissions, among other benefits.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
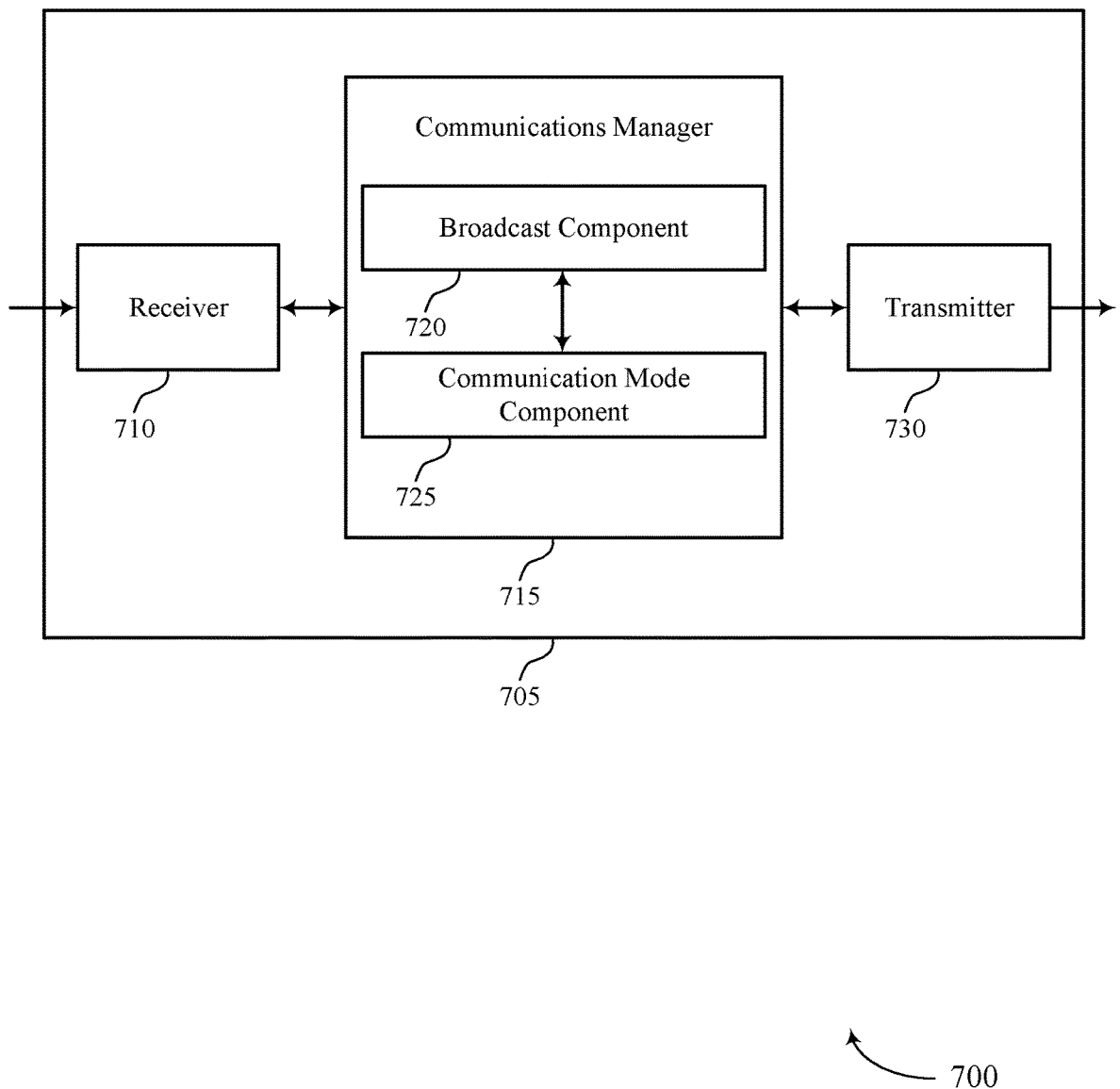

FIG. 7 shows a block diagram 700 of a device 705 that supports UE group selection for direct link or sidelink packet transmission in broadcast in accordance with aspects of the present disclosure. The device 705 may be an example of aspects of a device 605, or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to UE group selection for direct link or sidelink packet transmission in broadcast, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a broadcast component 720 and a communication mode component 725. The communications manager 715 may be an example of aspects of the communications manager 910 described herein.

The broadcast component 720 may subscribe, to a base station, to receive broadcast transmissions from the base station. The communication mode component 725 may receive, from the base station, an indication that the broadcast transmissions are to be received via either direct link communications from the base station or via sidelink communications from a first subset of UEs receiving the broadcast transmissions via the direct link communications from the base station. The broadcast component 720 may receive the broadcast transmissions in accordance with the indication.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
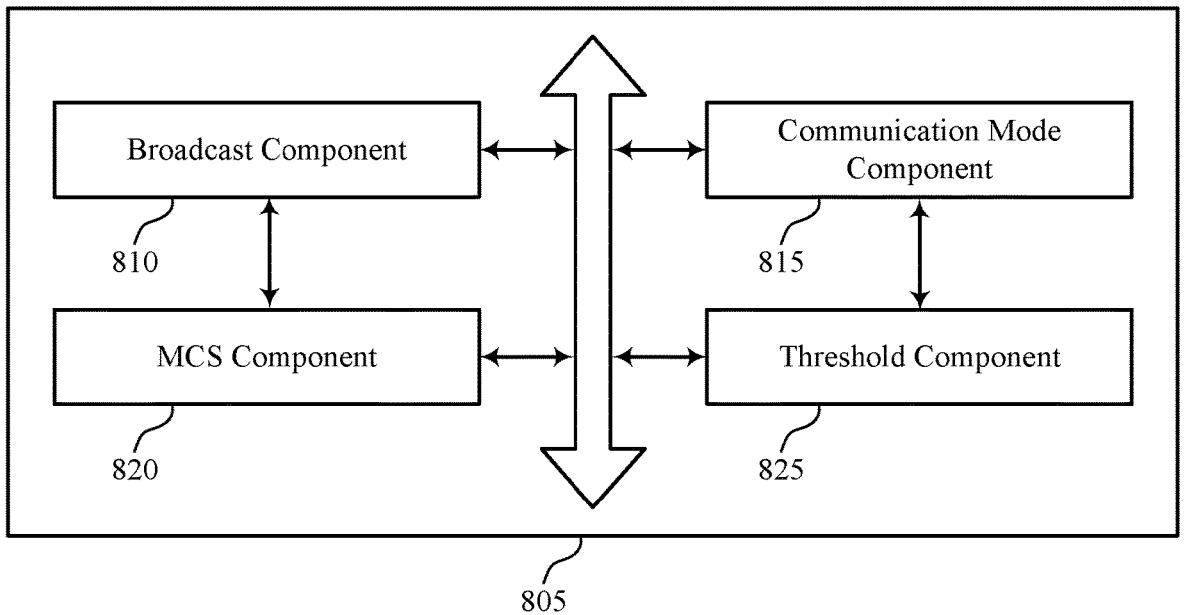
FIG. 8 shows a block diagram of a communications manager that supports UE group selection for direct link or sidelink packet transmission in broadcast in accordance with aspects of the present disclosure.

FIG. 8 shows a block diagram 800 of a communications manager 805 that supports UE group selection for direct link or sidelink packet transmission in broadcast in accordance with aspects of the present disclosure. The communications manager 805 may be an example of aspects of a communications manager 615, a communications manager 715, or a communications manager 910 described herein. The communications manager 805 may include a broadcast component 810, a communication mode component 815, a MCS component 820, and a threshold component 825. Each of these modules may communicate, directly or indirectly, with one another (e.g., via one or more buses).

The broadcast component 810 may subscribe, to a base station, to receive broadcast transmissions from the base station. The MCS component 820 may transmit, to the base station, a report including a maximum MCS for communicating between the base station and the UE. The threshold component 825 may transmit, to the base station, a message including a power capability associated with the UE, where the power capability includes a data rate, a processing power, a full duplex power, a half duplex power, a time division duplex power, a frequency division duplex power, or a combination thereof.

In some examples, the broadcast component 810 may receive, from the base station, control information via a MAC-CE, DCI, a WUS, or a combination thereof, the control information corresponding to the broadcast transmissions. The communication mode component 815 may receive, from the base station, an indication that the broadcast transmissions are to be received via either direct link communications from the base station or via sidelink communications from a first subset of UEs receiving the broadcast transmissions via the direct link communications from the base station.

In some examples, the broadcast component 810 may receive the broadcast transmissions in accordance with the indication. In some examples, the MCS component 820 may receive the broadcast transmissions based on the reported MCS. In some examples, the communication mode component 815 may receive, from the base station, the broadcast transmissions via the direct link communications based on the indication. In some examples, the communication mode component 815 may transmit, to one or more UEs, the broadcast transmissions via the sidelink communications using a unicast transmission technique, a groupcast transmission technique, a broadcast transmission technique, or a combination. In some examples, the communication mode component 815 may receive, from a UE in the first subset of UEs, the broadcast transmissions via the sidelink communications.

Figure 9:
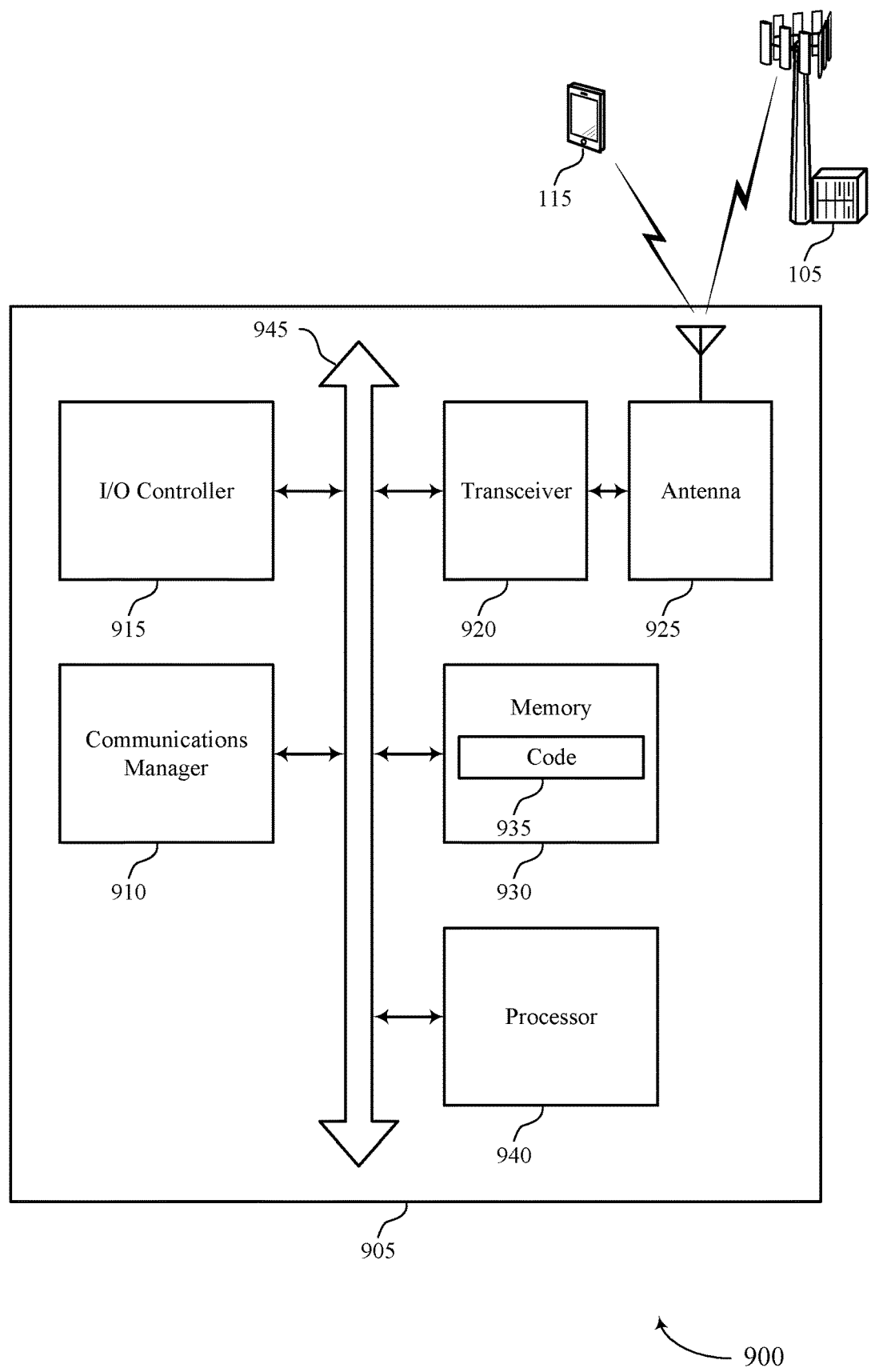
FIG. 9 shows a diagram of a system including a device that supports UE group selection for direct link or sidelink packet transmission in broadcast in accordance with aspects of the present disclosure.

FIG. 9 shows a diagram of a system 900 including a device 905 that supports UE group selection for direct link or sidelink packet transmission in broadcast in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may subscribe, to a base station, to receive broadcast transmissions from the base station, receive, from the base station, an indication that the broadcast transmissions are to be received via either direct link communications from the base station or via sidelink communications from a first subset of UEs receiving the broadcast transmissions via the direct link communications from the base station, and receive the broadcast transmissions in accordance with the indication.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting UE group selection for direct link or sidelink packet transmission in broadcast).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
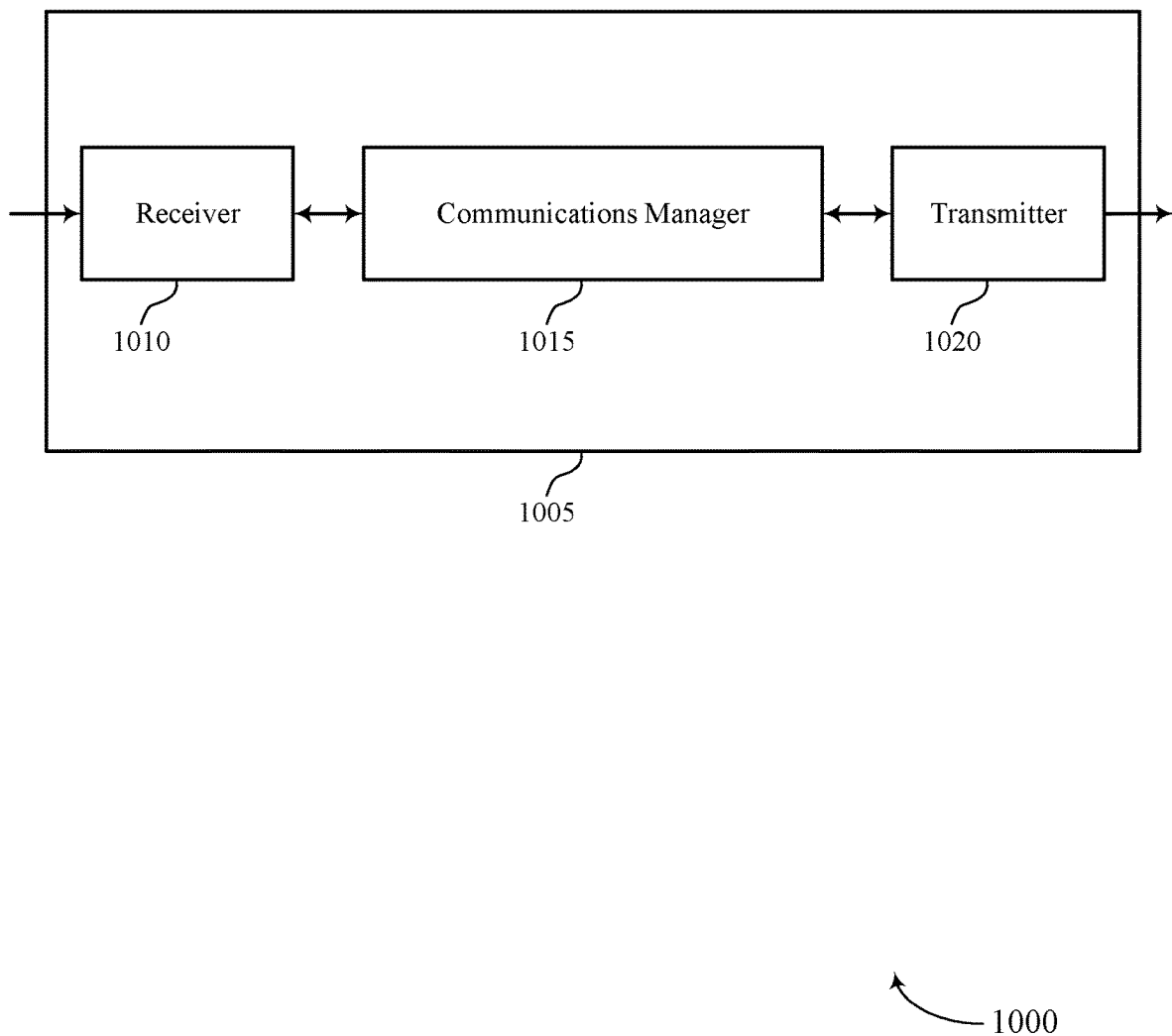
FIGS. 10 and 11 show block diagrams of devices that support UE group selection for direct link or sidelink packet transmission in broadcast in accordance with aspects of the present disclosure.

FIG. 10 shows a block diagram 1000 of a device 1005 that supports UE group selection for direct link or sidelink packet transmission in broadcast in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to UE group selection for direct link or sidelink packet transmission in broadcast, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a set of UEs subscribed to receive broadcast transmissions from the base station, determine, based on a selection criteria, that a first subset of UEs of the set of UEs is to receive the broadcast transmissions via direct link communications from the base station and that a second subset of UEs of the set of UEs is to receive the broadcast transmissions via sidelink communications from the first subset of UEs, transmit, to at least one of the first subset of UEs or the second subset of UEs, an indication that the broadcast transmissions are to be received via either the direct link communications or the sidelink communications, and transmit the broadcast transmissions to the first subset of UEs. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
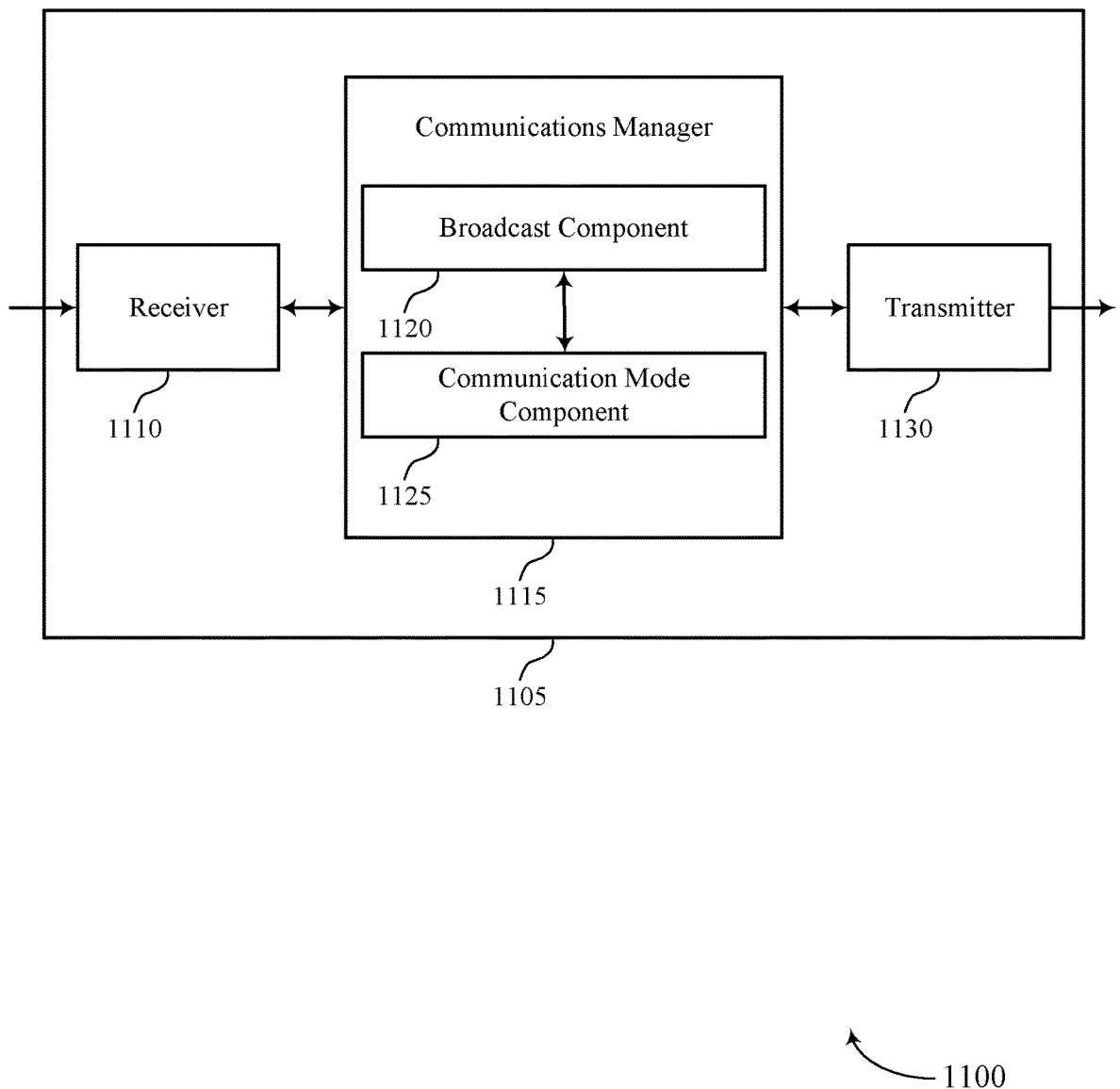

FIG. 11 shows a block diagram 1100 of a device 1105 that supports UE group selection for direct link or sidelink packet transmission in broadcast in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to UE group selection for direct link or sidelink packet transmission in broadcast, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a broadcast component 1120 and a communication mode component 1125. The communications manager 1115 may be an example of aspects of the communications manager 1310 described herein.

The broadcast component 1120 may identify a set of UEs subscribed to receive broadcast transmissions from the base station. The communication mode component 1125 may determine, based on a selection criteria, that a first subset of UEs of the set of UEs is to receive the broadcast transmissions via direct link communications from the base station and that a second subset of UEs of the set of UEs is to receive the broadcast transmissions via sidelink communications from the first subset of UEs and transmit, to at least one of the first subset of UEs or the second subset of UEs, an indication that the broadcast transmissions are to be received via either the direct link communications or the sidelink communications. The broadcast component 1120 may transmit the broadcast transmissions to the first subset of UEs.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
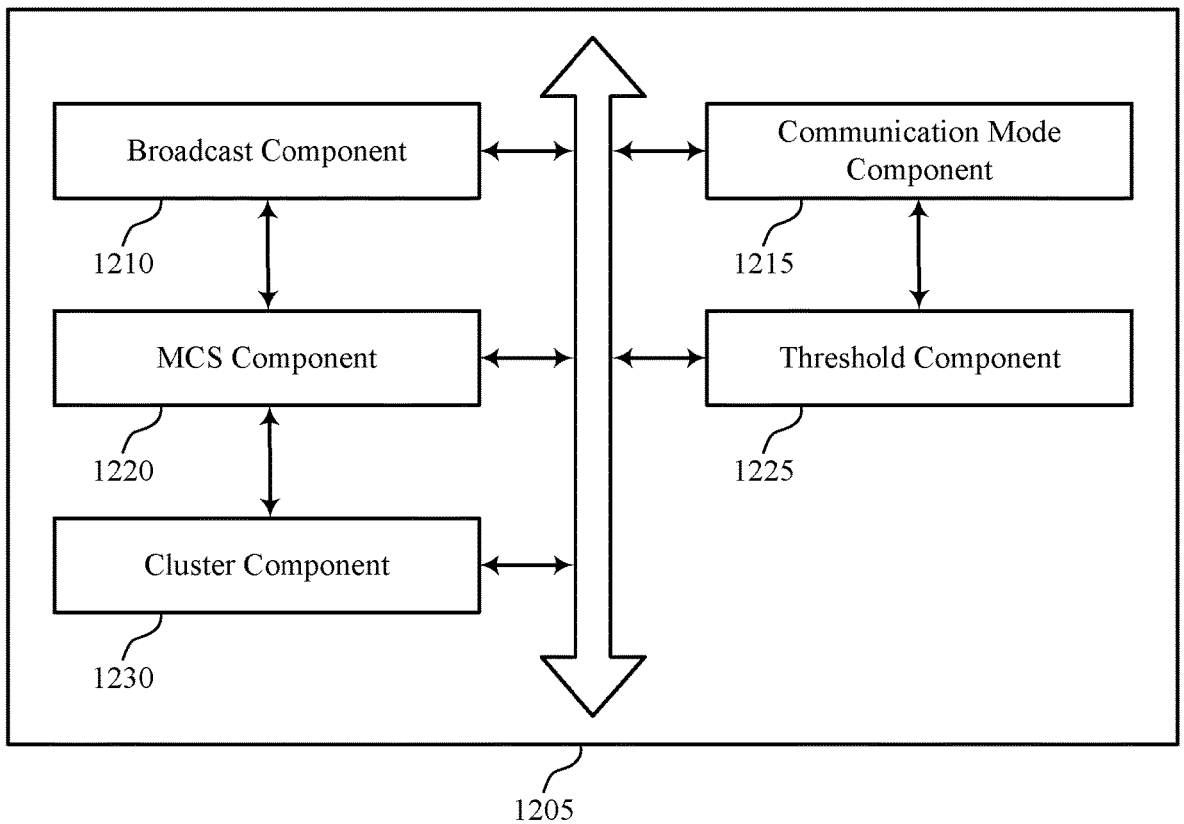
FIG. 12 shows a block diagram of a communications manager that supports UE group selection for direct link or sidelink packet transmission in broadcast in accordance with aspects of the present disclosure.

FIG. 12 shows a block diagram 1200 of a communications manager 1205 that supports UE group selection for direct link or sidelink packet transmission in broadcast in accordance with aspects of the present disclosure. The communications manager 1205 may be an example of aspects of a communications manager 1015, a communications manager 1115, or a communications manager 1310 described herein. The communications manager 1205 may include a broadcast component 1210, a communication mode component 1215, a MCS component 1220, a threshold component 1225, and a cluster component 1230. Each of these modules may communicate, directly or indirectly, with one another (e.g., via one or more buses).

The broadcast component 1210 may identify a set of UEs subscribed to receive broadcast transmissions from the base station. The communication mode component 1215 may determine, based on a selection criteria, that a first subset of UEs of the set of UEs is to receive the broadcast transmissions via direct link communications from the base station and that a second subset of UEs of the set of UEs is to receive the broadcast transmissions via sidelink communications from the first subset of UEs.

The MCS component 1220 may receive, from each UE of the set of UEs, a report including a maximum MCS for communicating between the base station and respective UEs. In some examples, the MCS component 1220 may select, for the first subset of UEs, a minimum MCS from among the maximum MCSs of each of the first subset of UEs. In some examples, the threshold component 1225 may determine the first subset of UEs based on the maximum MCS associated with each of the first subset of UEs, where the selection criteria includes a threshold MCS.

The threshold component 1225 may determine that a distance between each UE in the first subset of UEs and the base station satisfies a threshold distance, where the selection criteria includes the threshold distance.

In some examples, the threshold component 1225 may receive, from each UE of the set of UEs, a message including a power capability associated with the UE, where the power capability includes a data rate, a processing power, a full duplex power, a half duplex power, a time division duplex power, a frequency division duplex power, or a combination thereof. In some examples, the threshold component 1225 may determine that the power capability for each UE in the first subset of UEs satisfies a threshold power capability, where the selection criteria includes the threshold power capability.

In some examples, the threshold component 1225 may determine a traffic load for each UE of the set of UEs. In some examples, determining that the traffic load for each UE of the first subset of UEs satisfies a threshold traffic load, where the selection criteria includes the threshold traffic load.

The cluster component 1230 may determine a set of clusters of UEs of the set of UEs. In some examples, the cluster component 1230 may determine that a first UE of each cluster of UEs is included within the first subset of UEs, while a remainder of UEs within each cluster of UEs are included within the second subset of UEs. In some cases, the clusters of UEs are determined based on a location of each UE of the set of UEs, and where the first UE of each cluster of UEs is a central UE to each cluster of UEs. In some cases, the clusters of UEs are determined based on a signal quality measured at each UE of the set of UEs, and where the first UE of each cluster of UEs has a signal quality better than an average signal quality determined based on the signal quality measured at each UE of the set of UEs.

In some cases, the selection criteria includes a threshold MCS, a threshold distance, a threshold relative location, a threshold power capability, a threshold traffic load, or a combination thereof.

In some examples, the communication mode component 1215 may transmit, to at least one of the first subset of UEs or the second subset of UEs, an indication that the broadcast transmissions are to be received via either the direct link communications or the sidelink communications. In some examples, the broadcast component 1210 may transmit, to at least one of the first subset of UEs or the second subset of UEs, control information via a MAC-CE, DCI, a WUS, or a combination thereof, the control information corresponding to the broadcast transmissions. In some examples, the broadcast component 1210 may transmit the broadcast transmissions to the first subset of UEs.

Figure 13:
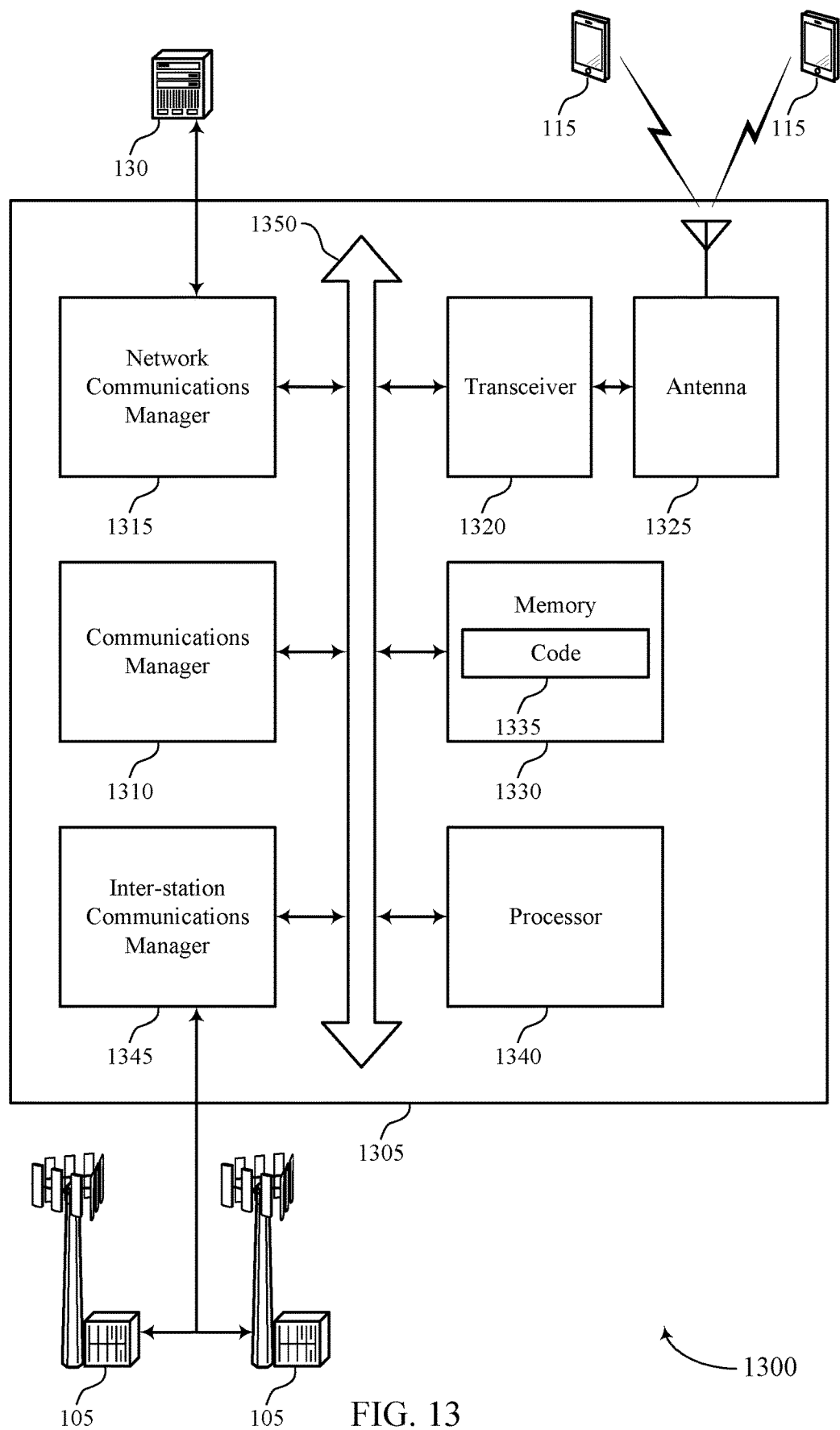
FIG. 13 shows a diagram of a system including a device that supports UE group selection for direct link or sidelink packet transmission in broadcast in accordance with aspects of the present disclosure.

FIG. 13 shows a diagram of a system 1300 including a device 1305 that supports UE group selection for direct link or sidelink packet transmission in broadcast in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a set of UEs subscribed to receive broadcast transmissions from the base station, determine, based on a selection criteria, that a first subset of UEs of the set of UEs is to receive the broadcast transmissions via direct link communications from the base station and that a second subset of UEs of the set of UEs is to receive the broadcast transmissions via sidelink communications from the first subset of UEs, transmit, to at least one of the first subset of UEs or the second subset of UEs, an indication that the broadcast transmissions are to be received via either the direct link communications or the sidelink communications, and transmit the broadcast transmissions to the first subset of UEs.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting UE group selection for direct link or sidelink packet transmission in broadcast).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
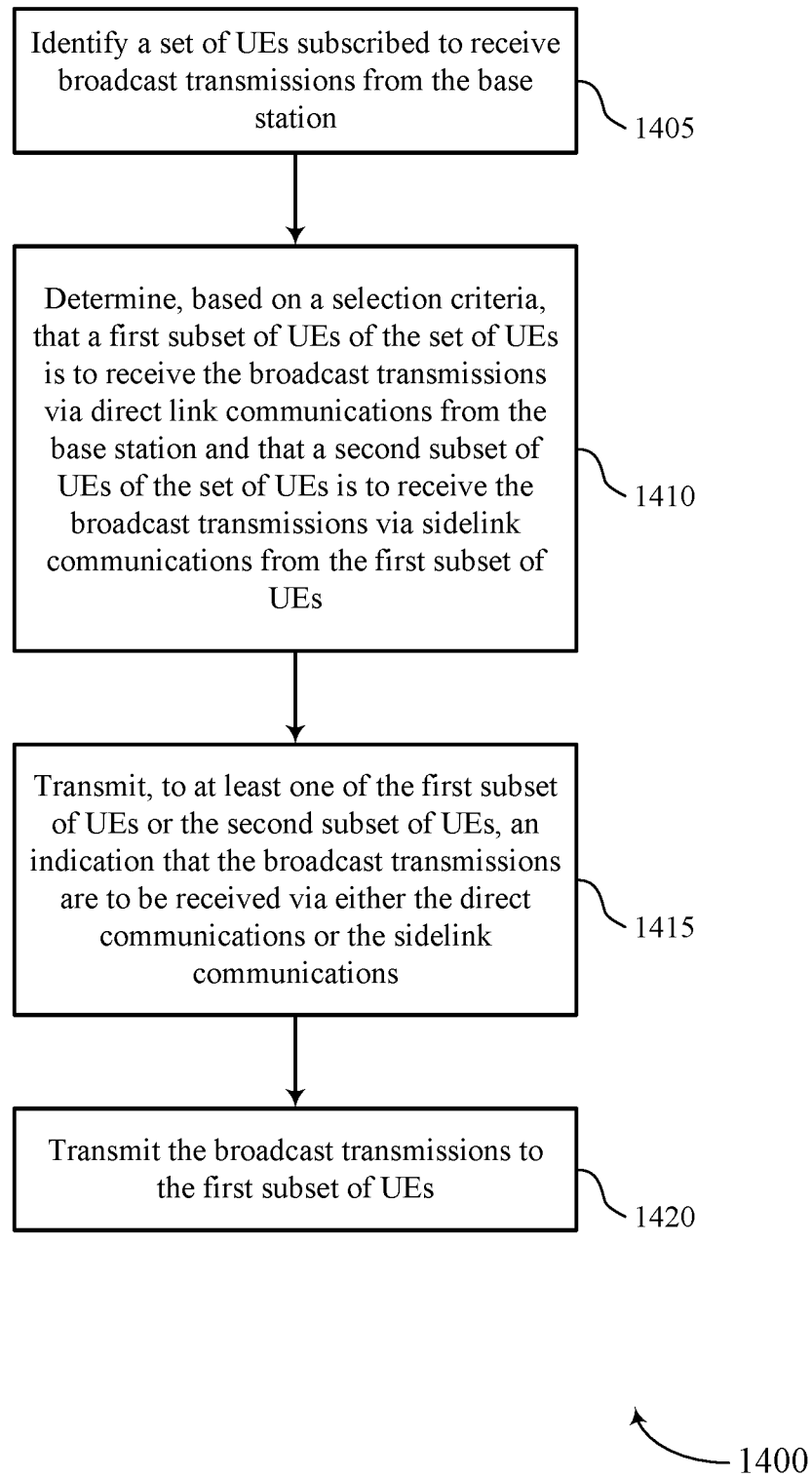
FIGS. 14 through 17 show flowcharts illustrating methods that support UE group selection for direct link or sidelink packet transmission in broadcast in accordance with aspects of the present disclosure.

FIG. 14 shows a flowchart illustrating a method 1400 that supports UE group selection for direct link or sidelink packet transmission in broadcast in accordance with aspects of the present disclosure. The operations of method 1400 may be implemented by a base station 105 or its components as described herein. For example, the operations of method 1400 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1405, the base station may identify a set of UEs subscribed to receive broadcast transmissions from the base station. The operations of 1405 may be performed according to the methods described herein. In some examples, aspects of the operations of 1405 may be performed by a broadcast component as described with reference to FIGS. 10 through 13.

At 1410, the base station may determine, based on a selection criteria, that a first subset of UEs of the set of UEs is to receive the broadcast transmissions via direct link communications from the base station and that a second subset of UEs of the set of UEs is to receive the broadcast transmissions via sidelink communications from the first subset of UEs. The operations of 1410 may be performed according to the methods described herein. In some examples, aspects of the operations of 1410 may be performed by a communication mode component as described with reference to FIGS. 10 through 13.

At 1415, the base station may transmit, to at least one of the first subset of UEs or the second subset of UEs, an indication that the broadcast transmissions are to be received via either the direct link communications or the sidelink communications. The operations of 1415 may be performed according to the methods described herein. In some examples, aspects of the operations of 1415 may be performed by a communication mode component as described with reference to FIGS. 10 through 13.

At 1420, the base station may transmit the broadcast transmissions to the first subset of UEs. The operations of 1420 may be performed according to the methods described herein. In some examples, aspects of the operations of 1420 may be performed by a broadcast component as described with reference to FIGS. 10 through 13.

Figure 15:
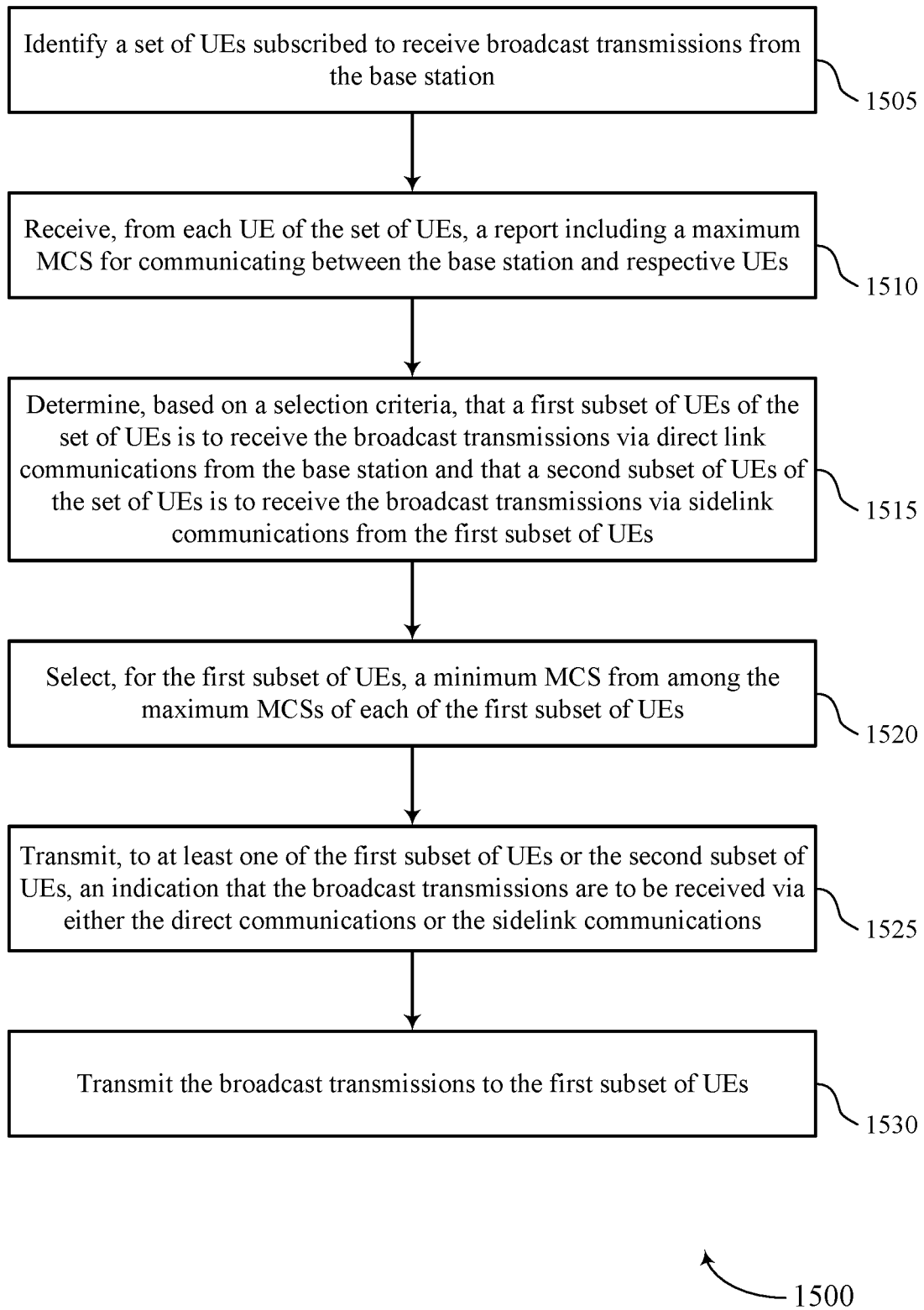

FIG. 15 shows a flowchart illustrating a method 1500 that supports UE group selection for direct link or sidelink packet transmission in broadcast in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may identify a set of UEs subscribed to receive broadcast transmissions from the base station. The operations of 1505 may be performed according to the methods described herein. In some examples, aspects of the operations of 1505 may be performed by a broadcast component as described with reference to FIGS. 10 through 13.

At 1510, the base station may receive, from each UE of the set of UEs, a report including a maximum MCS for communicating between the base station and respective UEs. The operations of 1510 may be performed according to the methods described herein. In some examples, aspects of the operations of 1510 may be performed by an MCS component as described with reference to FIGS. 10 through 13.

At 1515, the base station may determine, based on a selection criteria, that a first subset of UEs of the set of UEs is to receive the broadcast transmissions via direct link communications from the base station and that a second subset of UEs of the set of UEs is to receive the broadcast transmissions via sidelink communications from the first subset of UEs. The operations of 1515 may be performed according to the methods described herein. In some examples, aspects of the operations of 1515 may be performed by a communication mode component as described with reference to FIGS. 10 through 13.

At 1520, the base station may select, for the first subset of UEs, a minimum MCS from among the maximum MCSs of each of the first subset of UEs. The operations of 1520 may be performed according to the methods described herein. In some examples, aspects of the operations of 1520 may be performed by an MCS component as described with reference to FIGS. 10 through 13.

At 1525, the base station may transmit, to at least one of the first subset of UEs or the second subset of UEs, an indication that the broadcast transmissions are to be received via either the direct link communications or the sidelink communications. The operations of 1525 may be performed according to the methods described herein. In some examples, aspects of the operations of 1525 may be performed by a communication mode component as described with reference to FIGS. 10 through 13.

At 1530, the base station may transmit the broadcast transmissions to the first subset of UEs. The operations of 1530 may be performed according to the methods described herein. In some examples, aspects of the operations of 1530 may be performed by a broadcast component as described with reference to FIGS. 10 through 13.

Figure 16:
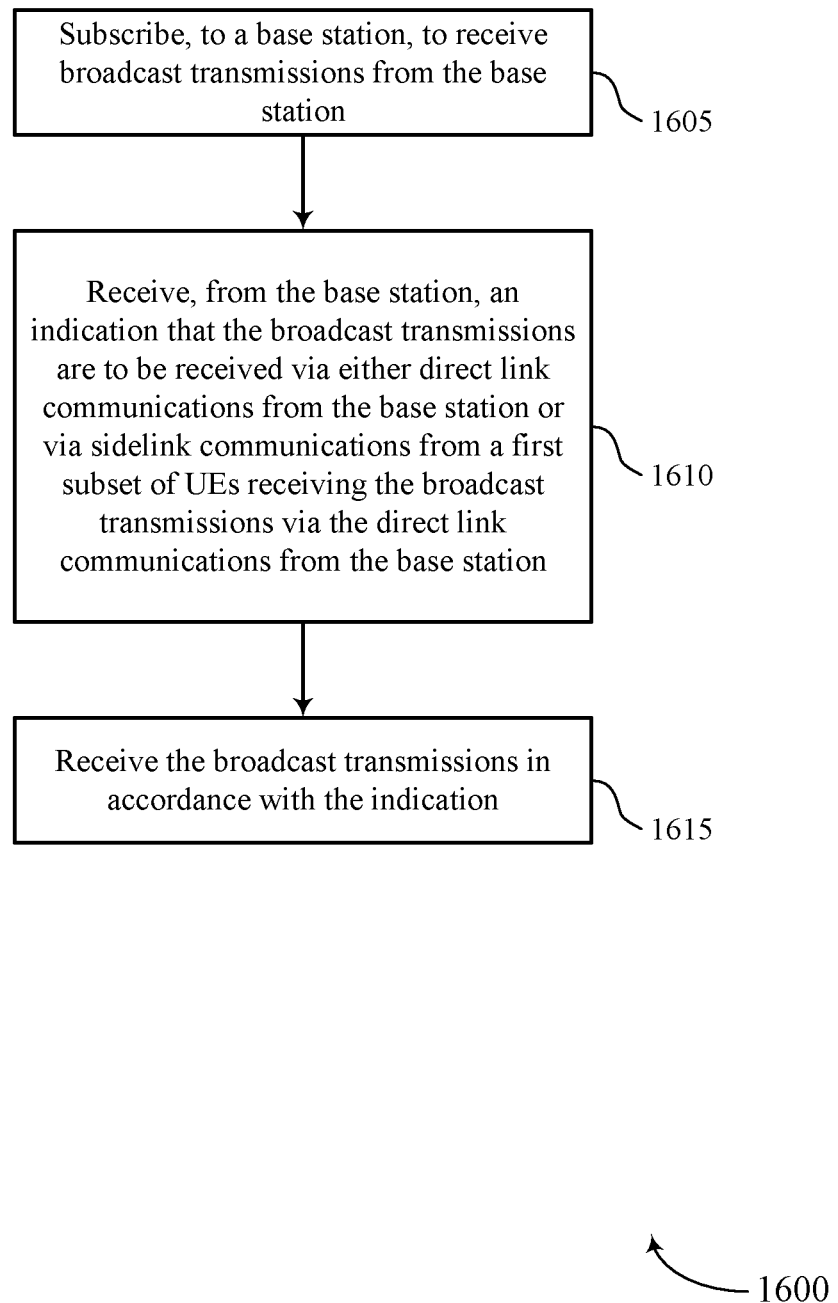

FIG. 16 shows a flowchart illustrating a method 1600 that supports UE group selection for direct link or sidelink packet transmission in broadcast in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may subscribe, to a base station, to receive broadcast transmissions from the base station. The operations of 1605 may be performed according to the methods described herein. In some examples, aspects of the operations of 1605 may be performed by a broadcast component as described with reference to FIGS. 6 through 9.

At 1610, the UE may receive, from the base station, an indication that the broadcast transmissions are to be received via either direct link communications from the base station or via sidelink communications from a first subset of UEs receiving the broadcast transmissions via the direct link communications from the base station. The operations of 1610 may be performed according to the methods described herein. In some examples, aspects of the operations of 1610 may be performed by a communication mode component as described with reference to FIGS. 6 through 9.

At 1615, the UE may receive the broadcast transmissions in accordance with the indication. The operations of 1615 may be performed according to the methods described herein. In some examples, aspects of the operations of 1615 may be performed by a broadcast component as described with reference to FIGS. 6 through 9.

Figure 17:
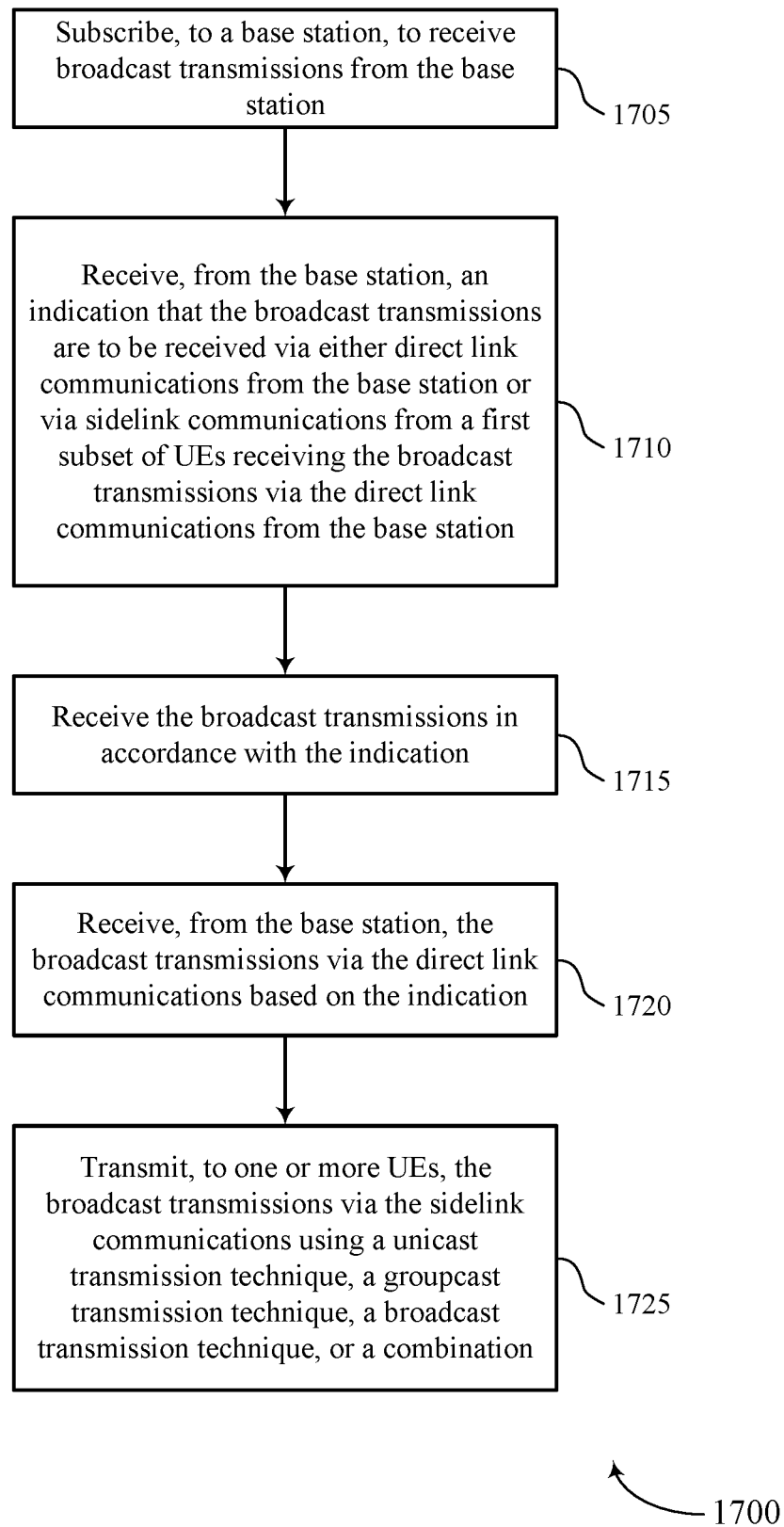

FIG. 17 shows a flowchart illustrating a method 1700 that supports UE group selection for direct link or sidelink packet transmission in broadcast in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may subscribe, to a base station, to receive broadcast transmissions from the base station. The operations of 1705 may be performed according to the methods described herein. In some examples, aspects of the operations of 1705 may be performed by a broadcast component as described with reference to FIGS. 6 through 9.

At 1710, the UE may receive, from the base station, an indication that the broadcast transmissions are to be received via either direct link communications from the base station or via sidelink communications from a first subset of UEs receiving the broadcast transmissions via the direct link communications from the base station. The operations of 1710 may be performed according to the methods described herein. In some examples, aspects of the operations of 1710 may be performed by a communication mode component as described with reference to FIGS. 6 through 9.

At 1715, the UE may receive the broadcast transmissions in accordance with the indication. The operations of 1715 may be performed according to the methods described herein. In some examples, aspects of the operations of 1715 may be performed by a broadcast component as described with reference to FIGS. 6 through 9.

At 1720, the UE may receive, from the base station, the broadcast transmissions via the direct link communications based on the indication. The operations of 1720 may be performed according to the methods described herein. In some examples, aspects of the operations of 1720 may be performed by a communication mode component as described with reference to FIGS. 6 through 9.

At 1725, the UE may transmit, to one or more UEs, the broadcast transmissions via the sidelink communications using a unicast transmission technique, a groupcast transmission technique, a broadcast transmission technique, or a combination. The operations of 1725 may be performed according to the methods described herein. In some examples, aspects of the operations of 1725 may be performed by a communication mode component as described with reference to FIGS. 6 through 9.

Figure 18:
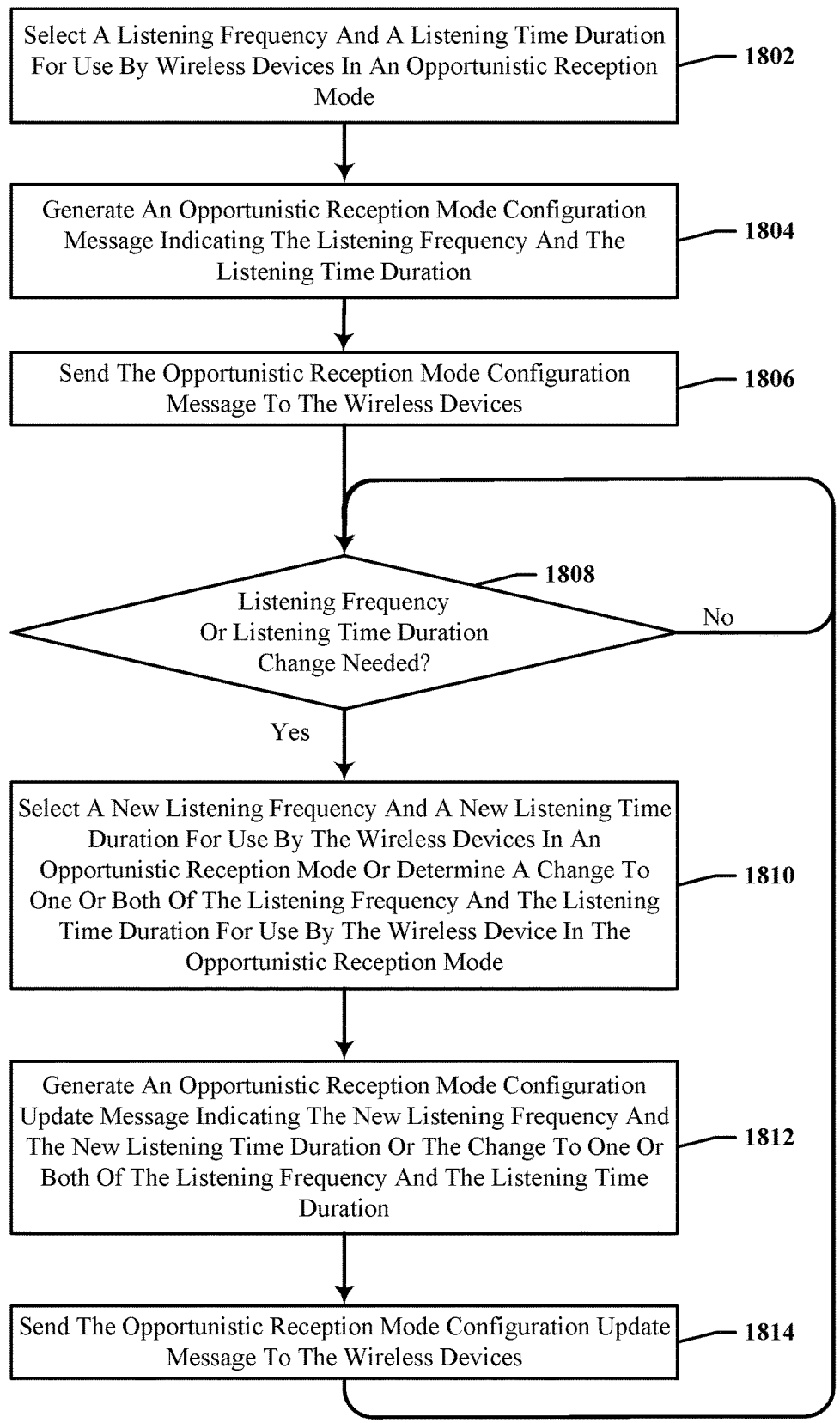
FIGS. 18 and 19 are process flow diagrams illustrating a method for configuring an opportunistic reception mode in accordance with various embodiments.

FIG. 18 shows a process flow diagram illustrating a method 1800 for configuring an opportunistic reception mode in accordance with various embodiments. With reference to FIGS. 1 through 18, the method 1800 may be implemented by a processor of a network computing device (e.g., a base station 105).

In block 1802, the processor may perform operations to select a listening frequency and a listening time duration for use by wireless devices in an opportunistic reception mode. In some embodiments, the network computing device may select a listening frequency and a listening time duration for use by a wireless device that is not selected to receive broadcast packets. The listening frequency may be a time period after which the wireless device should listen for broadcast packets on the broadcast channel. The listening time duration may be a time period for which the wireless device may listen to the broadcast channel. After the listening time duration is completed, the wireless device may enter a sleep mode (e.g., ignore slots dedicated for broadcasting) until the start of the next time period associated with the listening frequency. By listening to the broadcast channel repeatedly at the expiration of each listening frequency period for a limited time corresponding to the listening time duration, the wireless device may discontinuously listen to the broadcast channel in an opportunistic reception mode.

In block 1804, the processor may perform operations to generate an opportunistic reception mode configuration message indicating that the listening frequency and the listening time duration. In some embodiments, the opportunistic reception mode configuration message may be an RRC message.

In block 1806, the processor may perform operations to send the opportunistic reception mode configuration message to the wireless devices. In some embodiments, the opportunistic reception mode configuration message may be sent prior to a network computing device sending broadcast packets. For example, the opportunistic reception mode configuration message may be sent as part of signaling when a wireless device initial enters or camps on a cell being served by the network computing device.

In determination block 1808, the processor may perform operations to determine whether a listening frequency or listening time duration change is needed. For example, a listening frequency or listening time duration change may be needed when a channel condition and/or network setting change occurs.

In response to determining that no change is needed (i.e., determination block 1808="No"), the processor may continue to perform operations to determine whether a listening frequency or listening timer duration change is needed in determination block 1808.

In response to determining that a change is needed (i.e., determination block 1808="Yes"), the processor may perform operation to select a new listening frequency and a new listening time duration for use by the wireless devices in an opportunistic reception mode or determine a change to one or both of the listening frequency and the listening time duration for use by the wireless device in the opportunistic reception mode in block 1810 In some embodiments selecting a new listening frequency and a new listening time duration for use by the wireless devices in an opportunistic reception mode may include selecting a new listening frequency and new listening time duration pair for the opportunistic reception mode. In some embodiments, determining a change to one or both of the listening frequency and the listening time duration for use by the wireless device in the opportunistic reception mode may include adjusting one or both of the listening frequency and the listening time duration.

In block 1812, the processor may perform operations to generate an opportunistic reception mode configuration update message indicating that the new listening frequency and the new listening time duration or the change to one or both of the listening frequency and the listening time duration. As examples, an opportunistic reception mode configuration update message may be a MAC-CE message or a DCI message.

In block 1814, the processor may perform operations to send the opportunistic reception mode configuration update message to the wireless devices.

Figure 19:
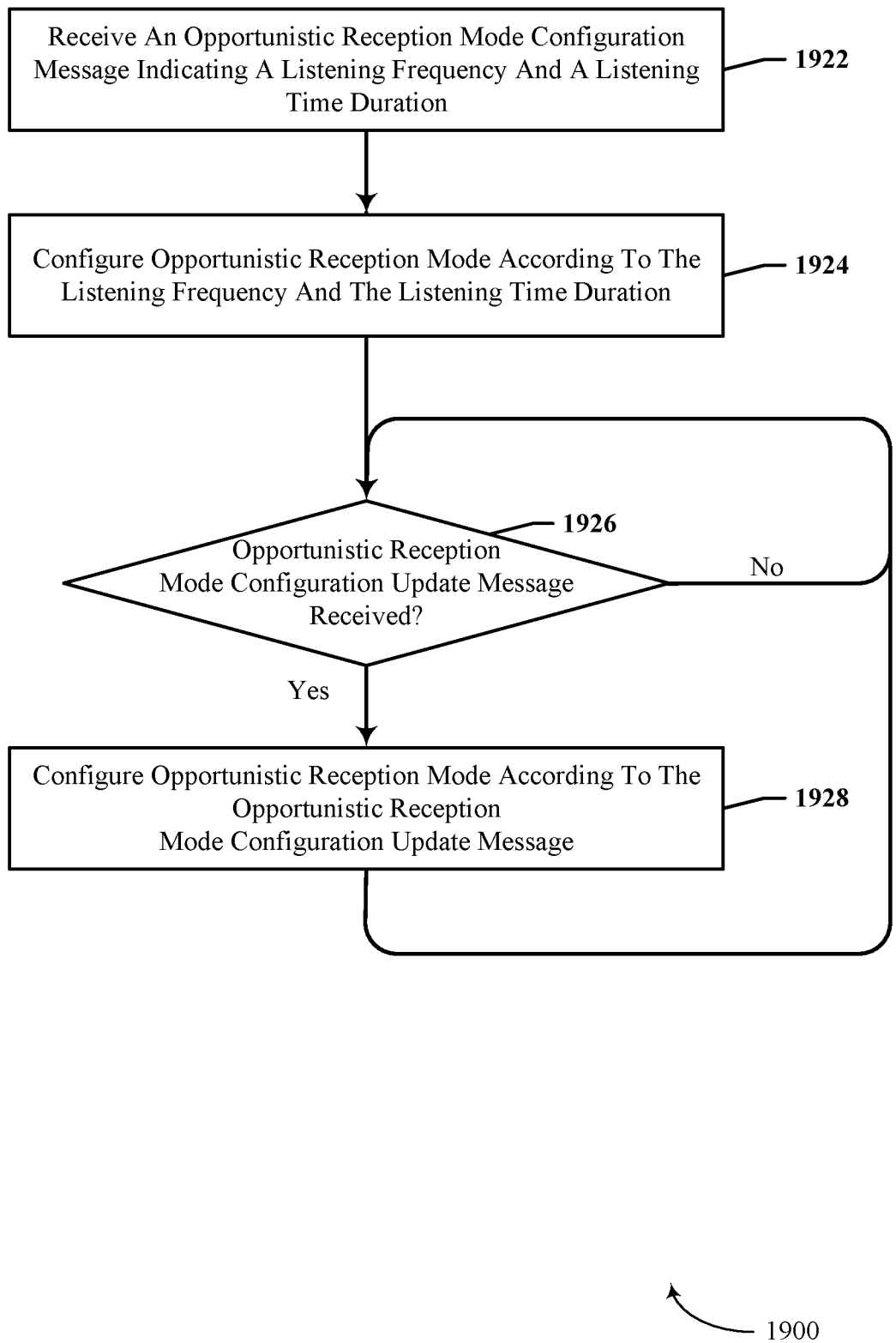

FIG. 19 shows a process flow diagram illustrating a method 1900 for configuring an opportunistic reception mode. With reference to FIGS. 1 through 19, the method 1900 may be implemented by a processor of a wireless device. In some embodiments, the operations of method 1900 may be performed in conjunction with the operations of method 1800 (FIG. 18).

In block 1922, the processor may perform operations to receive an opportunistic reception mode configuration message indicating a listening frequency and a listening time duration. In some embodiments, the opportunistic reception mode configuration message may be received as an RRC message from the network computing device, such as a base station (e.g., a gNB).

In block 1924, the processor may perform operations to configure the opportunistic reception mode according to the listening frequency and the listening time duration. For example, the wireless device may modify its opportunistic reception mode settings to reflect the listening frequency and the listening time duration. The listening frequency may be a time period after which the wireless device should listen for broadcast packets on the broadcast channel. The listening time duration may be a time period for which the wireless device may listen to the broadcast channel. After the listening time duration is completed, the wireless device may enter a sleep mode (e.g., ignore slots dedicated for broadcasting) until the start of the next time period associated with the listening frequency. By listening to the broadcast channel repeatedly at the expiration of each listening frequency period for a limited time corresponding to the listening time duration, the wireless device may discontinuously listen to the broadcast channel in an opportunistic reception mode.

In determination block 1926, the processor may perform operations to determine whether an opportunistic reception mode configuration update message is received. As examples, an opportunistic reception mode configuration update message may be received from a base station (e.g., a gNB) as a MAC-CE message or a DCI message.

In response to not receiving an update message (i.e., determination block 1926="No"), the processor may continue to perform operations to determine whether an opportunistic reception mode configuration update message is received in determination block 1926.

In response to determining that an opportunistic reception mode configuration update message is received (i.e., determination block 1926="Yes"), the processor may configure the opportunistic reception mode according to the opportunistic reception mode configuration update message in block 1928. For example, the wireless device may modify its opportunistic reception mode settings to reflect the listening frequency and the listening time duration indicated in the opportunistic reception mode configuration update message.

Figure 20:
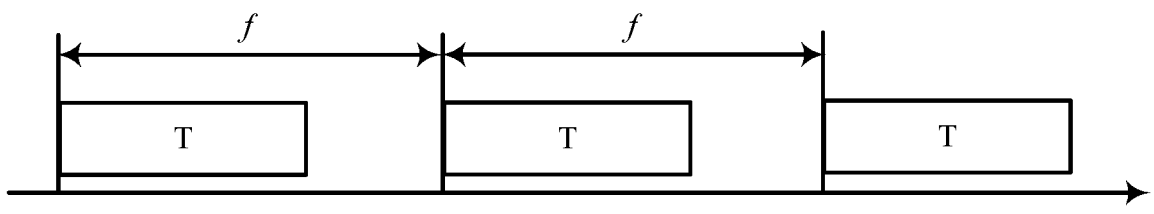
FIG. 20 is a timing diagram illustrating operations by a wireless device to listen to the broadcast channel in an opportunistic reception mode at a listening frequency and for a listening time duration to receive broadcast packets from a network computing device according to various embodiments.
Figure 20:
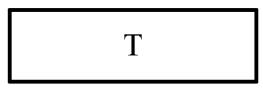

FIG. 20 shows a timing diagram illustrating operations by a wireless device to listen to the broadcast channel in an opportunistic reception mode at a listening frequency and for a listening time duration to receive broadcast packets from a network computing device according to various embodiments. With reference to FIGS. 1 through 20, the wireless device may opportunistically listen to the broadcast channel periodically with a frequency "f" and listen for a certain amount of time "T". The amount of time "T" may be the broadcast listening duration and may correspond to the listening time duration configured by the network computing device, such as a base station 105. The frequency "f" may correspond to the listening frequency configured by the network computing device, such as a base station 105. During the time "T", the wireless device may listen to slots dedicated to the broadcast channel to attempt to receive broadcast packets. During the time outside the broadcast listening duration, e.g., outside the time "T", the wireless device may enter a sleep mode in which slots dedicated to the broadcast channel are ignored.

Figure 21:
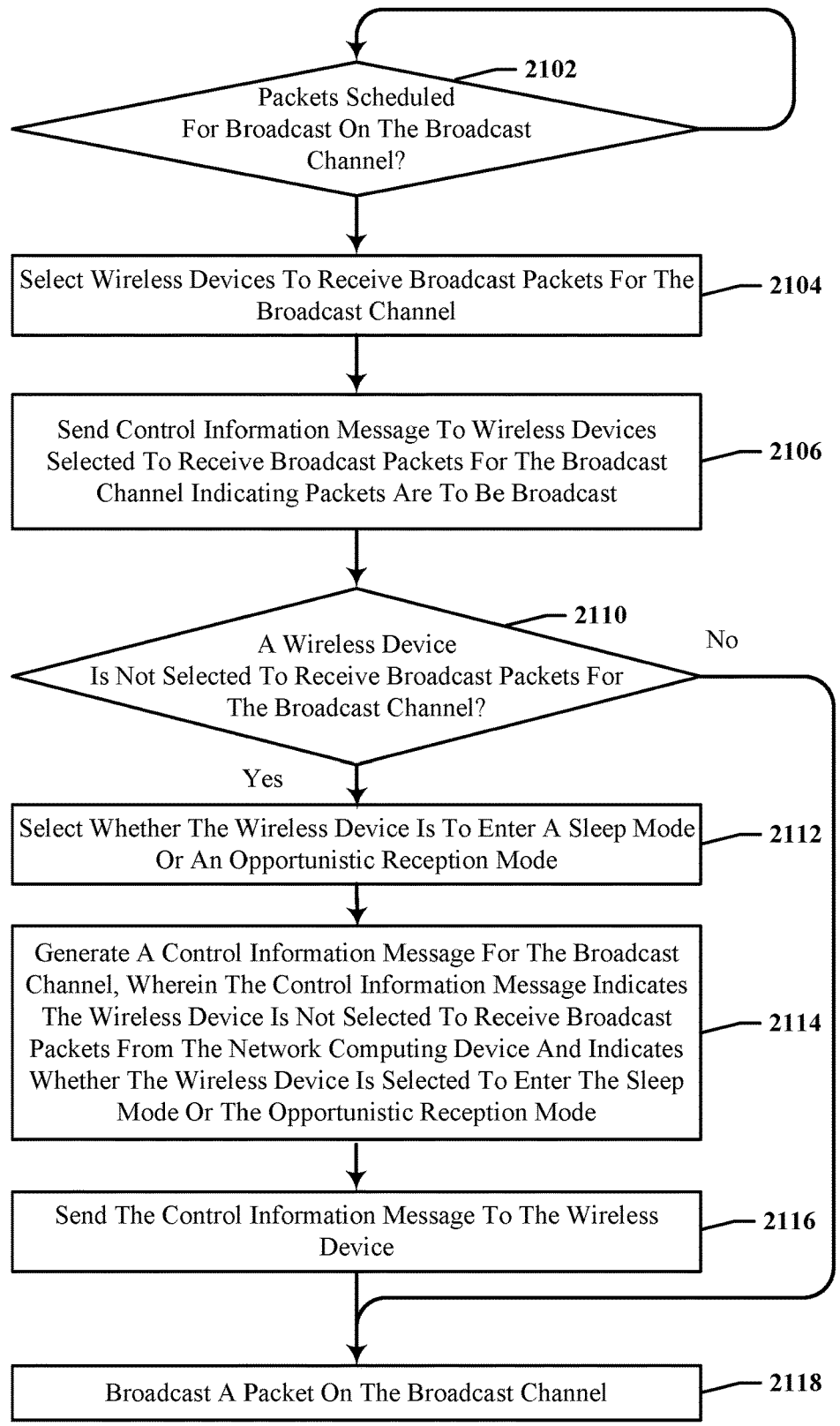
FIGS. 21 through 23, 24A, 24B, and 25 are process flow diagrams illustrating a method for supporting opportunistic broadcast reception in accordance with various embodiments.

FIG. 21 shows a process flow diagram illustrating a method 2100 for supporting opportunistic broadcast reception in accordance with various embodiments. With reference to FIGS. 1 through 21, the method 2100 may be implemented by a processor of a network computing device (e.g., the base station 105). In some embodiments, the operations of method 2100 may be performed in conjunction with the operations of method 1800 (FIG. 18) and/or 1900 (FIG. 19). As one example, the operations of method 2100 may be performed after the operations of method 1800 (FIG. 18).

In determination block 2102, the processor may perform operations to determine whether packets are schedule for broadcast on the broadcast channel. For example, a network device may determine whether data is scheduled to be broadcast to wireless devices in a cell to determine whether packets are schedule for broadcast on the broadcast channel.

In response to determining that packets are not scheduled for broadcast (i.e., determination block 2102="No"), the processor may continue to await packets to be broadcast and perform operation to determine whether packets are schedule for broadcast on the broadcast channel in determination block 2102.

In response to determining that packets are scheduled for broadcast on the broadcast channel (i.e., determination block 2102="Yes"), the processor may perform operations to select wireless devices to receive broadcast packets for the broadcast channel in block 2104. For example, the network computing device may select wireless device with a minimum MCS value to receive broadcast packets for the broadcast channel.

In block 2106, the processor may send a control information message to the wireless devices selected to receive broadcast packets for the broadcast channel indicating packets are to be broadcast. In this manner, the selected wireless devices may be notified packets are to be broadcast in the slots dedicated to the broadcast channel.

In determination block 2110, the processor may perform operations to determine whether a wireless device is not selected to receive broadcast packets for the broadcast channel. For example, the network computing device may determine whether any wireless device with an MCS value below the MCS minimum value was not selected to receive broadcast packets for the broadcast channel.

In response to determining that all wireless devices are selected to receive broadcast packets (i.e., determination block 2110="No"), the processor may broadcast a packet on the broadcast channel in block 2118. For example, the processor may transmit a broadcast packet in the slots dedicated for the broadcast channel to broadcast a packet on the broadcast channel.

In response to determining that a wireless device is not selected to receive broadcast packets for the broadcast channel (i.e., determination block 2110="Yes"), the processor may select whether the wireless device is to enter a sleep mode or an opportunistic reception mode in block 2112. The processor may select whether the wireless device is to enter a sleep mode or an opportunistic reception mode based on various factors, such as network settings, channel conditions for a wireless device, etc.

In block 2114, the processor may perform operation to generate a control information message for the broadcast channel, wherein the control information message indicates that the wireless device is not selected to receive broadcast packets from the network computing device and indicates whether the wireless device is selected to enter the sleep mode or the opportunistic reception mode. As an example, a control information message for a broadcast channel from a network computing device may indicate that the wireless device is not selected to receive broadcast packets from the network computing device and may indicate the wireless device is to enter an opportunistic reception mode. An opportunistic reception mode may be a mode of operation for the wireless device in which the wireless device listens to the broadcast channel periodically to receive broadcast packets from the network computing device. When a wireless device is in an opportunistic reception mode, a network computing device, such as a base station (e.g., a gNB), may maintain physical uplink control channel (PUCCH) resources for that wireless device. As another example, a control information message for a broadcast channel from a network computing device may indicate that the wireless device is not selected to receive broadcast packets from the network computing device and may indicate the wireless device is to enter a sleep mode. A sleep mode may be a mode of operation for the wireless device in which the wireless device ignores slots dedicated to broadcasting. The sleep mode may be a power saving mode in which the wireless device may not be required to power-on radio frequency (RF) resources to attempt to receive broadcast packets during a slot dedicated to broadcasting. When a wireless device is in a sleep mode, a network computing device, such as a base station (e.g., a gNB) may release the PUCCH resources for that wireless device.

In block 2116, the processor may send the control information message to the wireless device. As examples, the control information message may be sent as a MAC-CE message, DCI message, or WUS message.

In block 2118, the processor may broadcast a packet on the broadcast channel. For example, the processor may transmit a broadcast packet in the slots dedicated for the broadcast channel to broadcast a packet on the broadcast channel.

Figure 22:
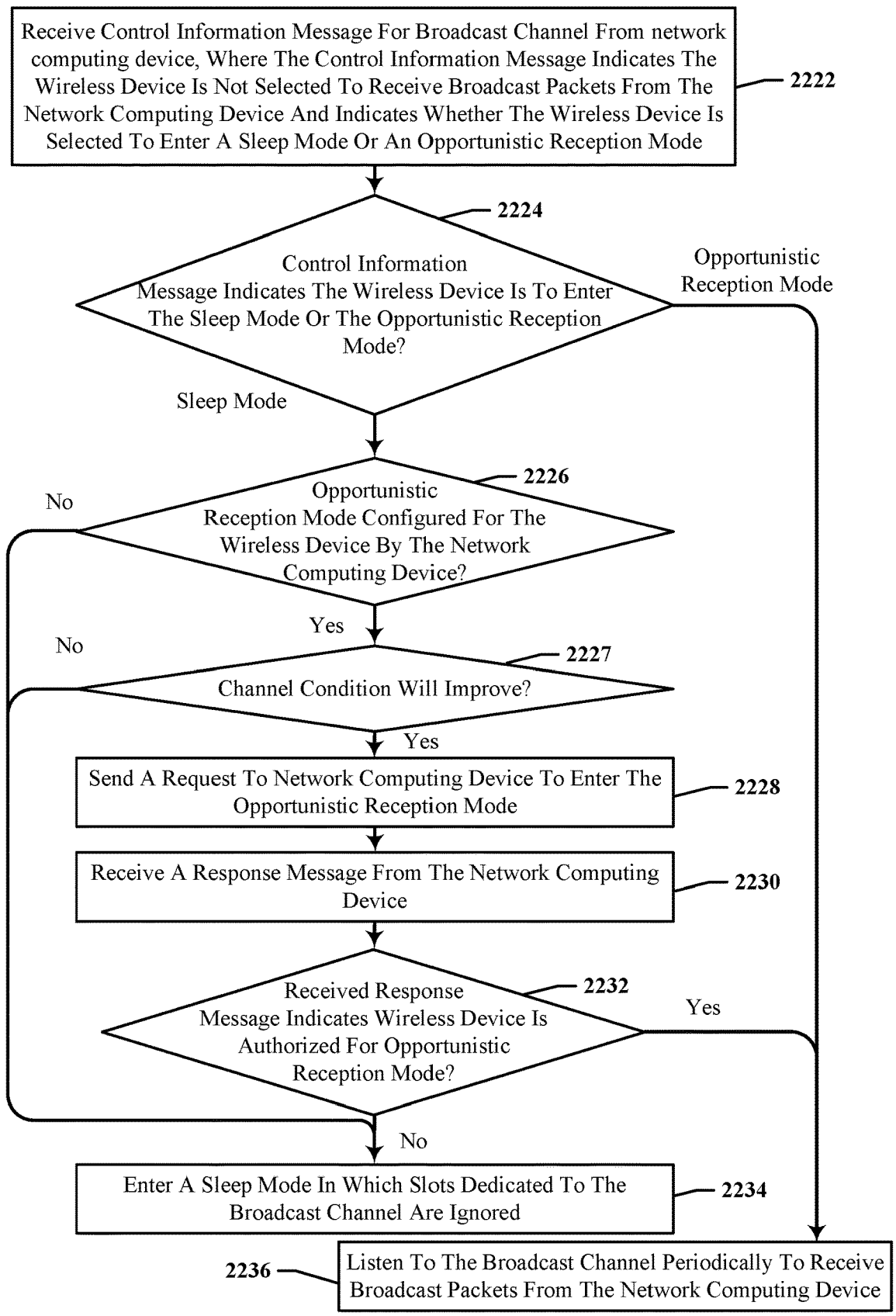

FIG. 22 shows a process flow diagram illustrating a method 2200 for supporting opportunistic broadcast reception in accordance with various embodiments. With reference to FIGS. 1 through 22, the method 2200 may be implemented by a processor of a wireless device. In some embodiments, the operations of method 2200 may be performed in conjunction with the operations of method 1800 (FIG. 18), 1900 (FIG. 19), and/or 2100 (FIG. 21). As one example, the operations of method 2200 may be performed after the operations of method 1900 (FIG. 19).

In block 2222, the processor may perform operations to receive a control information message for a broadcast channel from a network computing device, wherein the control information message indicates that the wireless device is not selected to receive broadcast packets from the network computing device and indicates whether the wireless device is to enter a sleep mode or an opportunistic reception mode. As an example, a control information message for a broadcast channel from a network computing device may indicate that the wireless device is not selected to receive broadcast packets from the network computing device and may indicate the wireless device is to enter an opportunistic reception mode. As another example, a control information message for a broadcast channel from a network computing device may indicate that the wireless device is not selected to receive broadcast packets from the network computing device and may indicate the wireless device is to enter a sleep mode.

In determination block 2224, the processor may perform operations to determine whether the control information message indicates that the wireless device is to enter the sleep mode or the opportunistic reception mode in response to receiving the control information message from the network computing device. For example, the processor may parse the control information message and determine whether an element of the message is associated with a sleep mode or is associated with an opportunistic reception mode to determine whether the control information message indicates that the wireless device is to enter the sleep mode or the opportunistic reception mode.

In response to determining that the control information message indicates that the wireless device is to enter the opportunistic reception mode (i.e., determination block 2224="Opportunistic Reception Mode"), the processor may listen to the broadcast channel periodically to receive broadcast packets from the network computing device in block 2236. In some embodiments, listening to the broadcast channel periodically to receive broadcast packets from the network computing device may include listening to the broadcast channel periodically at the listening frequency and for the listening time duration as indicated in an opportunistic reception mode configuration message and/or opportunistic reception mode configuration update message received from the network computing device.

In response to determining that the control information message indicates that the wireless device is to enter the sleep mode (i.e., determination block 2224="Sleep Mode"), the processor may perform operations to determine whether the opportunistic reception mode is configured for the wireless device by the network computing device in determination block 2226. An opportunistic reception mode may be determined to be configured for the wireless device when a network computing device has previously sent an opportunistic reception mode configuration message and/or opportunistic reception mode configuration update message indicating a listening frequency and a listening duration.

In response to determining that the opportunistic reception mode is not configured for the wireless device by the network computing device (i.e., determination block 2226="No"), the processor may perform operations to enter a sleep mode in which slots dedicated to the broadcast channel are ignored in block 2234. The sleep mode may be a power saving mode in which the wireless device powers off RF resources during a slot dedicated to broadcasting.

In response to determining that the opportunistic reception mode is configured for the wireless device by the network computing device (i.e., determination block 2226="Yes"), the processor may perform operations to determine whether the channel condition of the wireless device may improve in determination block 2227. For example, a wireless device may determine whether its channel condition may improve soon (i.e., within a certain interval that may be predetermined as a configurable parameter), such as because the number of antennas of the wireless device available for receiving downlink data transmission will increase soon, etc. As an example, when all available antennas are already in use, the wireless device may determine that the channel condition is not likely to improve within the predetermined interval. As an example, when additional antennas are available for receiving downlink transmission, or will become available within the predetermined interval, such as because a current downlink or uplink task is ending, the wireless device may determine that the channel condition will improve soon (i.e., within the predetermined interval).

In response to determining that the channel condition will not improve within the predetermined interval (i.e., determination block 2227="No"), the processor may perform operations to enter a sleep mode in which slots dedicated to the broadcast channel are ignored in block 2234. The sleep mode may be a power saving mode in which the wireless device powers off RF resources during a slot dedicated to broadcasting.

In response to determining that the channel condition will improve within the predetermined interval (i.e., determination block 2227="Yes"), the processor may send a request to the network computing device to enter the opportunistic reception mode in block 2228. In some embodiments, a wireless device may be configured to request to enter opportunistic reception mode after receiving a control information message indicates that the wireless device is to enter the sleep mode. In some embodiments, in response to determining that a control information message indicates that the wireless device is to enter a sleep mode and in response to determining that the opportunistic reception mode is configured for the wireless device by the network computing device, a wireless device may send a request to enter the opportunistic reception mode. As an example, the request may be a MAC-CE message sent by the wireless device or an uplink control information (UCI) message sent by the wireless device. As a specific example, when the control information message is a MAC-CE message, the request to enter the opportunistic reception mode may be a MAC-CE acknowledgement (ACK) message. As another specific example, when the control information message is received in a DCI message, the request to enter the opportunistic reception mode may be sent in a PUCCH slot other than the slots dedicated to the broadcast channel. For example, a wireless device may request to enter opportunistic reception mode because the wireless device is aware that its channel condition may become better soon, such as because a number of available antennas will increase soon, etc.

In block 2230, the processor may perform operations to receive a response message from the network computing device. The response message may include an indication as to whether or not the wireless device is authorized to enter the opportunistic reception mode.

In determination block 2232, the processor may perform operations to determine whether the received response message indicates that the wireless device is authorized for opportunistic reception mode. For example, the processor may parse the response message and determine whether an element of the message is associated with an opportunistic reception mode authorization to determine whether the received response message indicates that the wireless device is authorized for opportunistic reception mode.

In response to determining that the received response message indicates that the wireless device is not authorized for opportunistic reception mode (i.e., determination block 2232="No"), the processor may perform operations to enter a sleep mode in which slots dedicated to the broadcast channel are ignored in block 2234. Again, the sleep mode may be a power saving mode in which the wireless device powers off RF resources during a slot dedicated to broadcasting.

In response to determining that the received response message indicates that the wireless device is authorized for opportunistic reception mode (i.e., determination block 2232="Yes"), the processor may perform operations to listen to the broadcast channel periodically to receive broadcast packets from the network computing device in block 2236.

In some embodiments, listening to the broadcast channel periodically to receive broadcast packets from the network computing device may include listening to the broadcast channel periodically at the listening frequency and for the listening time duration as indicated in an opportunistic reception mode configuration message and/or opportunistic reception mode configuration update message received from the network computing device.

Figure 23:
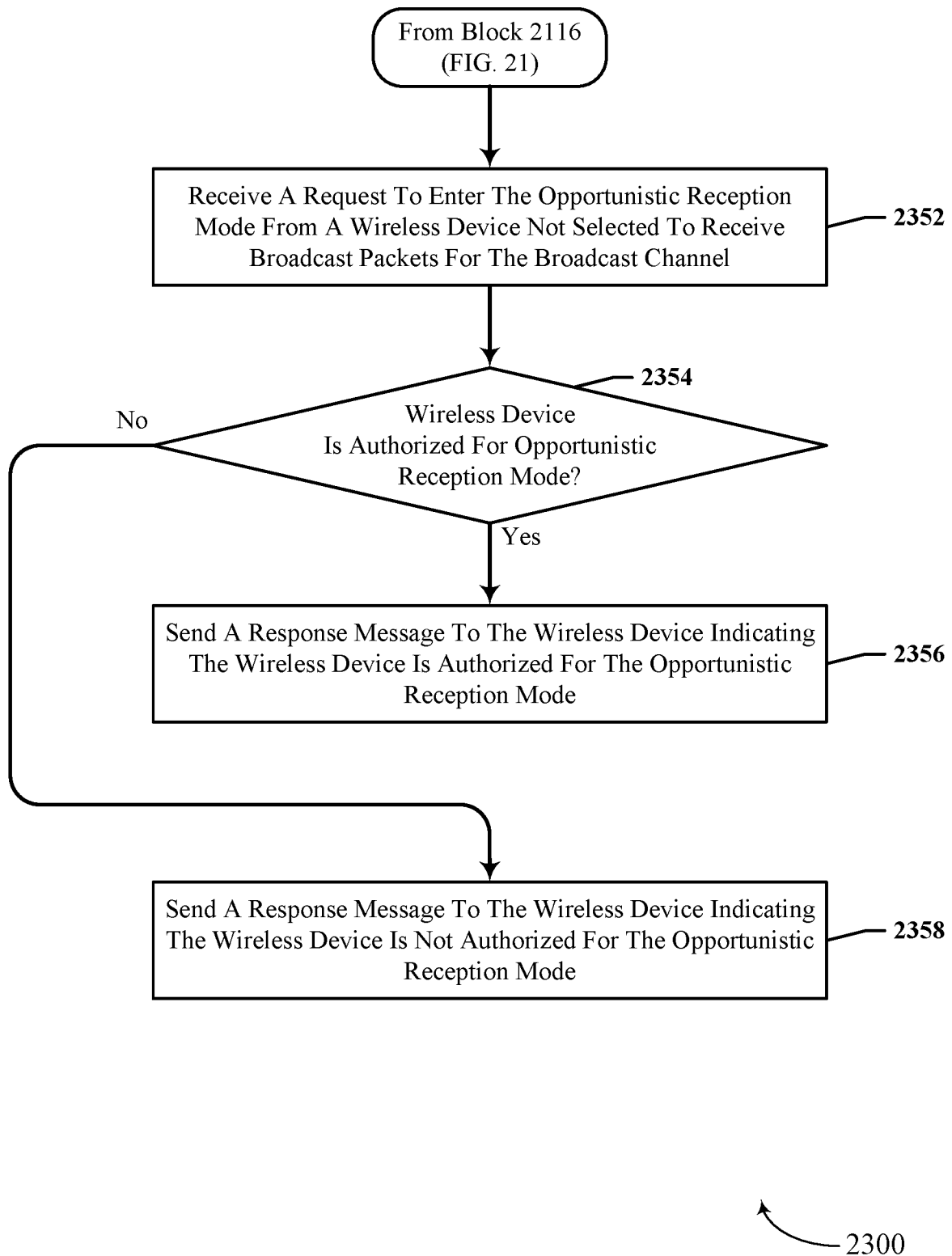

FIG. 23 shows a process flow diagram illustrating a method 2300 for supporting opportunistic broadcast reception in accordance with various embodiments. With reference to FIGS. 1 through 23, the method 2300 may be implemented by a processor of a network computing device (e.g., the base station 105). In some embodiments, the operations of method 2300 may be performed in conjunction with the operations of method 1800 (FIG. 18), 1900 (FIG. 19), 2100 (FIG. 21), and/or 2200 (FIG. 22). As a specific example, the operations of method 550 may be performed in response to sending the control information message to the wireless device in block 2100 (FIG. 21).

In block 2352, the processor may receive a request to enter the opportunistic reception mode from a wireless device not selected to receive broadcast packets for the broadcast channel. As examples, the request may be a MAC-CE message or a UCI message sent by the wireless device.

In determination block 2354, the processor may determine whether the wireless device is authorized for opportunistic reception mode. For example, a wireless device may be authorized for opportunistic reception mode based on network settings.

In response to determining that the wireless device is authorized for opportunistic reception mode (i.e., determination block 2354="Yes"), the processor may send a response message to the wireless device indicating that the wireless device is authorized for the opportunistic reception mode in block 2356.

In response to determining that the wireless device is not authorized for opportunistic reception mode (i.e., determination block 2354="No"), the processor may send a response message to the wireless device indicating that the wireless device is not authorized for the opportunistic reception mode in block 2358.

Figure 24A:
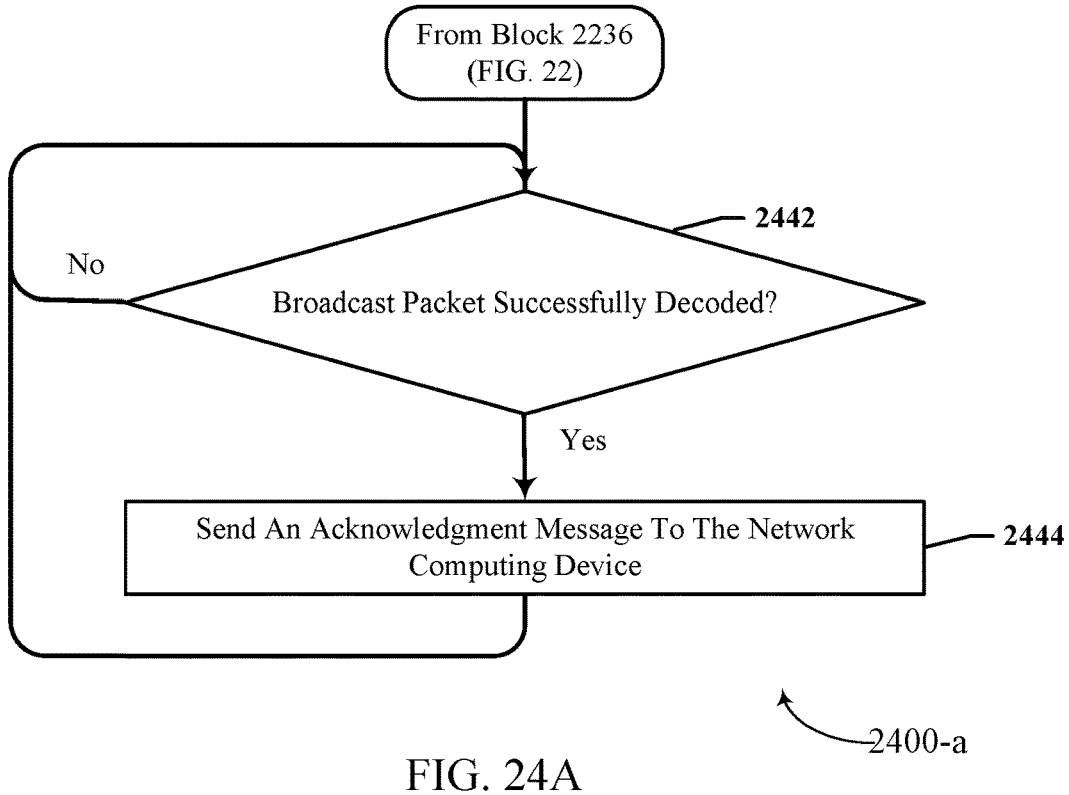
Figure 24B:
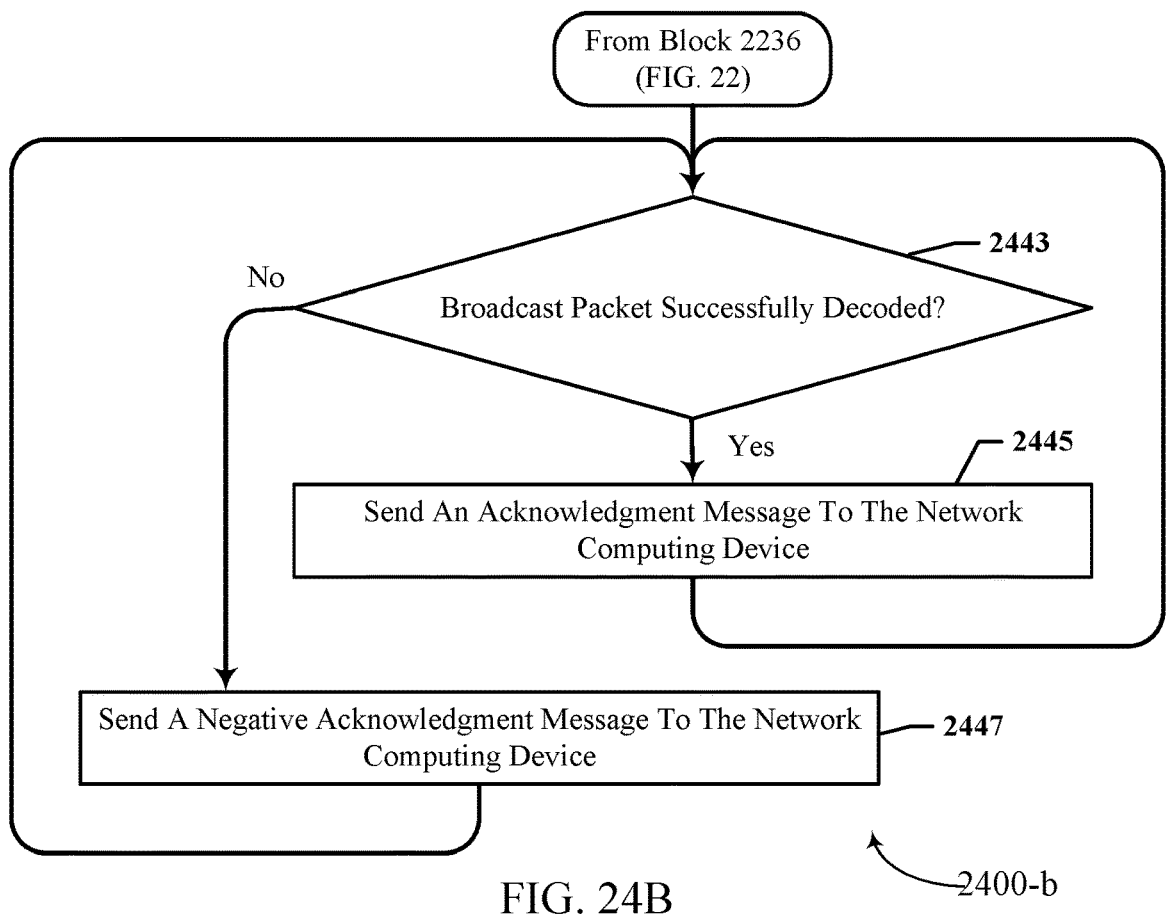

FIGS. 24A and 24B show process flow diagrams illustrating a method 2400-*a* and a method 2400-*b* for supporting opportunistic broadcast reception in accordance with various embodiments. With reference to FIGS. 1 through 24, the methods 2400 may be implemented by a processor of a wireless device. In some embodiments, the operations of method 2400 may be performed in conjunction with the operations of method 1800 (FIG. 18), 1900 (FIG. 19), 2100 (FIG. 21), 2200 (FIG. 22), and/or 2300 (FIG. 23). As a specific example, the operations of method 2400-*a* or 2400-*b* may be performed in response to listening to the broadcast channel periodically to receive broadcast packets from the network computing device in block 2300 (FIG. 23).

In determination block 2442, the processor may determine whether a broadcast packet is successfully decoded. For example, the wireless device may determine whether a packet received during a listening time period on the broadcast channel from the network computing device was successfully decoded.

In response to determining that a broadcast packet is not successfully decoded (i.e., determination block 2442="No"), the processor may continue to determine whether a broadcast packet is successfully decoded in determination block 2442.

In response to determining that a broadcast packet is successfully decoded (i.e., determination block 2442="Yes"), the processor may send an acknowledgment message (e.g., an ACK message) to the network computing device in block 2444.

In blocks 2443 and 2445, the processor may perform like operations of like numbered blocks of method 2400-*a* (FIG. 24A) to send an acknowledgement message to the network computing device in response to determining that a broadcast packet is successfully decoded.

In response to determining that a broadcast packet is not successfully decoded (i.e., determination block 2443="No"), the processor may send a negative acknowledgement message (e.g., a NACK message) to the network computing device in block 2447.

Figure 25:
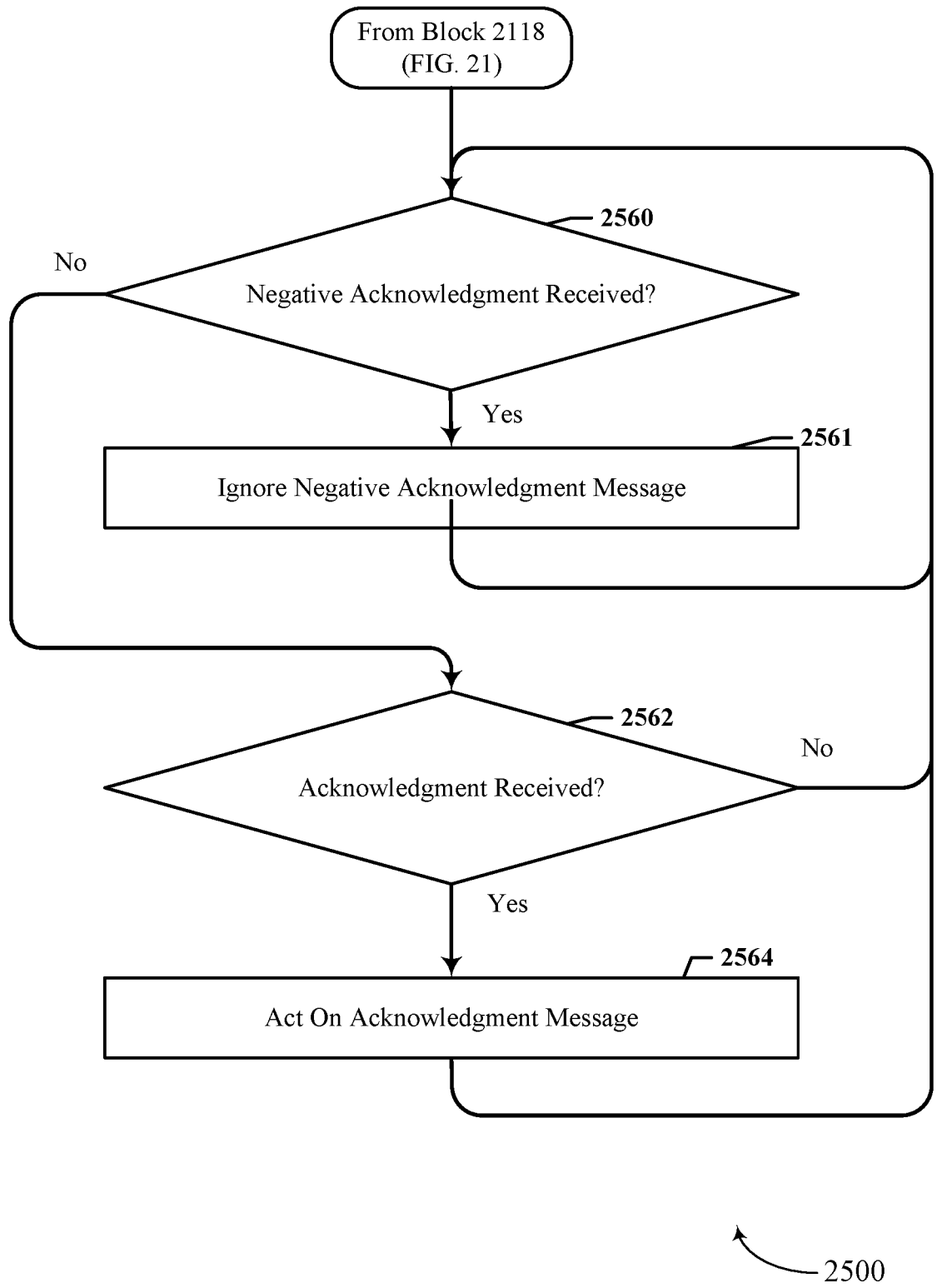

FIG. 25 shows a process flow diagram illustrating a method 2500 for supporting opportunistic broadcast reception in accordance with various embodiments. With reference to FIGS. 1 through 25, the method 2500 may be implemented by a processor of a network computing device (e.g., the base station 105). In some embodiments, the operations of method 2500 may be performed in conjunction with the operations of method 1800 (FIG. 18), 1900 (FIG. 19), 2100 (FIG. 21), 2200 (FIG. 22), 2300 (FIG. 23), 2400-*a* (FIG. 24A), and/or 2400-*b* (FIG. 24B). As a specific example, the operations of method 559 may be performed in response to broadcasting a packet in block 2100 (FIG. 21).

In determination block 2560, the processor may perform operations to determine whether a negative acknowledgment message (e.g., a NAK) is received.

In response to determining that a negative acknowledgment is received (i.e., determination block 2560="Yes"), the processor may ignore the negative acknowledgment message in block 561.

In response to determining that a negative acknowledgment is not received (i.e., determination block 2560="No"), the processor may determine whether an acknowledgement message (e.g., an ACK) is received in determination block 2562.

In response to determining that an acknowledgment is received (i.e., determination block 2562="Yes"), the processor may act on the acknowledgment message in block 2564.

In response to determining that an acknowledgment is not received (i.e., determination block 2562="No"), the processor may determine whether a negative acknowledgement message is received in determination block 2560.

Figure 26:
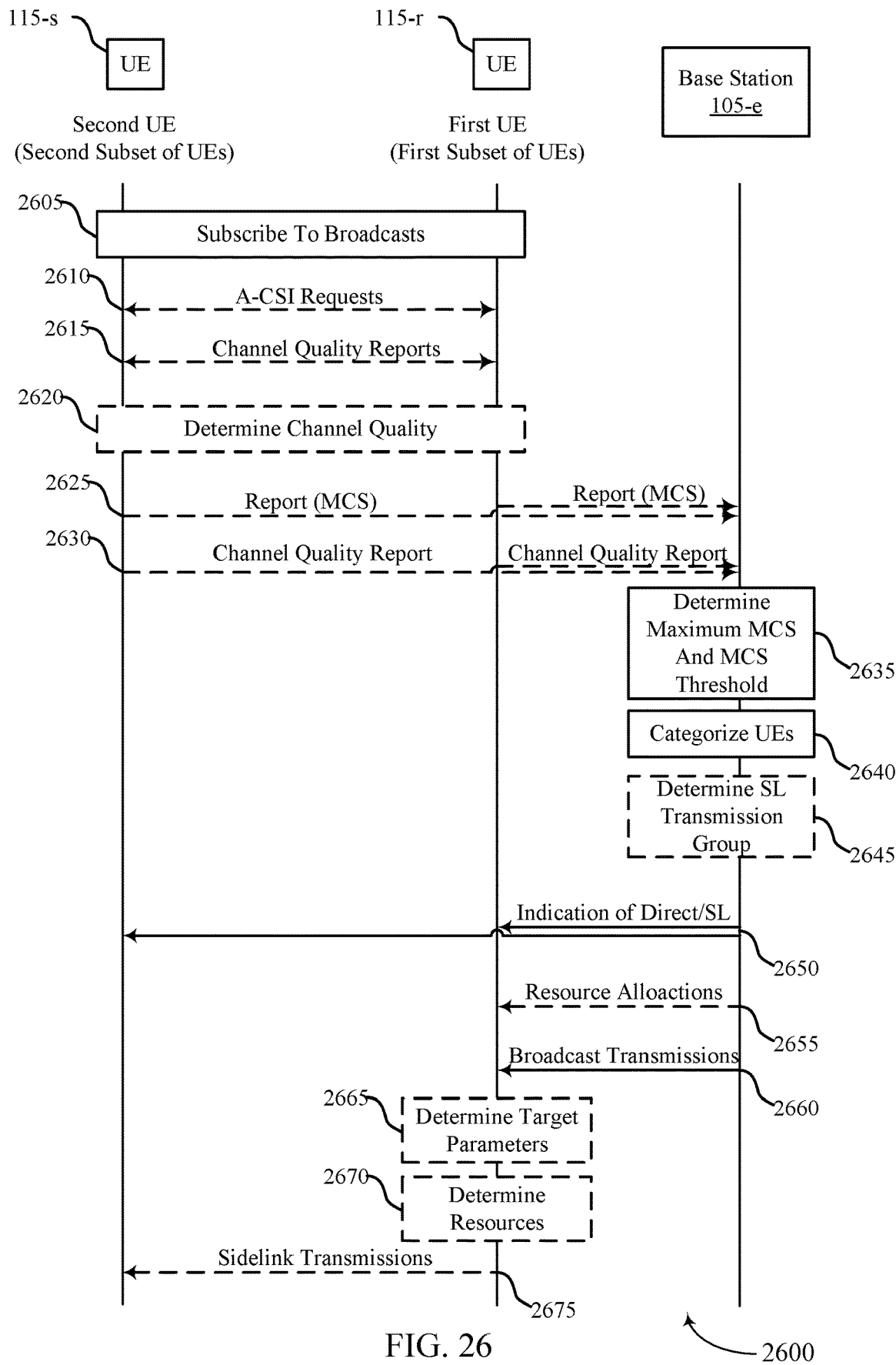
FIG. 26 illustrates an example of a process flow that supports techniques for channel state information-reference signal (CSI-RS) based UE subset selection for rate control in broadcasting with sidelink in accordance with one or more aspects of the present disclosure.

FIG. 26 illustrates an example of a process flow 2600 that supports techniques for CSI-RS based UE subset selection for rate control in broadcasting with sidelink in accordance with one or more aspects of the present disclosure. In some examples, process flow 2600 may implement, or be implemented by, aspects of wireless communications system 100, wireless communications system 200, wireless communications system 300, wireless communications system 400, or any combination thereof. The process flow 2600 may illustrate an example of a base station 105, such as base station 105-*e*, categorizing UEs 115 into a first subset of UEs 115 (e.g., including UE 115-*r*) for direct link communications and a second subset of UEs 115 (e.g., including UE 115-*s*) for sidelink communications, then transmitting broadcast transmissions to the UEs 115. Alternative examples of the following may be implemented, where some processes are performed in a different order than described or are not performed. In some cases, processes may include additional features not mentioned below, or further processes may be added.

At 2605, one or more UEs 115 may subscribe to receive broadcast transmissions from the base station 105-e. In some aspects, the UE 115-r and/or UE 115-s may subscribe to receive broadcast transmissions from the base station 105-e by transmitting uplink transmissions including an indication of the subscriptions to the base station 105-e. In some cases, base station 105-e may identify that UE 115-r and UE 115-s are subscribed to receive broadcast transmissions including packets of data.

At 2610, the UE 115-r, the UE 115-s, or both, may transmit A-CSI requests to the other UE 115. In some aspects, the A-CSI requests may indicate requests for the receiving UE 115 of each A-CSI request to transmit a channel quality report to the transmitting UE 115 of each A-CSI request. In this regard, the UEs 115 may exchange A-CSI requests in order to measure channel qualities associated with sidelink communication links (e.g., sidelink connections 210, 310, and 410) between the respective UEs 115. For example, the UE 115-r may transmit an A-CSI request to the UE 115-s, where the A-CSI request includes an indication for the UE 115-s to transmit a channel quality report to the UE 115-r. In some aspects, each of the UEs 115 may transmit and/or receive A-CSI reports from any quantity of other UEs 115 subscribed to receive broadcasts from the base station 105-e.

At 2615, the UE 115-r, the UE 115-s, or both, may transmit a channel quality report to the respective UEs 115. In some aspects, the UE 115-r and/or the UE 115-s may transmit the channel quality reports based on (e.g., in response to) receiving the A-CSI requests at 2610. For example, upon receiving an A-CSI request from the UE 115-r, the UE 115-s may measure reference signals received from the UE 115-r via a sidelink connection (e.g., sidelink connection 210, 310, and/or 410), and may generate a channel quality report associated with the sidelink connection based on the measurements. Subsequently, the UE 115-s may transmit a channel quality report to the UE 115-r, where the channel quality report includes an indication of channel quality associated with communications between the UE 115-r and the UE 115-s. In some aspects, the channel quality report may include, but is not limited to, an indication of a maximum MCS associated with sidelink communications between the respective UEs 115.

In some aspects, the channel quality reports exchanged by the UEs 115 at 2615 may each include a source identifier (e.g., source ID) associated with (e.g., indicating) the UE 115 which transmitted the respective channel quality report. Each UE 115 may be associated with a unique source identifier. For example, the UE 115-s may transmit a channel quality report to the UE 115-r, where the channel quality report includes a source identifier associated with the UE 115-s. In some aspects, the source identifiers may be used to calculate which resources may be used to transmit feedback information via PSFCH. Moreover, when transmitting feedback (e.g., ACK, NACK, channel quality reports) to UEs 115, the feedback may include an indication of a source identifier associated with the UE 115 transmitting the feedback. In this regard, UEs 115 receiving feedback or other signaling may be able to use source identifiers indicated in the feedback or other signaling in order to identify which UE 115 the feedback is being received from.

In some aspects, UEs 115 may be configured to determine destination identifiers associated with each UE 115 based on the received source identifiers. For example, the UE 115-r may be configured to maintain a correspondence table, data object, database, or other configuration mapping source identifiers with destination identifiers. By maintaining associations between destination identifiers and source identifiers, UEs 115 may be able to efficiently determine where received signals are transmitted from, and where feedback signaling needs to be transmitted. For example, the UE 115-r may transmit an A-CSI request to the UE 115-s at 2610, where the A-CSI request includes a source identifier associated with the UE 115-r. The UE 115-s may subsequently determine a destination identifier associated with the UE 115-r based on (e.g., using) the received source identifier and a configuration (e.g., correspondence table) mapping source identifiers to destination identifiers. In this example, the UE 115-s may transmit the channel quality report to the UE 115-r at 2615, where the channel quality report includes an indication of the destination identifier associated with the UE 115-r, a source identifier associated with the UE 115-s, or both.

At 2620, the UE 115-r, the UE 115-s, or both, may determine a channel quality between the respective UEs 115. The UE 115-r and/or the UE 115-s may determine the channel quality between the UE 115-r and the UE 115-s based on exchanging the A-CSI requests at 2610, exchanging the channel quality reports at 2615, or both. In this regard, each UE 115 may determine a channel quality associated with communications between the respective UE 115 and any quantity of additional UEs 115 subscribed to receive broadcasts from the base station 105-e. In some aspects, the channel quality may include, but is not limited to, a maximum MCS associated with sidelink communications between the respective UEs 115.

In some cases, the UE 115-r and/or the UE 115-s may determine a channel quality associated with communications between the UE 115-r and UE 115-s based on additional or alternative signaling exchanged between the UEs 115, including SCI signaling, DMRS signaling, PSFCH signaling, or any combination thereof. In particular, each of the UE 115-r and/or the UE 115-s may perform measurements (e.g., RSRP measurements, RSRQ measurements, SNR measurements, SINR measurements) on SCI signaling, DMRS signaling, and/or PSFCH signaling received from the other UE 115, and may determine a channel quality based on the measurements. For example, the UE 115-r may receive PSFCH transmissions from the UE 115-s, and may determine a channel quality for communications between the UEs 115 based on the PSFCH transmissions (e.g., based on RSRP measurements performed on the PSFCH transmissions). In some cases, PSFCH transmissions may enable UEs 115 to determine channel qualities with the shortest delay. Similarly, by way of another example, the UE 115-r may receive an SCI message, a DMRS signal, or both, from the UE 115-s, and may determine a channel quality for communications between the UEs 115 based on the SCI message and/or DMRS signal (e.g., based on measurements performed on the SCI message and/or DMRS signal).

At 2625, the UE 115-r, the UE 115-s, or both, may transmit a report including an indication of one or more parameters associated with a maximum MCS for communications between the base station 105-e and the respective UE 115. Parameters associated with maximum MCSs may include RSSI measurements, RSRP measurements, RSRQ measurements, SNR measurements, SINR measurements, or any combination thereof. For example, the UE 115-r may transmit a report including an indication of a maximum MCS associated with communications between the base station 105-e and the UE 115-r, and the UE 115-s may transmit a report including an indication of parameters associated with a maximum MCS for communications between the base station 105-e and the UE 115-s. In some aspects, the UE 115-r and/or the UE 115-s may transmit the report at 2620 based on subscribing to receive broadcast transmissions from the base station 105-e at 2605, exchanging the A-CSI requests and/or channel quality reports at 2615, or any combination thereof. In some aspects, the reports indicating the maximum MCSs associated with the respective UEs 115 may include CSI-RS reports.

At 2630, the UE 115-r, the UE 115-s, or both, may transmit a report (e.g., channel quality report) indicating a channel quality associated with communications between the respective UE 115 and one or more other UEs 115. In some aspects, the reports indicating channel qualities between UEs 115 received at 2625 may include indications of source identifiers, destination identifiers, or both, associated with the respective UEs 115. For example, the UE 115-r may transmit a report indicating a channel quality associated with communications between the UE 115-r and the UE 115-s. In this example, the report may include an indication of a source identifier associated with the UE 115-r, a destination identifier associated with the UE 115-r, a source identifier associated with the UE 115-s, a destination identifier associated with the UE 115-s, or any combination thereof.

At 2635, the base station 105-e may determine a maximum MCS associated with each UE 115 subscribed to receive broadcasts from the base station 105-e, a threshold MCS (e.g., $MCS_{Thresh}$), or both. In some aspects, the base station 105-e may determine the maximum MCSs and/or threshold MCS based on identifying UEs 115 subscribed to receive broadcast transmissions from the base station 105-e, receiving the reports indicating parameters associated with maximum MCSs at 2625, receiving the reports indicating channel qualities between UEs 115 at 2630, or any combination thereof. In some aspects, the base station 105-e may determine the threshold MCS based on a time delay budget report by the UE for transmitting the broadcast transmissions, a data rate requirement for transmitting the broadcast transmissions, or both.

At 2640, the base station 105-e may categorize the UEs 115 (e.g., UE 115-r, UE 115-s) into a first subset of UEs 115 that is to receive the broadcast transmissions via direct link communications from the base station 105-e, and into a second subset of UEs 115-d that is to receive the broadcast transmissions via sidelink communications from the first subset of UEs 115. In some aspects, the base station 105-e may categorize the UEs 115 into the first and second subsets of UEs 115 based on identifying UEs 115 subscribed to receive broadcast transmissions from the base station 105-e at 2605, receiving the reports indicating parameters associated with MCSs at 2625, receiving the reports indicating channel qualities between UEs 115 at 2630, determining the MCSs and/or threshold MCS at 2635, or any combination thereof.

In some aspects, the base station 105-e may categorize the UEs 115 into the first and second subsets of UEs 115 based on determined MCSs associated with each of the respective UEs 115. In this regard, the base station 105-e may categorize the UEs 115 at 2640 based on receiving the reports indicating maximum MCSs associated with each of the respective UEs 115 at 2625, determining the maximum MCSs and/or threshold MCS at 2635, or any combination thereof. In particular, the base station 105-e may categorize the UEs 115 into the first and second subsets of UEs 115 based on whether or not a maximum MCS associated with the respective UE 115 satisfies the threshold MCS.

For example, the base station 105-e may categorize the UE 115-r into a first subset of UEs 115 which are to receive broadcast transmissions from the base station 105-e via direct link communications (e.g., via direct links 205, 305, and/or 405) based on determining that the MCS associated with the UE 115-r satisfies the threshold MCS. For instance, the base station 105-e may categorize the UE 115-r into the first subset of UEs 115 based on determining that the MCS associated with the UE 115-r is greater than or equal to the threshold MCS (e.g., threshold MCS satisfied based on $MCS_{UE\ 115\text{-}p} \geq MCS_{Thresh}$).

Conversely, the base station 105-e may categorize the UE 115-s into a second subset of UEs 115 which are to receive broadcast transmissions via sidelink communications (e.g., via sidelink connections 210, 310, and/or 410) from the first subset of UEs 115 based on determining that the MCS associated with the UE 115-s fails to satisfy the threshold MCS. For instance, the base station 105-e may categorize the UE 115-s into the second subset of UEs 115 based on determining that the MCS associated with the UE 115-s is less than the threshold MCS (e.g., threshold MCS not satisfied based on $MCS_{UE\ 115\text{-}q} < MCS_{Thresh}$).

At 2645, the base station 105-e may determine one or more sidelink transmission groups for distribution of the broadcast transmissions. In some aspects, each sidelink transmission group may include one or more UEs 115 from the first subset of UEs 115 (e.g., one or more direct-receiving UEs 115) and one or more UEs 115 from the second subset of UEs 115 (e.g., one or more sidelink-receiving UEs 115). In this regard, each sidelink transmission group may indicate which UEs 115 of the second subset of UEs 115 (e.g., which sidelink-receiving UEs 115) are to receive the broadcast transmissions from which UEs 115 of the first subset of UEs 115 (e.g., which direct-receiving UEs 115).

In some aspects, the base station 105-e may determine the sidelink transmission groups based on identifying the UEs 115 subscribed to receive broadcasts from the base station 105-e at 2605, receiving the reports indicating parameters associated with MCSs for the UEs 115 at 2625, receiving the reports indicating channel qualities between UEs 115 at 2630, determining the maximum MCSs and/or threshold MCS at 2635, categorizing the UEs 115 into the respective subsets at 2640, or any combination thereof.

In some aspects, the base station 105-e may determine a group identifier (e.g., group ID) associated with each sidelink transmission group. The group identifier may be common across each UE 115 included within the respective sidelink transmission group. Additionally, the base station 105-e may determine a destination identifier, a source identifier, or both, associated with each UE 115 within each respective sidelink transmission group. For example, as noted previously herein, the reports indicating channel qualities between UEs 115 received at 2630 may indicate destination identifiers and/or source identifiers associated with the UEs 115. In this example, the base station 105-e may determine destination identifiers and/or source identifiers associated with the UEs 115 based on the indications of the source identifiers and/or destination identifiers received in the reports, a configuration (e.g., correspondence table) mapping source identifiers to destination identifiers, or any combination thereof.

In some cases, the base station 105-e may determine a sidelink transmission group for each UE 115 of the first subset of UEs 115. For example, the base station 105-e may categorize the UE 115-r into the first subset of UEs 115 (e.g., direct-receiving UEs 115) and may categorize the UE 115-s into the second subset of UEs 115 (e.g., sidelink-receiving UEs 115) at 2640. In this example, the base station 105-e may determine a sidelink transmission group associated with the UE 115-*r* based on the categorization, the channel quality between the UE 115-*r* and the UE 115-*s*, or any combination thereof. In this example, the sidelink transmission group may include the UE 115-*r* and the UE 115-*s*. In this regard, the sidelink transmission group may indicate that the UE 115-*s* is to receive the broadcast transmissions via sidelink communications from the UE 115-*r*. In this example, by determining the sidelink transmission group, the base station 105-*e* may determine a group identifier associated with the sidelink transmission group, destination identifiers associated with the UE 115-*r* and/or UE 115-*s*, source identifiers associated with the UE 115-*r* and/or UE 115-*s*, or any combination thereof.

At 2650, the base station 105-*e* may transmit, to the UE 115-*r* and/or the UE 115-*s*, an indication (e.g., control information) that the broadcast transmissions are to be received via either direct link communications or sidelink communications. In this regard, the base station 105-*e* may indicate whether each UE 115 has been categorized into the first subset of UEs 115 (e.g., direct-receiving UEs 115) or the second subset of UEs 115 (e.g., sidelink-receiving UEs 115). In some aspects, the indication transmitted at 2650 may include control information associated with (e.g., corresponding to) the broadcast transmissions, where the control information is transmitted via MAC-CE signaling, DCI, a wakeup signal, or any combination thereof. In some aspects, the base station 105-*e* may transmit the indication at 2650 based on categorizing the UEs 115 at 2640.

For example, the base station 105-*e* may transmit an indication to the UE 115-*r* indicating that the UE 115-*r* is to receive broadcast transmissions via direct link communications (e.g., via direct links 205, 305, 405). Conversely, the base station 105-*e* may transmit an indication to the UE 115-*s* indicating that the UE 115-*s* is to receive broadcast transmissions via sidelink communications (e.g., via sidelink connections 210, 310, 410) from the first subset of UEs 115 (e.g., from the UE 115-*r*).

Additionally or alternatively, the base station 105-*e* may transmit, to the UE 115-*r* and/or UE 115-*s*, information associated with the determined sidelink transmission groups. In this regard, the base station 105-*e* may indicate which sidelink transmission group each of the UEs 115 belongs to. The information associated with the determined sidelink transmission groups may include, but is not limited to, a group identifier associated with the respective sidelink transmission groups, destination identifiers and/or source identifiers associated with each UE 115 within the respective sidelink transmission group, or any combination thereof. In some aspects, the base station 105-*e* may transmit the indication of information associated with the sidelink transmission groups based on determining the sidelink transmission groups at 2645.

For example, in cases where the base station 105-*e* determines the UE 115-*r* and the UE 115-*s* are included within the same sidelink transmission group, the base station 105-*e* may transmit, to the UE 115-*r* and/or UE 115-*s*, an indication of the group identifier associated with the sidelink transmission group, a source identifier associated with the UE 115-*r* and/or the UE 115-*s*, a destination identifier associated with the UE 115-*r* and/or UE 115-*s*, or any combination thereof. Moreover, in cases where the sidelink transmission group includes additional UEs 115 within the second subset of UEs 115 (e.g., additional sidelink-receiving UEs 115), the base station 105-*e* may indicate, to the UE 115-*r* and/or the UEs 115 of the second subset of UEs 115, source identifiers and/or destination identifiers associated with each of the UEs 115 of the sidelink transmission group.

At 2655, the base station 105-*e* may transmit, to the UE 115-*r* and/or the UE 115-*s*, resource allocations to be used by the UEs 115 to transmit and/or receive the broadcast transmissions. The resource allocations may include sets of time resources, sets of frequency resources, sets of spatial resources, or any combination thereof. In some aspects, the base station 105-*e* may transmit the resource allocations based on determining the MCSs and/or threshold MCS at 2635, categorizing the UEs 115 at 2640, determining the sidelink transmission groups at 2645, transmitting the indications at 2650, or any combination thereof.

For example, the base station 105-*e* may transmit a first resource allocation to the UE 115-*r*, where the first resource allocation is to be used by the UE 115-*r* to receive the broadcast transmissions from the base station 105-*e*. Similarly, by way of another example, the base station 105-*e* may transmit a second resource allocation to the UE 115-*r*, where the second resource allocation is to be used by the UE 115-*r* for transmitting the broadcast transmissions to the UE 115-*s* via a sidelink communication link. Moreover, in some cases, the base station 105-*e* may additionally transmit the second resource allocation to the UE 115-*s*, where the second resource allocation is to be used by the UE 115-*s* for receiving the broadcast transmissions from the UE 115-*r*.

At 2660, the base station 105-*e* may transmit the broadcast transmissions to the first subset of UEs 115. For example, in cases where the UE 115-*r* is categorized into the first subset of UEs 115, the base station 105-*e* may transmit the broadcast transmissions to the UE 115-*r*. In some aspects, the base station 105-*e* may transmit the broadcast transmissions at 2660 based on (e.g., in accordance with) the indications of direct-receiving UEs 115 and/or sidelink-receiving UEs 115 transmitted at 2650. Additionally or alternatively, the base station 105-*e* may transmit the broadcast transmissions to the first subset of UEs 115 based on determining the MCSs and/or threshold MCS at 2635, categorizing the UEs 115 at 2640, determining the sidelink transmission groups at 2645, transmitting the resource allocations at 2655, or any combination thereof. For example, the base station 105-*e* may transmit the broadcast transmissions at 2660, and the UE 115-*r* may receive the broadcast transmissions at 2660, using the resource allocations indicated to the UE 115-*r* at 2655.

At 2665, the first subset of UEs 115 (e.g., UE 115-*r*) may determine one or more target parameters for transmitting the broadcast transmissions to the second subset of UEs 115 (e.g., UE 115-*s*). Parameters for transmitting the broadcast transmissions to the second subset of UEs 115 may include, but are not limited to, a target data rate, a target MCS, or both. In some aspects, the UE 115-*r* may determine the one or more parameters based on the determined channel qualities between the UE 115-*r* and the second subset of UEs 115 (e.g., UE 115-*s*) determined at 2620.

For example, the UE 115-*r* may determine a target data rate for transmitting the sidelink transmissions to the second subset of UEs 115 (e.g., UE 115-*s*). The target data rate may include a data rate which satisfies a threshold data rate. By way of another example, the UE 115-*r* may determine a target MCS for transmitting the sidelink transmissions to the second subset of UEs 115 (e.g., UE 115-*s*). In this example, the target MCS may include an MCS which allows for sidelink communications with a threshold quantity and/or threshold percentage of UEs 115 within the second subset of UEs 115. In this regard, the UE 115-*r* may select the target MCS as a percentile of the MCS pool (e.g., a $50^{th}$ or $100^{th}$ percentile) of the second subset of UEs 115, thus allowing for sidelink communications with the determined percentile of the second subset of UEs 115. However, as noted previously herein, there may be a tradeoff between coverage and data rate, where a lower target MCS may improve coverage but may reduce the data rate, while a higher target MCS may reduce coverage but may improve the data rate.

At 2670, the first subset of UEs 115 (e.g., UE 115-$r$) may determine a set of resources for transmitting the broadcast transmissions to the second subset of UEs 115 (e.g., UE 115-$s$). The set of resources (e.g., set of sidelink resources) may include a set of time resources, a set of frequency resources, a set of spatial resources, or any combination thereof. In some aspects, the first subset of UEs 115 (e.g., UE 115-$r$) may determine the set of resources for transmitting the broadcast transmissions to the second subset of UEs 115 (e.g., UE 115-$s$) based on determining the channel quality between respective UEs 115 at 2620, receiving the indications at 2650, receiving the resource allocations at 2655, receiving the broadcast transmissions at 2660, determining the target parameters at 2665, or any combination thereof.

For example, the UE 115-$r$ may receive a resource allocation from the base station 105-$e$ at 2655, where the resource allocation is to be used by the UE 115-$r$ for transmitting the broadcast transmissions to the second subset of UEs 115 (e.g., UE 115-$s$). In this example, the UE 115-$r$ may determine at least a subset of the resource allocation which may include (e.g., exhibit, match, exceed) the target data rate determined at 2665. In this regard, the UE 115-$r$ may determine at least a subset of the resource allocation which includes a data rate which satisfies (e.g., is greater than or equal to) the determined target data rate. By way of another example, the UE 115-$r$ may determine a channel quality between the UE 115-$r$ and the UE 115-$s$ at 2620. The channel quality may include a maximum MCS for communications between the UE 115-$r$ and the UE 115-$s$. In this example, the UE 115-$r$ may determine a set of sidelink resources for transmitting the broadcast transmissions to the UE 115-$s$ based on the determined channel quality (e.g., determined maximum MCS).

At 2675, the first subset of UEs 115 (e.g., UE 115-$r$) may transmit sidelink transmissions including the broadcasts received from the base station 105-$e$ to the second subset of UEs 115 (e.g., UE 115-$s$) via sidelink communication links (e.g., sidelink connections 210, 310, and/or 410) between the respective UEs 115. In some aspects, the first subset of UEs 115 (e.g., UE 115 $p$) may transmit the sidelink transmissions including the broadcasts received from the base station 105-$e$ via a sidelink communication link using unicast techniques, groupcast techniques, broadcast techniques, or any combination thereof. In some aspects, the first subset of UEs 115 may transmit the sidelink transmissions including the broadcasts, and the second subset of UEs 115 may receive the sidelink transmissions including the broadcasts, based on determining the channel quality between respective UEs 115 at 2620, receiving the indications at 2650, receiving the resource allocations at 2655, receiving the broadcast transmissions at 2660, determining the target parameters at 2665, determining the resources for the sidelink communications at 2670, or any combination thereof.

For example, the UE 115-$r$ may determine a target data rate and/or target MCS at 2665, and may transmit the broadcast transmissions at 2675 based on (e.g., using, according to) the determined target data rate and/or target MCS. Similarly, the UE 115-$r$ may determine at least a subset of resources (e.g., sidelink resources) of a resource allocation at 2670, and may transmit the broadcast transmissions at 2675 based on at least the subset of the resource allocation.

Techniques described herein may enable more efficient and reliable distribution of broadcast transmissions. In particular, by categorizing UEs 115 subscribed to receive broadcast transmissions according to MCSs associated with the respective UEs 115, a base station 105 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115, further improving broadcast distribution.

Figure 27:
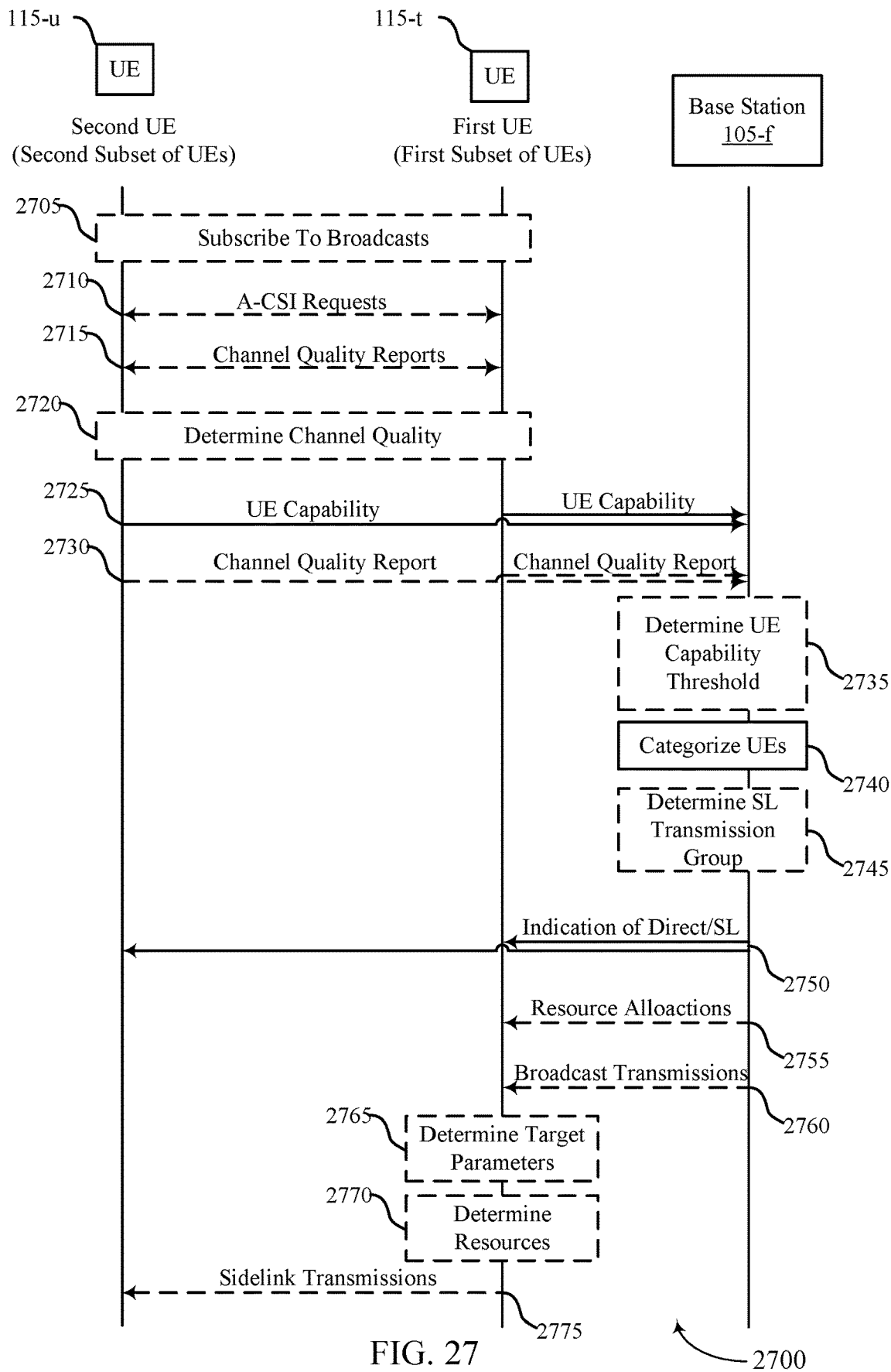
FIG. 27 illustrates an example of a process flow that supports techniques for UE capability-based UE subset selection for rate control in broadcasting with sidelink in accordance with one or more aspects of the present disclosure.

FIG. 27 illustrates an example of a process flow 2700 that supports techniques for UE capability-based UE subset selection for rate control in broadcasting with sidelink in accordance with one or more aspects of the present disclosure. In some examples, process flow 2700 may implement aspects of wireless communication system 100. In some examples, process flow 2700 may implement, or be implemented by, aspects of wireless communications system 100, wireless communications system 200, wireless communications system 300, wireless communications system 400, or any combination thereof. The process flow 2700 may illustrate an example of a base station 105, such as base station 105-$f$, categorizing UEs 115 into a first subset of UEs 115 (e.g., including UE 115-$t$) for direct link communications and a second subset of UEs 115 (e.g., including UE 115-$u$) for sidelink communications, then transmitting broadcast transmissions to the UEs 115. Alternative examples of the following may be implemented, where some processes are performed in a different order than described or are not performed. In some cases, processes may include additional features not mentioned below, or further processes may be added.

At 2705, one or more UEs 115 may subscribe to receive broadcast transmissions from the base station 105-$f$. In some aspects, the UE 115-$t$ and/or UE 115-$u$ may subscribe to receive broadcast transmissions from the base station 105-$f$ by transmitting uplink transmissions including an indication of the subscriptions to the base station 105-$f$. In some cases, base station 105-$f$ may identify that UE 115-$t$ and UE 115-$u$ are subscribed to receive broadcast transmissions including packets of data.

At 2710, the UE 115-$t$, the UE 115-$u$, or both, may transmit A-CSI requests to the other UE 115. In some aspects, the A-CSI requests may indicate requests for the receiving UE 115 of each A-CSI request to transmit a channel quality report to the transmitting UE 115 of each A-CSI request. In this regard, the UEs 115 may exchange A-CSI requests in order to measure channel qualities associated with sidelink communication links (e.g., sidelink connections 210, 310, and 410) between the respective UEs 115. For example, the UE 115-$t$ may transmit an A-CSI request to the UE 115-$u$, where the A-CSI request includes an indication for the UE 115-$u$ to transmit a channel quality report to the UE 115-$t$. In some aspects, each of the UEs 115 may transmit and/or receive A-CSI reports from any quantity of other UEs 115 subscribed to receive broadcasts from the base station 105-$f$.

At 2715, the UE 115-$t$, the UE 115-$u$, or both, may transmit a channel quality report to the respective UEs 115. In some aspects, the UE 115-$t$ and/or the UE 115-$u$ may transmit the channel quality reports based on (e.g., in response to) receiving the A-CSI requests at 2710. For example, upon receiving an A-CSI request from the UE 115-$t$, the UE 115-$u$ may measure reference signals received from the UE 115-$t$ via a sidelink connection (e.g., sidelink connection 210, 310, and/or 410), and may generate a channel quality report associated with the sidelink connection based on the measurements. Subsequently, the UE 115-*u* may transmit a channel quality report to the UE 115-*t*, where the channel quality report includes an indication of channel quality associated with communications between the UE 115-*t* and the UE 115-*u*. In some aspects, the channel quality report may include, but is not limited to, an indication of a maximum MCS associated with sidelink communications between the respective UEs 115.

In some aspects, the channel quality reports exchanged by the UEs 115 at 2715 may each include a source identifier (e.g., source ID) associated with (e.g., indicating) the UE 115 which transmitted the respective channel quality report. Each UE 115 may be associated with a unique source identifier. For example, the UE 115-*u* may transmit a channel quality report to the UE 115-*t*, where the channel quality report includes a source identifier associated with the UE 115-*u*. In some aspects, the source identifiers may be used to calculate which resources may be used to transmit feedback information via PSFCH. Moreover, when transmitting feedback (e.g., ACK, NACK, channel quality reports) to UEs 115, the feedback may include an indication of a source identifier associated with the UE 115 transmitting the feedback. In this regard, UEs 115 receiving feedback or other signaling may be able to use source identifiers indicated in the feedback or other signaling in order to identify which UE 115 the feedback is being received from.

In some aspects, UEs 115 may be configured to determine destination identifiers associated with each UE 115 based on the received source identifiers. For example, the UE 115-*t* may be configured to maintain a correspondence table, data object, database, or other configuration mapping source identifiers with destination identifiers. By maintaining associations between destination identifiers and source identifiers, UEs 115 may be able to efficiently determine where received signals are transmitted from, and where feedback signaling needs to be transmitted. For example, the UE 115-*t* may transmit an A-CSI request to the UE 115-*u* at 2710, where the A-CSI request includes a source identifier associated with the UE 115-*t*. The UE 115-*u* may subsequently determine a destination identifier associated with the UE 115-*t* based on (e.g., using) the received source identifier and a configuration (e.g., correspondence table) mapping source identifiers to destination identifiers. In this example, the UE 115-*u* may transmit the channel quality report to the UE 115-*t* at 2715, where the channel quality report includes an indication of the destination identifier associated with the UE 115-*t*, a source identifier associated with the UE 115-*u*, or both.

At 2720, the UE 115-*t*, the UE 115-*u*, or both, may determine a channel quality between the respective UEs 115. The UE 115-*t* and/or the UE 115-*u* may determine the channel quality between the UE 115-*t* and the UE 115-*u* based on exchanging the A-CSI requests at 2710, exchanging the channel quality reports at 2715, or both. In this regard, each UE 115 may determine a channel quality associated with communications between the respective UE 115 and any quantity of additional UEs 115 subscribed to receive broadcasts from the base station 105-*f*. In some aspects, the channel quality may include, but is not limited to, a maximum MCS associated with sidelink communications between the respective UEs 115.

In some cases, the UE 115-*t* and/or the UE 115-*u* may determine a channel quality associated with communications between the UE 115-*t* and UE 115-*u* based on additional or alternative signaling exchanged between the UEs 115, including SCI signaling, DMRS signaling, PSFCH signaling, or any combination thereof. In particular, each of the UE 115-*t* and/or the UE 115-*u* may perform measurements (e.g., RSRP measurements, RSRQ measurements, SNR measurements, SINR measurements) on SCI signaling, DMRS signaling, and/or PSFCH signaling received from the other UE 115, and may determine a channel quality based on the measurements. For example, the UE 115-*t* may receive PSFCH transmissions from the UE 115-*u*, and may determine a channel quality for communications between the UEs 115 based on the PSFCH transmissions (e.g., based on RSRP measurements performed on the PSFCH transmissions). In some cases, PSFCH transmissions may enable UEs 115 to determine channel qualities with the shortest delay. Similarly, by way of another example, the UE 115-*t* may receive an SCI message, a DMRS signal, or both, from the UE 115-*u*, and may determine a channel quality for communications between the UEs 115 based on the SCI message and/or DMRS signal (e.g., based on measurements performed on the SCI message and/or DMRS signal).

At 2725, the UE 115-*t*, the UE 115-*u*, or both, may transmit a report including an indication of one or more parameters associated with respective UE capabilities. Parameters associated with UE capabilities may include a number of antennas or antenna panels configured at the UE 1115, supported processing power (e.g., the number of processor or processor units, power capabilities, memory including processor and other memory, etc.), full duplexing or half duplexing capability, time or frequency domain duplexing capability, or a combination of these. For example, the UE 115-*t* may transmit a report including an indication of a UE capabilities, and the UE 115-*u* may transmit a report including an indication of UE capabilities. In some aspects, the UE 115-*t* and/or the UE 115-*u* may transmit the report at 2720 based on subscribing to receive broadcast transmissions from the base station 105-*f* at 2705, exchanging the A-CSI requests and/or channel quality reports at 2715, or any combination thereof. In some cases, the UE capabilities are indicated via a capability metric that is calculated at each respective UE 115.

At 2730, the UE 115-*t*, the UE 115-*u*, or both, may transmit a report (e.g., channel quality report) indicating a channel quality associated with communications between the respective UE 115 and one or more other UEs 115. In some aspects, the reports indicating channel qualities between UEs 115 received at 2725 may include indications of source identifiers, destination identifiers, or both, associated with the respective UEs 115. For example, the UE 115-*t* may transmit a report indicating a channel quality associated with communications between the UE 115-*t* and the UE 115-*u*. In this example, the report may include an indication of a source identifier associated with the UE 115-*t*, a destination identifier associated with the UE 115-*t*, a source identifier associated with the UE 115-*u*, a destination identifier associated with the UE 115-*u*, or any combination thereof.

At 2735, the base station 105-*f* may determine a threshold UE capability (e.g., Capability Thresh), or both. In some aspects, the base station 105-*f* may determine the threshold UE capability based on identifying UEs 115 subscribed to receive broadcast transmissions from the base station 105-*f*, receiving the reports indicating parameters associated with UE capabilities at 2725, receiving the reports indicating channel qualities between UEs 115 at 2730, or any combination thereof. In some aspects, the base station 105-*f* may determine the threshold UE capability based on a time delay budget reported by the UE for transmitting the broadcast transmissions, a data rate requirement for transmitting the broadcast transmissions, available Uu resources, broadcast channel qualities, or a combination thereof.

At 2740, the base station 105-*f* may categorize the UEs 115 (e.g., UE 115-*t*, UE 115-*u*) into a first subset of UEs 115 that is to receive the broadcast transmissions via direct link communications from the base station 105-*f*, and into a second subset of UEs 115-*d* that is to receive the broadcast transmissions via sidelink communications from the first subset of UEs 115. In some aspects, the base station 105-*f* may categorize the UEs 115 into the first and second subsets of UEs 115 based on identifying UEs 115 subscribed to receive broadcast transmissions from the base station 105-*f* at 2705, receiving the reports indicating parameters associated with UE capabilities at 2725, receiving the reports indicating channel qualities between UEs 115 at 2730, determining the UE capabilities and/or threshold UE capabilities at 2735, or any combination thereof.

In some aspects, the base station 105-*f* may categorize the UEs 115 into the first and second subsets of UEs 115 based on determined UE capabilities (e.g., a capability metric calculated at the base station 105-*f* or the UEs 115) associated with each of the respective UEs 115. In this regard, the base station 105-*f* may categorize the UEs 115 at 2740 based on receiving the reports indicating the UE capabilities associated with each of the respective UEs 115 at 2725, determining the threshold UE capability at 2735, or any combination thereof. In particular, the base station 105-*f* may categorize the UEs 115 into the first and second subsets of UEs 115 based on whether or not a UE capability associated with the respective UE 115 satisfies the threshold UE capability.

For example, the base station 105-*f* may categorize the UE 115-*t* into a first subset of UEs 115 which are to receive broadcast transmissions from the base station 105-*f* via direct link communications (e.g., via direct links 205, 305, and/or 405) based on determining that the UE capability associated with the UE 115-*t* satisfies the threshold UE capability. For instance, the base station 105-*f* may categorize the UE 115-*t* into the first subset of UEs 115 based on determining that the UE capability associated with the UE 115-*t* is greater than or equal to the threshold UE capability (e.g., threshold UE capability satisfied based on $Capability_{UE\ 115\text{-}p} \geq Capability_{Thresh}$).

Conversely, the base station 105-*f* may categorize the UE 115-*u* into a second subset of UEs 115 which are to receive broadcast transmissions via sidelink communications (e.g., via sidelink connections 210, 310, and/or 410) from the first subset of UEs 115 based on determining that the UE capability associated with the UE 115-*u* fails to satisfy the threshold UE capability. For instance, the base station 105-*f* may categorize the UE 115-*u* into the second subset of UEs 115 based on determining that the UE capability associated with the UE 115-*u* is less than the threshold UE capability (e.g., threshold UE capability not satisfied based on $Capability_{UE\ 115\text{-}q} < Capability_{Thresh}$).

At 2745, the base station 105-*f* may determine one or more sidelink transmission groups for distribution of the broadcast transmissions. In some aspects, each sidelink transmission group may include one or more UEs 115 from the first subset of UEs 115 (e.g., one or more direct-receiving UEs 115) and one or more UEs 115 from the second subset of UEs 115 (e.g., one or more sidelink-receiving UEs 115). In this regard, each sidelink transmission group may indicate which UEs 115 of the second subset of UEs 115 (e.g., which sidelink-receiving UEs 115) are to receive the broadcast transmissions from which UEs 115 of the first subset of UEs 115 (e.g., which direct-receiving UEs 115).

In some aspects, the base station 105-*f* may determine the sidelink transmission groups based on identifying the UEs 115 subscribed to receive broadcasts from the base station 105-*f* at 2705, receiving the reports indicating parameters associated with UE capabilities for the UEs 115 at 2725, receiving the reports indicating channel qualities between UEs 115 at 2730, determining/receiving the UE capabilities and/or threshold UE capability at 2735, categorizing the UEs 115 into the respective subsets at 2740, or any combination thereof.

In some aspects, the base station 105-*f* may determine a group identifier (e.g., group ID) associated with each sidelink transmission group. The group identifier may be common across each UE 115 included within the respective sidelink transmission group. Additionally, the base station 105-*f* may determine a destination identifier, a source identifier, or both, associated with each UE 115 within each respective sidelink transmission group. For example, as noted previously herein, the reports indicating channel qualities between UEs 115 received at 2730 may indicate destination identifiers and/or source identifiers associated with the UEs 115. In this example, the base station 105-*f* may determine destination identifiers and/or source identifiers associated with the UEs 115 based on the indications of the source identifiers and/or destination identifiers received in the reports, a configuration (e.g., correspondence table) mapping source identifiers to destination identifiers, or any combination thereof.

In some cases, the base station 105-*f* may determine a sidelink transmission group for each UE 115 of the first subset of UEs 115. For example, the base station 105-*f* may categorize the UE 115-*t* into the first subset of UEs 115 (e.g., direct-receiving UEs 115) and may categorize the UE 115-*u* into the second subset of UEs 115 (e.g., sidelink-receiving UEs 115) at 2740. In this example, the base station 105-*f* may determine a sidelink transmission group associated with the UE 115-*t* based on the categorization, the channel quality between the UE 115-*t* and the UE 115-*u*, or any combination thereof. In this example, the sidelink transmission group may include the UE 115-*t* and the UE 115-*u*. In this regard, the sidelink transmission group may indicate that the UE 115-*u* is to receive the broadcast transmissions via sidelink communications from the UE 115-*t*. In this example, by determining the sidelink transmission group, the base station 105-*f* may determine a group identifier associated with the sidelink transmission group, destination identifiers associated with the UE 115-*t* and/or UE 115-*u*, source identifiers associated with the UE 115-*t* and/or UE 115-*u*, or any combination thereof.

At 2750, the base station 105-*f* may transmit, to the UE 115-*t* and/or the UE 115-*u*, an indication (e.g., control information) that the broadcast transmissions are to be received via either direct link communications or sidelink communications. In this regard, the base station 105-*f* may indicate whether each UE 115 has been categorized into the first subset of UEs 115 (e.g., direct-receiving UEs 115) or the second subset of UEs 115 (e.g., sidelink-receiving UEs 115). In some aspects, the indication transmitted at 2750 may include control information associated with (e.g., corresponding to) the broadcast transmissions, where the control information is transmitted via MAC-CE signaling, DCI, a wakeup signal, or any combination thereof. In some aspects, the base station 105-*f* may transmit the indication at 2750 based on categorizing the UEs 115 at 2740.

For example, the base station 105-*f* may transmit an indication to the UE 115-*t* indicating that the UE 115-*t* is to receive broadcast transmissions via direct link communications (e.g., via direct links 205, 305, 405). Conversely, the base station 105-*f* may transmit an indication to the UE 115-*u* indicating that the UE 115-*u* is to receive broadcast transmissions via sidelink communications (e.g., via sidelink connections 210, 310, 410) from the first subset of UEs 115 (e.g., from the UE 115-*t*).

Additionally or alternatively, the base station 105-*f* may transmit, to the UE 115-*t* and/or UE 115-*u*, information associated with the determined sidelink transmission groups. In this regard, the base station 105-*f* may indicate which sidelink transmission group each of the UEs 115 belongs to. The information associated with the determined sidelink transmission groups may include, but is not limited to, a group identifier associated with the respective sidelink transmission groups, destination identifiers and/or source identifiers associated with each UE 115 within the respective sidelink transmission group, or any combination thereof. In some aspects, the base station 105-*f* may transmit the indication of information associated with the sidelink transmission groups based on determining the sidelink transmission groups at 2745.

For example, in cases where the base station 105-*f* determines the UE 115-*t* and the UE 115-*u* are included within the same sidelink transmission group, the base station 105-*f* may transmit, to the UE 115-*t* and/or UE 115-*u*, an indication of the group identifier associated with the sidelink transmission group, a source identifier associated with the UE 115-*t* and/or the UE 115-*u*, a destination identifier associated with the UE 115-*t* and/or UE 115-*u*, or any combination thereof. Moreover, in cases where the sidelink transmission group includes additional UEs 115 within the second subset of UEs 115 (e.g., additional sidelink-receiving UEs 115), the base station 105-*f* may indicate, to the UE 115-*t* and/or the UEs 115 of the second subset of UEs 115, source identifiers and/or destination identifiers associated with each of the UEs 115 of the sidelink transmission group.

At 2755, the base station 105-*f* may transmit, to the UE 115-*t* and/or the UE 115-*u*, resource allocations to be used by the UEs 115 to transmit and/or receive the broadcast transmissions. The resource allocations may include sets of time resources, sets of frequency resources, sets of spatial resources, or any combination thereof. In some aspects, the base station 105-*f* may transmit the resource allocations based on determining the MCSs and/or threshold MCS at 2735, categorizing the UEs 115 at 2740, determining the sidelink transmission groups at 2745, transmitting the indications at 2750, or any combination thereof.

For example, the base station 105-*f* may transmit a first resource allocation to the UE 115-*t*, where the first resource allocation is to be used by the UE 115-*t* to receive the broadcast transmissions from the base station 105-*f*. Similarly, by way of another example, the base station 105-*f* may transmit a second resource allocation to the UE 115-*t*, where the second resource allocation is to be used by the UE 115-*t* for transmitting the broadcast transmissions to the UE 115-*u* via a sidelink communication link. Moreover, in some cases, the base station 105-*f* may additionally transmit the second resource allocation to the UE 115-*u*, where the second resource allocation is to be used by the UE 115-*u* for receiving the broadcast transmissions from the UE 115-*t*.

At 2760, the base station 105-*f* may transmit the broadcast transmissions to the first subset of UEs 115. For example, in cases where the UE 115-*t* is categorized into the first subset of UEs 115, the base station 105-*f* may transmit the broadcast transmissions to the UE 115-*t*. In some aspects, the base station 105-*f* may transmit the broadcast transmissions at 2760 based on (e.g., in accordance with) the indications of direct-receiving UEs 115 and/or sidelink-receiving UEs 115 transmitted at 2750. Additionally or alternatively, the base station 105-*f* may transmit the broadcast transmissions to the first subset of UEs 115 based on determining the UE capability and/or threshold UE capability at 2735, categorizing the UEs 115 at 2740, determining the sidelink transmission groups at 2745, transmitting the resource allocations at 2755, or any combination thereof. For example, the base station 105-*f* may transmit the broadcast transmissions at 2760, and the UE 115-*t* may receive the broadcast transmissions at 2760, using the resource allocations indicated to the UE 115-*t* at 2755.

At 2765, the first subset of UEs 115 (e.g., UE 115-*t*) may determine one or more target parameters for transmitting the broadcast transmissions to the second subset of UEs 115 (e.g., UE 115-*u*). Parameters for transmitting the broadcast transmissions to the second subset of UEs 115 may include, but are not limited to, a target data rate, a target MCS, or both. In some aspects, the UE 115-*t* may determine the one or more parameters based on the determined channel qualities between the UE 115-*t* and the second subset of UEs 115 (e.g., UE 115-*u*) determined at 2720.

For example, the UE 115-*t* may determine a target data rate for transmitting the sidelink transmissions to the second subset of UEs 115 (e.g., UE 115-*u*). The target data rate may include a data rate which satisfies a threshold data rate. By way of another example, the UE 115-*t* may determine a target MCS for transmitting the sidelink transmissions to the second subset of UEs 115 (e.g., UE 115-*u*). In this example, the target MCS may include an MCS which allows for sidelink communications with a threshold quantity and/or threshold percentage of UEs 115 within the second subset of UEs 115. In this regard, the UE 115-*t* may select the target MCS as a percentile of the MCS pool (e.g., a $27^{th}$ or $100^{th}$ percentile) of the second subset of UEs 115, thus allowing for sidelink communications with the determined percentile of the second subset of UEs 115. However, as noted previously herein, there may be a tradeoff between coverage and data rate, where a lower target MCS may improve coverage but may reduce the data rate, while a higher target MCS may reduce coverage but may improve the data rate.

At 2770, the first subset of UEs 115 (e.g., UE 115-*t*) may determine a set of resources for transmitting the broadcast transmissions to the second subset of UEs 115 (e.g., UE 115-*u*). The set of resources (e.g., set of sidelink resources) may include a set of time resources, a set of frequency resources, a set of spatial resources, or any combination thereof. In some aspects, the first subset of UEs 115 (e.g., UE 115-*t*) may determine the set of resources for transmitting the broadcast transmissions to the second subset of UEs 115 (e.g., UE 115-*u*) based on determining the channel quality between respective UEs 115 at 2720, receiving the indications at 2750, receiving the resource allocations at 2755, receiving the broadcast transmissions at 2760, determining the target parameters at 2765, or any combination thereof.

For example, the UE 115-*t* may receive a resource allocation from the base station 105-*f* at 555, where the resource allocation is to be used by the UE 115-*t* for transmitting the broadcast transmissions to the second subset of UEs 115 (e.g., UE 115-*u*). In this example, the UE 115-*t* may determine at least a subset of the resource allocation which may include (e.g., exhibit, match, exceed) the target data rate determined at 2765. In this regard, the UE 115-*t* may determine at least a subset of the resource allocation which includes a data rate which satisfies (e.g., is greater than or equal to) the determined target data rate. By way of another example, the UE 115-*t* may determine a channel quality between the UE 115-*t* and the UE 115-*u* at 2720. The channel quality may include a maximum MCS for communications between the UE 115-*t* and the UE 115-*u*. In this example, the UE 115-*t* may determine a set of sidelink resources for transmitting the broadcast transmissions to the UE 115-*u* based on the determined channel quality (e.g., determined maximum MCS).

At 2775, the first subset of UEs 115 (e.g., UE 115-*t*) may transmit one or more sidelink transmissions including the broadcasts (e.g., broadcast information) received from the base station 105-*f* to the second subset of UEs 115 (e.g., UE 115-*u*) via sidelink communication links (e.g., sidelink connections 210, 310, and/or 410) between the respective UEs 115. In some aspects, the first subset of UEs 115 (e.g., UE 115 *p*) may transmit the sidelink transmissions including the broadcasts received from the base station 105-*f* via a sidelink communication link using unicast techniques, groupcast techniques, broadcast techniques, or any combination thereof. In some aspects, the first subset of UEs 115 may transmit the sidelink transmissions including the broadcasts, and the second subset of UEs 115 may receive the sidelink transmissions including the broadcasts, based on determining the channel quality between respective UEs 115 at 2720, receiving the indications at 2750, receiving the resource allocations at 2755, receiving the broadcast transmissions at 2760, determining the target parameters at 2765, determining the resources for the sidelink communications at 2770, or any combination thereof.

For example, the UE 115-*t* may determine a target data rate and/or target MCS at 2765, and may transmit the broadcast transmissions at 2775 based on (e.g., using, according to) the determined target data rate and/or target MCS. Similarly, the UE 115-*t* may determine at least a subset of resources (e.g., sidelink resources) of a resource allocation at 2770, and may transmit the broadcast transmissions at 2775 based on at least the subset of the resource allocation.

Techniques described herein may enable more efficient and reliable distribution of broadcast transmissions. In particular, by categorizing UEs 115 subscribed to receive broadcast transmissions according to UE capabilities associated with the respective UEs 115, a base station 105 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115, further improving broadcast distribution.

Figure 28:
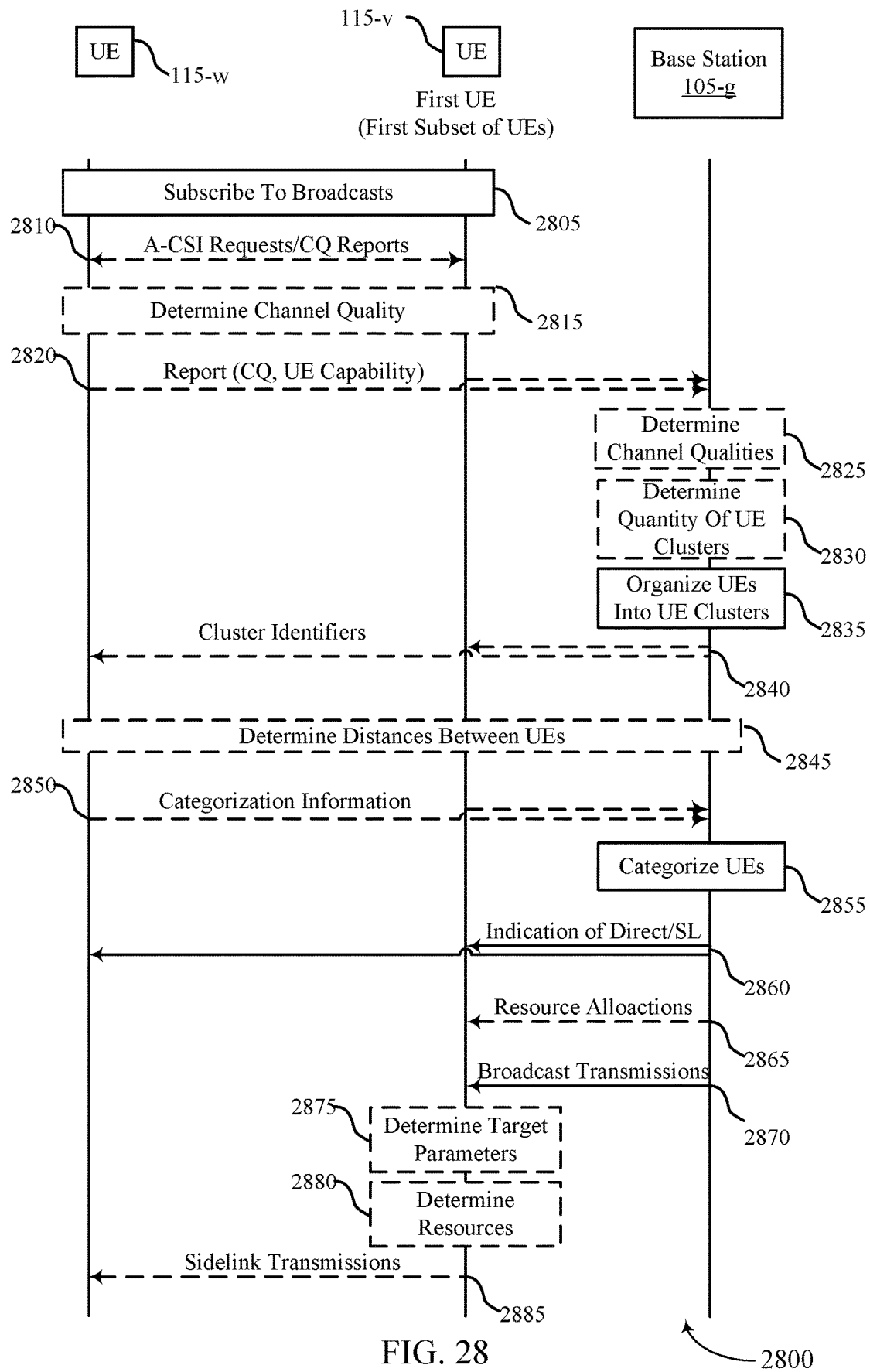
FIG. 28 illustrates an example of a process flow that supports techniques for cluster-based UE subset selection for rate control in broadcasting with sidelink in accordance with one or more aspects of the present disclosure.

FIG. 28 illustrates an example of a process flow 2800 that supports techniques for cluster-based UE subset selection for rate control in broadcasting with sidelink in accordance with one or more aspects of the present disclosure. In some examples, process flow 2800 may implement, or be implemented by, aspects of wireless communications system 100, wireless communications system 200, wireless communications system 300, wireless communications system 400, or any combination thereof. The process flow 2800 may illustrate an example of a base station 105, such as base station 105-*g*, categorizing UEs 115 into a first subset of UEs 115 (e.g., including UE 115-*v*) for direct link communications and a second subset of UEs 115 (e.g., including UE 115-*w*) for sidelink communications, then transmitting broadcast transmissions to the UEs 115. Alternative examples of the following may be implemented, where some processes are performed in a different order than described or are not performed. In some cases, processes may include additional features not mentioned below, or further processes may be added.

At 2805, one or more UEs 115 may subscribe to receive broadcast transmissions from the base station 105-*g*. In some aspects, the UE 115-*v* and/or UE 115-*w* may subscribe to receive broadcast transmissions from the base station 105-*g* by transmitting uplink transmissions including an indication of the subscriptions to the base station 105-*g*. In some cases, base station 105-*g* may identify that UE 115-*v* and UE 115-*w* are subscribed to receive broadcast transmissions including packets of data.

At 2810, the UE 115-*v*, the UE 115-*w*, or both, may exchange A-CSI requests and/or channel quality reports. In some aspects, the A-CSI requests may indicate requests for the receiving UE 115 of each A-CSI request to transmit a channel quality report to the transmitting UE 115 of each A-CSI request. In this regard, the UEs 115 may exchange A-CSI requests in order to measure channel qualities associated with sidelink communication links (e.g., sidelink connections 210, 310, and 410) between the respective UEs 115. For example, the UE 115-*v* may transmit an A-CSI request to the UE 115-*w*, where the A-CSI request includes an indication for the UE 115-*w* to transmit a channel quality report to the UE 115-*v*. In some aspects, each of the UEs 115 may transmit and/or receive A-CSI reports from any quantity of other UEs 115 subscribed to receive broadcasts from the base station 105-*g*.

In some aspects, the UE 115-*v*, the UE 115-*w*, or both, may transmit a channel quality report to the other respective UE 115. In some aspects, the UE 115-*v* and/or the UE 115-*w* may transmit the channel quality reports based on (e.g., in response to) receiving the A-CSI requests. For example, upon receiving an A-CSI request from the UE 115-*v*, the UE 115-*w* may measure reference signals received from the UE 115-*v* via a sidelink connection (e.g., sidelink connection 210, 310, and/or 410), and may generate a channel quality report associated with the sidelink connection based on the measurements. Subsequently, the UE 115-*w* may transmit a channel quality report to the UE 115-*v*, where the channel quality report includes an indication of channel quality associated with communications between the UE 115-*v* and the UE 115-*w*. In some aspects, the channel quality report may include, but is not limited to, an indication of a maximum MCS associated with sidelink communications between the respective UEs 115.

In some aspects, the channel quality reports exchanged by the UEs 115 at 2815 may each include a source identifier (e.g., source ID) associated with (e.g., indicating) the UE 115 which transmitted the respective channel quality report. Each UE 115 may be associated with a unique source identifier. For example, the UE 115-*w* may transmit a channel quality report to the UE 115-*v*, where the channel quality report includes a source identifier associated with the UE 115-*w*. In some aspects, the source identifiers may be used to calculate which resources may be used to transmit feedback information via PSFCH. Moreover, when transmitting feedback (e.g., ACK, NACK, channel quality reports) to UEs 115, the feedback may include an indication of a source identifier associated with the UE 115 transmitting the feedback. In this regard, UEs 115 receiving feedback or other signaling may be able to use source identifiers indicated in the feedback or other signaling in order to identify which UE 115 the feedback is being received from.

In some aspects, UEs 115 may be configured to determine destination identifiers associated with each UE 115 based on the received source identifiers. For example, the UE 115-*v* may be configured to maintain a correspondence table, data object, database, or other configuration mapping source identifiers with destination identifiers. By maintaining associations between destination identifiers and source identifiers, UEs 115 may be able to efficiently determine where received signals are transmitted from, and where feedback signaling needs to be transmitted. For example, the UE 115-*v* may transmit an A-CSI request to the UE 115-*w* at 2810, where the A-CSI request includes a source identifier associated with the UE 115-*v*. The UE 115-*w* may subsequently determine a destination identifier associated with the UE 115-*v* based on (e.g., using) the received source identifier and a configuration (e.g., correspondence table) mapping source identifiers to destination identifiers. In this example, the UE 115-*w* may transmit the channel quality report to the UE 115-*v* at 2815, where the channel quality report includes an indication of the destination identifier associated with the UE 115-*v*, a source identifier associated with the UE 115-*w*, or both.

At 2815, the UE 115-*v*, the UE 115-*w*, or both, may determine a channel quality between the respective UEs 115. The UE 115-*v* and/or the UE 115-*w* may determine the channel quality between the UE 115-*v* and the UE 115-*w* based on exchanging the A-CSI requests and/or channel quality reports at 2810. In this regard, each UE 115 may determine a channel quality associated with communications between the respective UE 115 and any quantity of additional UEs 115 subscribed to receive broadcasts from the base station 105-*g*. In some aspects, the channel quality may include, but is not limited to, a maximum MCS associated with sidelink communications between the respective UEs 115.

In some cases, the UE 115-*v* and/or the UE 115-*w* may determine a channel quality associated with communications between the UE 115-*v* and UE 115-*w* based on additional or alternative signaling exchanged between the UEs 115, including SCI signaling, DMRS signaling, PSFCH signaling, or any combination thereof. In particular, each of the UE 115-*v* and/or the UE 115-*w* may perform measurements (e.g., RSRP measurements, RSRQ measurements, SNR measurements, SINR measurements) on SCI signaling, DMRS signaling, and/or PSFCH signaling received from the other UE 115, and may determine a channel quality based on the measurements. For example, the UE 115-*v* may receive PSFCH transmissions from the UE 115-*w*, and may determine a channel quality for communications between the UEs 115 based on the PSFCH transmissions (e.g., based on RSRP measurements performed on the PSFCH transmissions). In some cases, PSFCH transmissions may enable UEs 115 to determine channel qualities with the shortest delay. Similarly, by way of another example, the UE 115-*v* may receive an SCI message, a DMRS signal, or both, from the UE 115-*w*, and may determine a channel quality for communications between the UEs 115 based on the SCI message and/or DMRS signal (e.g., based on measurements performed on the SCI message and/or DMRS signal).

At 2820, the UE 115-*v*, the UE 115-*w*, or both, may transmit a report (e.g., channel quality report, UE capability report) indicating one or more parameters associated with the respective UEs 115. For example, the UE 115-*v* and/or UE 115-*w* may transmit, to the base station 105-*g*, a report (e.g., channel quality report) including an indication of a channel quality associated with communications between the respective UE 115 and one or more other UEs 115. By way of another example, the UE 115-*v* and/or UE 115-*w* may transmit, to the base station 105-*g*, a report (e.g., UE capability report/message) indicating a processing capability of the respective UE 115.

In some aspects, the reports transmitted at 2820 may include indications of source identifiers, destination identifiers, or both, associated with the respective UEs 115. For example, the UE 115-*v* may transmit a report indicating a channel quality associated with communications between the UE 115-*v* and the UE 115-*w*. In this example, the report may include an indication of a source identifier associated with the UE 115-*v*, a destination identifier associated with the UE 115-*v*, a source identifier associated with the UE 115-*w*, a destination identifier associated with the UE 115-*w*, or any combination thereof.

At 2825, the base station 105-*g* may determine channel qualities associated with the respective UEs 115 subscribed to receive broadcasts. In some aspects, the base station 105-*g* may determine channel qualities associated with communications between two separate UEs 115, channel qualities associated with communications between the base station 105-*g* and the respective UEs 115, or both. For example, the base station 105-*g* may determine a channel quality associated with communications between the base station 105-*g* and the UE 115-*v*, the UE 115-*w*, or both. Additionally or alternatively, the base station 105-*g* may determine a channel quality associated with communications between the UE 115-*v* and the UE 115-*w*. In some aspects, the base station 105-*g* may determine channel qualities at 2825 bases on identifying the UEs 115 subscribed to receive broadcasts at 2805, receiving the reports (e.g., channel quality reports) at 2820, or both.

At 2830, the base station 105-*g* may determine a quantity of UE clusters in which the UEs 115 subscribed to receive broadcasts may be organized. In some aspects, the base station 105-*g* may determine the quantity of UE clusters based on identifying the set of UEs 115 subscribed to receive broadcasts at 2805, receiving the reports (e.g., channel quality reports, UE capability reports) at 2820, determining the channel qualities at 2825, or any combination thereof. For example, the base station 105-*g* may determine the quantity of UE clusters based on determining UE processing capabilities of the respective UEs 115, as indicated in the UE capability reports received at 2820. In some aspects, the base station 105-*g* may determine the quantity of UE clusters based on an availability of resources for transmitting the broadcast transmissions, a time delay budget by the UE for transmitting the broadcast transmissions, a data rate requirement for transmitting the broadcast transmissions, or any combination thereof. Additionally or alternatively, the base station 105-*g* may randomly determine the quantity of UE clusters (e.g., via a random number generator).

At 2835, the base station 105-*g* may organize the UEs 115 into the set of UE clusters. In this regard, the base station 105-*g* may organize the UEs 115 into the quantity of UE clusters determined at 2830. Additionally or alternatively, the base station 105-*g* may organize the UEs 115 into the UE clusters based on identifying the set of UEs 115 subscribed to receive broadcasts at 2805, receiving the reports (e.g., channel quality reports, UE capability reports) at 2820, determining the channel qualities at 2825, or any combination thereof. For example, the base station 105-*g* may determine a UE cluster for each of the UEs 115 based on a report indicating channel qualities between the UEs 115 and additional UEs 115 which are subscribed to receive broadcasts.

In some aspects, the base station 105-g may organize the UEs 115 into the UE clusters such that each UE cluster may include at least one UE 115 of a first subset of UEs 115 (e.g., at least one direct-receiving UE 115) and at least one UE 115 of a second subset of UEs 115 (e.g., at least one sidelink-receiving UE 115). In this regard, the base station 105-g may organize the UEs 115 into the UE clusters such that each UE cluster includes two or more UEs 115. For example, the base station 105-g may organize the UE 115-v and the UE 115-w into a single UE cluster. In some aspects, the base station 105-g may organize the UEs 115 into clusters by selecting primary UEs 115, and determining a nearest primary UE 115 for the remaining, non-primary UEs 115, as discussed previously herein with respect to FIG. 4.

At 2840, the base station 105-g may transmit, to the UE 115-v, the UE 115-w, or both, a cluster identifier (e.g., cluster ID) indicating the UE cluster to which each of the respective UEs 115 belongs. For example, in cases where the base station 105-g organizes the UE 115-v and the UE 115-w into a single cluster, the base station 105-g may transmit a cluster identifier associated with the cluster to the UE 115-v and/or the UE 115-w. In some aspects, the base station 105-g may transmit the cluster identifiers based on identifying the UEs 115 subscribed to receive broadcasts at 2805, receiving the reports (e.g., channel quality reports, UE capability reports) at 2820, determining the quantity of clusters at 2825, organizing the UEs 115 into clusters, or any combination thereof.

The cluster identifier associated with each respective UE cluster may be common across each UE 115 included within the respective UE cluster. In some aspects, the base station 105-g may additionally or alternatively determine a destination identifier, a source identifier, or both, associated with each UE 115 within each respective UE cluster. For example, as noted previously herein, the reports indicating channel qualities between UEs 115 received at 2820 may indicate destination identifiers and/or source identifiers associated with the UEs 115. In this example, the base station 105-g may determine destination identifiers and/or source identifiers associated with the UEs 115 based on the indications of the source identifiers and/or destination identifiers received in the reports, a configuration (e.g., correspondence table) mapping source identifiers to destination identifiers, or any combination thereof. In some aspects, the base station 105-g may additionally transmit destination identifiers, source identifiers, or both, associated with each UE 115 within the respective UE clusters at 2835. In some aspects, the UE 115-v, the UE 115-w, or both, may determine that the respective UE 115 is included in a first subset of UEs 115 (e.g., direct-receiving UEs 115) or a second subset of UEs 115 (e.g., sidelink-receiving UEs 115) of the UE cluster based on receiving the cluster identifier.

At 2845, the UEs 115 (e.g., UE 115-v, UE 115-w), the base station 105-g, or both, may determine distances between the respective UEs 115. In particular, the UEs 115 and/or base station 105-g may determine distances between each of the UEs 115 within each respective UE cluster. For example, in cases where the UE 115-v and the UE 115-w are organized into the same UE cluster, the UE 115-v, the UE 115-w, and/or the base station 105-g may determine a distance between the UE 115-v and the UE 115-w. In this example, the UEs 115 and/or the base station 105-g may also determine distances between each of the UEs 115-v and 115-w and additional UEs 115 within the UE cluster. In some aspects, the UEs 115 and/or the base station 105-g may determine an average distance (and/or median distance) between each UE 115 and the remaining UEs 115 within the UE cluster.

At 2850, the UE 115-v, the UE 115-w, or both, may transmit categorization information to the base station 105-g. For example, the UE 115-v and/or the UE 115-w may transmit, to the base station 105-g, an indication of the first subset of UEs 115 of the UE cluster (e.g., indication of direct-receiving UEs 115 of the UE cluster), an indication of the second subset of UEs 115 of the UE cluster (e.g., indication of sidelink-receiving UEs 115 of the UE cluster), or both. For instance, in cases where the UE 115-v and the UE 115-w are organized into the same UE cluster, the UE 115-v and/or the UE 115-w may transmit an indication that the UE 115-v is included in the first subset of UEs 115 (e.g., direct-receiving UEs 115) of the UE cluster, an indication that the UE 115-w is included in the second subset of UEs 115 (e.g., sidelink-receiving UEs 115) of the UE cluster, or both. In this regard, the UEs 115 of each UE cluster may self-select a categorization (e.g., direct-receiving UEs vs. sidelink-receiving UEs) for the respective UE clusters.

In some aspects, the UEs 115 of each UE cluster may determine a cluster categorization for the respective UE clusters based on determining distances (e.g., average distances, median distances) between each of the UEs 115 within the UE cluster, determining channel qualities (e.g., average channel qualities, median channel qualities) between each of the UEs 115 within the UE cluster, or any combination thereof. For example, the UE 115-v and the UE 115-w may determine an average and/or median distance between each of the UEs 115-v and 115-w and the remaining UEs 115 within the UE cluster, and may select the UE 115 (e.g., UE 115-v) with the smallest average and/or median distance to other UEs 115 within the UE cluster as direct-receiving UEs 115. Accordingly, in this example, the UE 115-v and the UE 115-w may select the UE 115-v as being included in the first subset of UEs 115, and may transmit the categorization information (e.g., indication of first/second subsets of UEs 115) to the base station 105-g at 2850.

At 2855, the base station 105-g may categorize the UEs 115 of each respective UE cluster (e.g., UE 115-v, UE 115-w) into a first subset of UEs 115 that is to receive the broadcast transmissions via direct link communications from the base station 105-g, and into a second subset of UEs 115-d that is to receive the broadcast transmissions via sidelink communications from the first subset of UEs 115. In some aspects, the base station 105-g may categorize the UEs 115 of each UE cluster into the first and second subsets of UEs 115 based on identifying UEs 115 subscribed to receive broadcast transmissions from the base station 105-g at 2805, receiving the reports (e.g., channel quality reports, UE capability reports) at 2820, determining the channel qualities at 2825, determining the quantity of UE clusters and/or organizing the UE clusters at 2830 and 2835, determining the distances between UEs 115 at 2845, receiving the categorization information at 2850, or any combination thereof.

For example, the base station 105-g may categorize the UEs 115 into the first subset of UEs 115 and the second subset of UEs 115 based on (e.g., in accordance with) the categorization information received from the UE 115-v and/or the UE 115-w at 2850. In some cases, the base station 105-g may instead elect to disregard the categorization information received from the UEs 115 to determine its own categorization. In some aspects, the base station 105-g may categorize the UEs 115 based on determined distances (e.g., average distances, median distances) between the UEs 115 of each UE cluster, determined channel qualities between UEs 115 of each UE cluster, determined channel qualities between the base station 105-g and each UE 115 of the respective UE clusters, or any combination thereof. For example, the base station 105-g may select the UE 115 with the smallest average distance between the remaining UEs 115 of the respective UE cluster as a direct-receiving UE 115. By way of another example, the base station 105-g may select the UE 115 with the highest average channel quality between the remaining UEs 115 of the respective UE cluster as a direct-receiving UE 115.

At 2860, the base station 105-g may transmit, to the UE 115-v and/or the UE 115-w, an indication (e.g., control information) that the broadcast transmissions are to be received via either direct link communications or sidelink communications. In this regard, the base station 105-g may indicate whether each UE 115 has been categorized into the first subset of UEs 115 (e.g., direct-receiving UEs 115) or the second subset of UEs 115 (e.g., sidelink-receiving UEs 115) within the respective UE cluster 415. In some aspects, the indication transmitted at 2860 may include control information associated with (e.g., corresponding to) the broadcast transmissions, where the control information is transmitted via MAC-CE signaling, DCI, a WUS, or any combination thereof. In some aspects, the base station 105-g may transmit the indication at 2860 based on categorizing the UEs 115 at 2855. For example, the base station 105-g may transmit an indication to the UE 115-v indicating that the UE 115-v is to receive broadcast transmissions via direct link communications (e.g., via direct links 205, 305, 405). Conversely, the base station 105-g may transmit an indication to the UE 115-w indicating that the UE 115-w is to receive broadcast transmissions via sidelink communications (e.g., via sidelink connections 210, 310, 410) from the first subset of UEs 115 (e.g., from the UE 115-v).

At 2865, the base station 105-g may transmit, to the UE 115-v and/or the UE 115-w, resource allocations to be used by the UEs 115 to transmit and/or receive the broadcast transmissions. The resource allocations may include sets of time resources, sets of frequency resources, sets of spatial resources, or any combination thereof. In some aspects, the base station 105-g may transmit the resource allocations based on receiving the reports at 2820, determining the channel qualities at 2825, organizing the UEs 115 into clusters at 2835, determining the distances between UEs 115 at 2845, receiving the categorization information at 2850, categorizing the UEs 115 at 2855, or any combination thereof.

For example, the base station 105-g may transmit a first resource allocation to the UE 115-v, where the first resource allocation is to be used by the UE 115-v to receive the broadcast transmissions from the base station 105-g. Similarly, by way of another example, the base station 105-g may transmit a second resource allocation to the UE 115-v, where the second resource allocation is to be used by the UE 115-v for transmitting the broadcast transmissions to the UE 115-w and/or additional UEs 115 within the UE cluster via a sidelink communication link. Moreover, in some cases, the base station 105-g may additionally transmit the second resource allocation to the UE 115-w, where the second resource allocation is to be used by the UE 115-w for receiving the broadcast transmissions from the UE 115-v.

At 2870, the base station 105-g may transmit the broadcast transmissions to the first subset of UEs 115 of each respective UE cluster. For example, in cases where the UE 115-v is categorized into the first subset of UEs 115 of the UE cluster, the base station 105-g may transmit the broadcast transmissions to the UE 115-v. In some aspects, the base station 105-g may transmit the broadcast transmissions at 2860 based on (e.g., in accordance with) the indications of direct-receiving UEs 115 and/or sidelink-receiving UEs 115 transmitted at 2860. Additionally or alternatively, the base station 105-g may transmit the broadcast transmissions to the first subset of UEs 115 or each UE cluster based on determining the channel qualities at 2825, organizing the UEs 115 into UE clusters at 2835, determining the distances between UEs 115 at 2845, receiving the categorization information at 2850, categorizing the UEs 115 at 2855, transmitting the resource allocations at 2865, or any combination thereof. For example, the base station 105-g may transmit the broadcast transmissions at 2870, and the UE 115-v may receive the broadcast transmissions at 2870, using the resource allocations indicated to the UE 115-v at 2865.

At 2875, the first subset of UEs 115 (e.g., UE 115-v) may determine one or more target parameters for transmitting the broadcast transmissions to the second subset of UEs 115 (e.g., UE 115-w) within the respective UE clusters. Parameters for transmitting the broadcast transmissions to the second subset of UEs 115 may include, but are not limited to, a target data rate, a target MCS, or both. In some aspects, the UE 115-v may determine the one or more parameters based on the determined channel qualities between the UE 115-v and the second subset of UEs 115 (e.g., UE 115-w) determined at 2815.

For example, the UE 115-v may determine a target data rate for transmitting the sidelink transmissions to the second subset of UEs 115 (e.g., UE 115-w) within the UE cluster. The target data rate may include a data rate which satisfies a threshold data rate. By way of another example, the UE 115-v may determine a target MCS for transmitting the sidelink transmissions to the second subset of UEs 115 (e.g., UE 115-w). In this example, the target MCS may include an MCS which allows for sidelink communications with a threshold quantity and/or threshold percentage of UEs 115 within the second subset of UEs 115 of the UE cluster. In this regard, the UE 115-v may select the target MCS as a percentile of the MCS pool (e.g., a 50th or 100th percentile) of the second subset of UEs 115, thus allowing for sidelink communications with the determined percentile of the second subset of UEs 115 within the UE cluster. However, as noted previously herein, there may be a tradeoff between coverage and data rate, where a lower target MCS may improve coverage but may reduce the data rate, while a higher target MCS may reduce coverage but may improve the data rate.

At 2880, the first subset of UEs 115 (e.g., UE 115-v) may determine a set of resources for transmitting the broadcast transmissions to the second subset of UEs 115 (e.g., UE 115-w) within the UE cluster. The set of resources (e.g., set of sidelink resources) may include a set of time resources, a set of frequency resources, a set of spatial resources, or any combination thereof. In some aspects, the first subset of UEs 115 (e.g., UE 115-v) may determine the set of resources for transmitting the broadcast transmissions to the second subset of UEs 115 (e.g., UE 115-w) based on determining the channel quality between respective UEs 115 at 2815, receiving the resource allocations at 2865, receiving the broadcast transmissions at 2870, determining the target parameters at 2875, or any combination thereof.

For example, the UE 115-v may receive a resource allocation from the base station 105-g at 2855, where the resource allocation is to be used by the UE 115-v for transmitting the broadcast transmissions to the second subset of UEs 115 (e.g., UE 115-w) within the UE cluster. In this example, the UE 115-v may determine at least a subset of the resource allocation which may include (e.g., exhibit, match, exceed) the target data rate determined at 2865. In this regard, the UE 115-v may determine at least a subset of the resource allocation which includes a data rate which satisfies (e.g., is greater than or equal to) the determined target data rate. By way of another example, the UE 115-v may determine a channel quality between the UE 115-v and the UE 115-w at 2820. The channel quality may include a maximum MCS for communications between the UE 115-v and the UE 115-w. In this example, the UE 115-v may determine a set of sidelink resources for transmitting the broadcast transmissions to the UE 115-w based on the determined channel quality (e.g., determined maximum MCS).

At 2885, the first subset of UEs 115 (e.g., UE 115-v) may transmit sidelink transmissions including the broadcasts received from the base station 105-g to the second subset of UEs 115 (e.g., UE 115-w) within the UE cluster via sidelink communication links (e.g., sidelink connections 210, 310, and/or 410) between the respective UEs 115. In some aspects, the first subset of UEs 115 (e.g., UE 115 p) may transmit the sidelink transmissions including the broadcasts received from the base station 105-g via a sidelink communication link using unicast techniques, groupcast techniques, broadcast techniques, or any combination thereof. In some aspects, the first subset of UEs 115 may transmit the sidelink transmissions including the broadcasts, and the second subset of UEs 115 may receive the sidelink transmissions including the broadcasts, based on determining the channel quality between respective UEs 115 at 2815, receiving the indications at 2860, receiving the resource allocations at 2865, receiving the broadcast transmissions at 2870, determining the target parameters at 2875, determining the resources for the sidelink communications at 2880, or any combination thereof.

For example, the UE 115-v may determine a target data rate and/or target MCS at 2875, and may transmit the broadcast transmissions at 2885 based on (e.g., using, according to) the determined target data rate and/or target MCS. Similarly, the UE 115-v may determine at least a subset of resources (e.g., sidelink resources) of a resource allocation at 2880, and may transmit the broadcast transmissions at 2885 based on at least the subset of the resource allocation.

Techniques described herein may enable more efficient and reliable distribution of broadcast transmissions. In particular, by organizing UEs 115 subscribed to receive broadcast transmissions into UE clusters, and subsequently categorizing the UEs 115 within each UE cluster, a base station 105 of a wireless communications system (e.g., a wireless communications system 100, 200, 300, 400, or any combination thereof) may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115 within a UE cluster, further improving broadcast distribution within the wireless communications system (e.g., a wireless communications system 100, 200, 300, 400, or any combination thereof).

Figure 29:
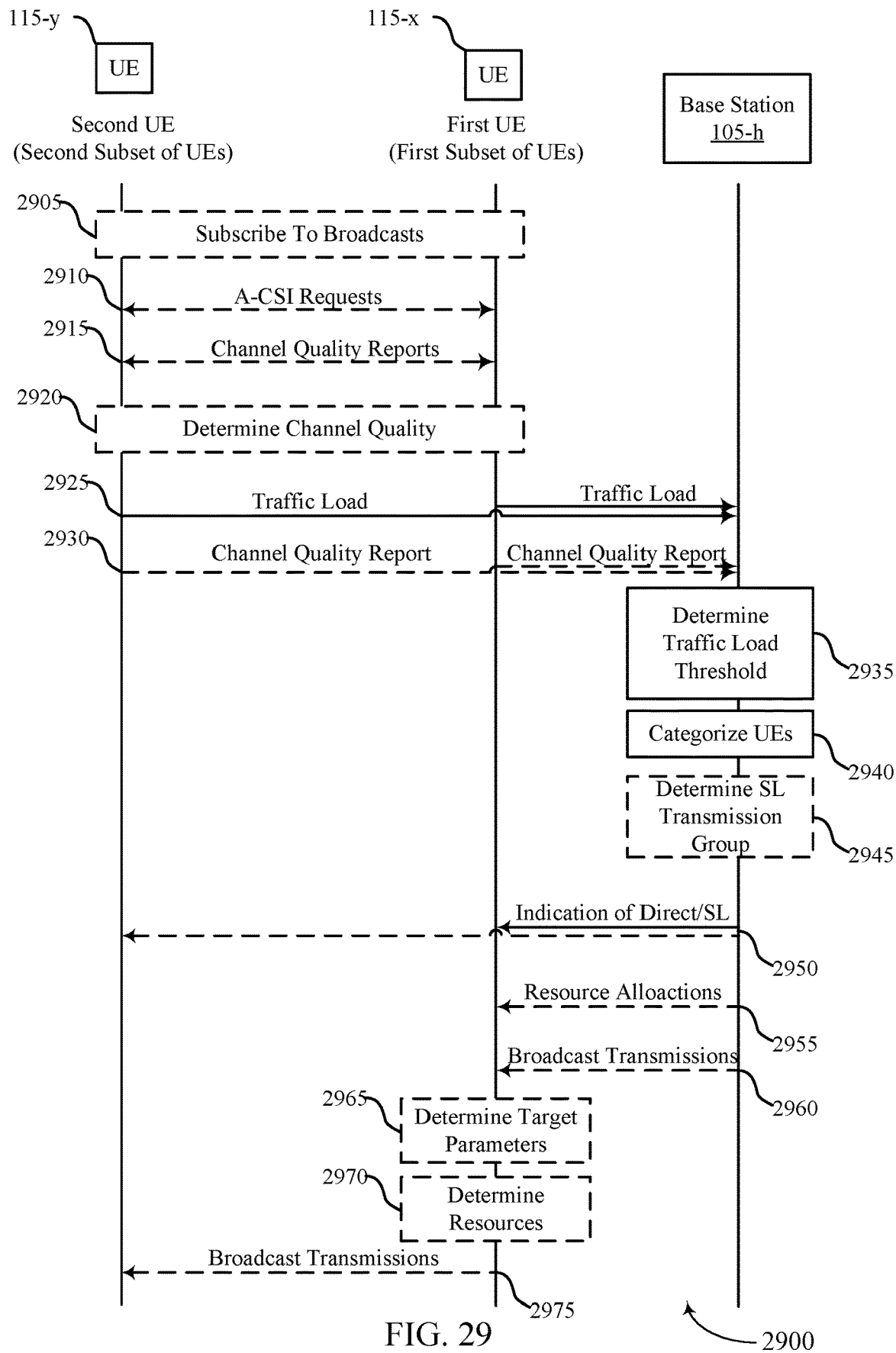
FIG. 29 illustrates an example of a process flow that supports techniques for traffic load-based UE subset selection for rate control in broadcasting with sidelink in accordance with one or more aspects of the present disclosure.

FIG. 29 illustrates an example of a process flow 2900 that supports techniques for traffic load-based UE subset selection for rate control in broadcasting with sidelink in accordance with one or more aspects of the present disclosure. In some examples, process flow 2900 may implement, or be implemented by, aspects of wireless communication system 100, wireless communications system 200, wireless communications system 300, wireless communications system 400, or any combination thereof. The process flow 2900 may illustrate an example of a base station 105, such as base station 105-h, categorizing UEs 115 into a first subset of UEs 115 (e.g., including UE 115-x) for direct link communications and a second subset of UEs 115 (e.g., including UE 115-y) for sidelink communications, then transmitting broadcast transmissions to the UEs 115. Alternative examples of the following may be implemented, where some processes are performed in a different order than described or are not performed. In some cases, processes may include additional features not mentioned below, or further processes may be added.

At 2905, one or more UEs 115 may subscribe to receive broadcast transmissions from the base station 105-h. In some aspects, the UE 115-x and/or UE 115-y may subscribe to receive broadcast transmissions from the base station 105-h by transmitting uplink transmissions including an indication of the subscriptions to the base station 105-h. In some cases, base station 105-h may identify that UE 115-x and UE 115-y are subscribed to receive broadcast transmissions including packets of data.

At 2910, the UE 115-x, the UE 115-y, or both, may transmit A-CSI requests to the other UE 115. In some aspects, the A-CSI requests may indicate requests for the receiving UE 115 of each A-CSI request to transmit a channel quality report to the transmitting UE 115 of each A-CSI request. In this regard, the UEs 115 may exchange A-CSI requests in order to measure channel qualities associated with sidelink communication links (e.g., sidelink connections 210, 310, and 410) between the respective UEs 115. For example, the UE 115-x may transmit an A-CSI request to the UE 115-y, where the A-CSI request includes an indication for the UE 115-y to transmit a channel quality report to the UE 115-x. In some aspects, each of the UEs 115 may transmit and/or receive A-CSI reports from any quantity of other UEs 115 subscribed to receive broadcasts from the base station 105-h.

At 2915, the UE 115-x, the UE 115-y, or both, may transmit a channel quality report to the respective UEs 115. In some aspects, the UE 115-x and/or the UE 115-y may transmit the channel quality reports based on (e.g., in response to) receiving the A-CSI requests at 2910. For example, upon receiving an A-CSI request from the UE 115-x, the UE 115-y may measure reference signals received from the UE 115-x via a sidelink connection (e.g., sidelink connection 210, 310, and/or 410), and may generate a channel quality report associated with the sidelink connection based on the measurements. Subsequently, the UE 115-y may transmit a channel quality report to the UE 115-x, where the channel quality report includes an indication of channel quality associated with communications between the UE 115-x and the UE 115-y. In some aspects, the channel quality report may include, but is not limited to, an indication of a maximum MCS associated with sidelink communications between the respective UEs 115.

In some aspects, the channel quality reports exchanged by the UEs 115 at 2915 may each include a source identifier (e.g., source ID) associated with (e.g., indicating) the UE 115 which transmitted the respective channel quality report. Each UE 115 may be associated with a unique source identifier. For example, the UE 115-y may transmit a channel quality report to the UE 115-x, where the channel quality report includes a source identifier associated with the UE 115-y. In some aspects, the source identifiers may be used to calculate which resources may be used to transmit feedback information via PSFCH. Moreover, when transmitting feedback (e.g., ACK, NACK, channel quality reports) to UEs 115, the feedback may include an indication of a source identifier associated with the UE 115 transmitting the feedback. In this regard, UEs 115 receiving feedback or other signaling may be able to use source identifiers indicated in the feedback or other signaling in order to identify which UE 115 the feedback is being received from.

In some aspects, UEs 115 may be configured to determine destination identifiers associated with each UE 115 based on the received source identifiers. For example, the UE 115-x may be configured to maintain a correspondence table, data object, database, or other configuration mapping source identifiers with destination identifiers. By maintaining associations between destination identifiers and source identifiers, UEs 115 may be able to efficiently determine where received signals are transmitted from, and where feedback signaling needs to be transmitted. For example, the UE 115-x may transmit an A-CSI request to the UE 115-y at 2910, where the A-CSI request includes a source identifier associated with the UE 115-x. The UE 115-y may subsequently determine a destination identifier associated with the UE 115-x based on (e.g., using) the received source identifier and a configuration (e.g., correspondence table) mapping source identifiers to destination identifiers. In this example, the UE 115-y may transmit the channel quality report to the UE 115-x at 2915, where the channel quality report includes an indication of the destination identifier associated with the UE 115-x, a source identifier associated with the UE 115-y, or both.

At 2920, the UE 115-x, the UE 115-y, or both, may determine a channel quality between the respective UEs 115. The UE 115-x and/or the UE 115-y may determine the channel quality between the UE 115-x and the UE 115-y based on exchanging the A-CSI requests at 2910, exchanging the channel quality reports at 2915, or both. In this regard, each UE 115 may determine a channel quality associated with communications between the respective UE 115 and any quantity of additional UEs 115 subscribed to receive broadcasts from the base station 105-h. In some aspects, the channel quality may include, but is not limited to, a maximum MCS associated with sidelink communications between the respective UEs 115.

In some cases, the UE 115-x and/or the UE 115-y may determine a channel quality associated with communications between the UE 115-x and UE 115-y based on additional or alternative signaling exchanged between the UEs 115, including SCI signaling, DMRS signaling, PSFCH signaling, or any combination thereof. In particular, each of the UE 115-x and/or the UE 115-y may perform measurements (e.g., RSRP measurements, RSRQ measurements, SNR measurements, SINR measurements) on SCI signaling, DMRS signaling, and/or PSFCH signaling received from the other UE 115, and may determine a channel quality based on the measurements. For example, the UE 115-x may receive PSFCH transmissions from the UE 115-y, and may determine a channel quality for communications between the UEs 115 based on the PSFCH transmissions (e.g., based on RSRP measurements performed on the PSFCH transmissions). In some cases, PSFCH transmissions may enable UEs 115 to determine channel qualities with the shortest delay. Similarly, by way of another example, the UE 115-x may receive an SCI message, a DMRS signal, or both, from the UE 115-y, and may determine a channel quality for communications between the UEs 115 based on the SCI message and/or DMRS signal (e.g., based on measurements performed on the SCI message and/or DMRS signal).

At 2925, the UE 115-x, the UE 115-y, or both, may transmit a report including an indication of an average traffic load associated for various communications with communications the base station 105-h, communications with other base stations 105, and communications with other UEs 115. Parameters associated with traffic loads may include an average throughput, an average buffer size, or both for some period of time. The period of time may be defined based on a time since a last report, a fixed time, or the like. For example, the UE 115-x may transmit a report including an indication of an average traffic associated with communications between the base station 105-h and the UE 115-x, and the UE 115-y may transmit a report including an indication of parameters associated with traffic loads for communications between the base station 105-h and the UE 115-y. In some aspects, the UE 115-x and/or the UE 115-y may transmit the report at 2920 based on subscribing to receive broadcast transmissions from the base station 105-h at 2905, exchanging the A-CSI requests and/or channel quality reports at 2915, or any combination thereof. In some aspects, the reports indicating the traffic loads associated with the respective UEs 115 may include CSI-RS reports. The indication of the traffic load may be transmitted via an uplink control information message, a MAC-CE message, a buffer status report, or a combination of these.

At 2930, the UE 115-x, the UE 115-y, or both, may transmit a report (e.g., channel quality report) indicating a channel quality associated with communications between the respective UE 115 and one or more other UEs 115. In some aspects, the reports indicating channel qualities between UEs 115 received at 2925 may include indications of source identifiers, destination identifiers, or both, associated with the respective UEs 115. For example, the UE 115-x may transmit a report indicating a channel quality associated with communications between the UE 115-x and the UE 115-y. In this example, the report may include an indication of a source identifier associated with the UE 115-x, a destination identifier associated with the UE 115-x, a source identifier associated with the UE 115-y, a destination identifier associated with the UE 115-y, or any combination thereof.

At 2935, the base station 105-h may determine a threshold traffic load (e.g., TrafficLoad$_{Thresh}$). In some aspects, the base station 105-h may determine threshold traffic load-based on identifying UEs 115 subscribed to receive broadcast transmissions from the base station 105-h, receiving the reports indicating parameters associated with the traffic loads at 2925, receiving the reports indicating channel qualities between UEs 115 at 2930, or any combination thereof. In some aspects, the base station 105-h may determine the threshold traffic load-based on a time delay budget reported by the UE for transmitting the broadcast transmissions, a data rate requirement for transmitting the broadcast transmissions, a channel quality associated with the broadcast transmissions, or any combination of these.

At 2940, the base station 105-h may categorize the UEs 115 (e.g., UE 115-x, UE 115-y) into a first subset of UEs 115 that is to receive the broadcast transmissions via direct link communications from the base station 105-h, and into a second subset of UEs 115-d that is to receive the broadcast transmissions via sidelink communications from the first subset of UEs 115. In some aspects, the base station 105-h may categorize the UEs 115 into the first and second subsets of UEs 115 based on identifying UEs 115 subscribed to receive broadcast transmissions from the base station 105-h at 2905, receiving the reports indicating parameters associated with traffic loads at 2925, receiving the reports indicating channel qualities between UEs 115 at 2930, determining the threshold traffic load at 2935, or any combination thereof.

In some aspects, the base station 105-*h* may categorize the UEs 115 into the first and second subsets of UEs 115 based on determined traffic loads associated with each of the respective UEs 115. In this regard, the base station 105-*h* may categorize the UEs 115 at 2940 based on receiving the reports indicating the average traffic loads associated with each of the respective UEs 115 at 2925, determining the traffic load at 2935, or any combination thereof. In particular, the base station 105-*h* may categorize the UEs 115 into the first and second subsets of UEs 115 based on whether not the average traffic load associated with the respective UE 115 satisfies the threshold traffic load.

For example, the base station 105-*h* may categorize the UE 115-*x* into a first subset of UEs 115 which are to receive broadcast transmissions from the base station 105-*h* via direct link communications (e.g., via direct links 205, 305, and/or 405) based on determining that the traffic load associated with the UE 115-*x* satisfies the threshold traffic load. For instance, the base station 105-*h* may categorize the UE 115-*x* into the first subset of UEs 115 based on determining that the traffic load associated with the UE 115-*x* is less than or equal to the threshold traffic load (e.g., threshold traffic load satisfied based on $\text{TrafficLoad}_{UE\ 115\text{-}p} \leq \text{TrafficLoad}_{Thresh}$).

Conversely, the base station 105-*h* may categorize the UE 115-*y* into a second subset of UEs 115 which are to receive broadcast transmissions via sidelink communications (e.g., via sidelink connections 210, 310, and/or 410) from the first subset of UEs 115 based on determining that the traffic load associated with the UE 115-*y* fails to satisfy the threshold traffic load. For instance, the base station 105-*h* may categorize the UE 115-*y* into the second subset of UEs 115 based on determining that the traffic load associated with the UE 115-*y* is greater than the threshold traffic load (e.g., threshold traffic load not satisfied based on $\text{TrafficLoad}_{UE\ 115\text{-}q} > \text{TrafficLoad}_{Thresh}$).

At 2945, the base station 105-*h* may determine one or more sidelink transmission groups for distribution of the broadcast transmissions. In some aspects, each sidelink transmission group may include one or more UEs 115 from the first subset of UEs 115 (e.g., one or more direct-receiving UEs 115) and one or more UEs 115 from the second subset of UEs 115 (e.g., one or more sidelink-receiving UEs 115). In this regard, each sidelink transmission group may indicate which UEs 115 of the second subset of UEs 115 (e.g., which sidelink-receiving UEs 115) are to receive the broadcast transmissions from which UEs 115 of the first subset of UEs 115 (e.g., which direct-receiving UEs 115).

In some aspects, the base station 105-*h* may determine the sidelink transmission groups based on identifying the UEs 115 subscribed to receive broadcasts from the base station 105-*h* at 2905, receiving the reports indicating parameters associated with traffic loads for the UEs 115 at 2925, receiving the reports indicating channel qualities between UEs 115 at 2930, determining the threshold traffic load at 2935, categorizing the UEs 115 into the respective subsets at 2940, or any combination thereof.

In some aspects, the base station 105-*h* may determine a group identifier (e.g., group ID) associated with each sidelink transmission group. The group identifier may be common across each UE 115 included within the respective sidelink transmission group. Additionally, the base station 105-*h* may determine a destination identifier, a source identifier, or both, associated with each UE 115 within each respective sidelink transmission group. For example, as noted previously herein, the reports indicating channel qualities between UEs 115 received at 2930 may indicate destination identifiers and/or source identifiers associated with the UEs 115. In this example, the base station 105-*h* may determine destination identifiers and/or source identifiers associated with the UEs 115 based on the indications of the source identifiers and/or destination identifiers received in the reports, a configuration (e.g., correspondence table) mapping source identifiers to destination identifiers, or any combination thereof.

In some cases, the base station 105-*h* may determine a sidelink transmission group for each UE 115 of the first subset of UEs 115. For example, the base station 105-*h* may categorize the UE 115-*x* into the first subset of UEs 115 (e.g., direct-receiving UEs 115) and may categorize the UE 115-*y* into the second subset of UEs 115 (e.g., sidelink-receiving UEs 115) at 2940. In this example, the base station 105-*h* may determine a sidelink transmission group associated with the UE 115-*x* based on the categorization, the channel quality between the UE 115-*x* and the UE 115-*y*, or any combination thereof. In this example, the sidelink transmission group may include the UE 115-*x* and the UE 115-*y*. In this regard, the sidelink transmission group may indicate that the UE 115-*y* is to receive the broadcast transmissions via sidelink communications from the UE 115-*x*. In this example, by determining the sidelink transmission group, the base station 105-*h* may determine a group identifier associated with the sidelink transmission group, destination identifiers associated with the UE 115-*x* and/or UE 115-*y*, source identifiers associated with the UE 115-*x* and/or UE 115-*y*, or any combination thereof.

At 2950, the base station 105-*h* may transmit, to the UE 115-*x* and/or the UE 115-*y*, an indication (e.g., control information) that the broadcast transmissions are to be received via either direct link communications or sidelink communications. In this regard, the base station 105-*h* may indicate whether each UE 115 has been categorized into the first subset of UEs 115 (e.g., direct-receiving UEs 115) or the second subset of UEs 115 (e.g., sidelink-receiving UEs 115). In some aspects, the indication transmitted at 2950 may include control information associated with (e.g., corresponding to) the broadcast transmissions, where the control information is transmitted via MAC-CE signaling, DCI, a wakeup signal, or any combination thereof. In some aspects, the base station 105-*h* may transmit the indication at 2950 based on categorizing the UEs 115 at 2940.

For example, the base station 105-*h* may transmit an indication to the UE 115-*x* indicating that the UE 115-*x* is to receive broadcast transmissions via direct link communications (e.g., via direct links 205, 305, 405). Conversely, the base station 105-*h* may transmit an indication to the UE 115-*y* indicating that the UE 115-*y* is to receive broadcast transmissions via sidelink communications (e.g., via sidelink connections 210, 310, 410) from the first subset of UEs 115 (e.g., from the UE 115-*x*).

Additionally or alternatively, the base station 105-*h* may transmit, to the UE 115-*x* and/or UE 115-*y*, information associated with the determined sidelink transmission groups. In this regard, the base station 105-*h* may indicate which sidelink transmission group each of the UEs 115 belongs to. The information associated with the determined sidelink transmission groups may include, but is not limited to, a group identifier associated with the respective sidelink transmission groups, destination identifiers and/or source identifiers associated with each UE 115 within the respective sidelink transmission group, or any combination thereof. In some aspects, the base station 105-*h* may transmit the indication of information associated with the sidelink transmission groups based on determining the sidelink transmission groups at 2945.

For example, in cases where the base station 105-*h* determines the UE 115-*x* and the UE 115-*y* are included within the same sidelink transmission group, the base station 105-*h* may transmit, to the UE 115-*x* and/or UE 115-*y*, an indication of the group identifier associated with the sidelink transmission group, a source identifier associated with the UE 115-*x* and/or the UE 115-*y*, a destination identifier associated with the UE 115-*x* and/or UE 115-*y*, or any combination thereof. Moreover, in cases where the sidelink transmission group includes additional UEs 115 within the second subset of UEs 115 (e.g., additional sidelink-receiving UEs 115), the base station 105-*h* may indicate, to the UE 115-*x* and/or the UEs 115 of the second subset of UEs 115, source identifiers and/or destination identifiers associated with each of the UEs 115 of the sidelink transmission group.

At 2955, the base station 105-*h* may transmit, to the UE 115-*x* and/or the UE 115-*y*, resource allocations to be used by the UEs 115 to transmit and/or receive the broadcast transmissions. The resource allocations may include sets of time resources, sets of frequency resources, sets of spatial resources, or any combination thereof. In some aspects, the base station 105-*h* may transmit the resource allocations based on determining the threshold traffic load at 2935, categorizing the UEs 115 at 2940, determining the sidelink transmission groups at 2945, transmitting the indications at 2950, or any combination thereof.

For example, the base station 105-*h* may transmit a first resource allocation to the UE 115-*x*, where the first resource allocation is to be used by the UE 115-*x* to receive the broadcast transmissions from the base station 105-*h*. Similarly, by way of another example, the base station 105-*h* may transmit a second resource allocation to the UE 115-*x*, where the second resource allocation is to be used by the UE 115-*x* for transmitting the broadcast transmissions to the UE 115-*y* via a sidelink communication link. Moreover, in some cases, the base station 105-*h* may additionally transmit the second resource allocation to the UE 115-*y*, where the second resource allocation is to be used by the UE 115-*y* for receiving the broadcast transmissions from the UE 115-*x*.

At 2960, the base station 105-*h* may transmit the broadcast transmissions to the first subset of UEs 115. For example, in cases where the UE 115-*x* is categorized into the first subset of UEs 115, the base station 105-*h* may transmit the broadcast transmissions to the UE 115-*x*. In some aspects, the base station 105-*h* may transmit the broadcast transmissions at 2960 based on (e.g., in accordance with) the indications of direct-receiving UEs 115 and/or sidelink-receiving UEs 115 transmitted at 2950. Additionally or alternatively, the base station 105-*h* may transmit the broadcast transmissions to the first subset of UEs 115 based on determining the traffic loads and/or threshold traffic loads at 2935, categorizing the UEs 115 at 2940, determining the sidelink transmission groups at 2945, transmitting the resource allocations at 2955, or any combination thereof. For example, the base station 105-*h* may transmit the broadcast transmissions at 2960, and the UE 115-*x* may receive the broadcast transmissions at 2960, using the resource allocations indicated to the UE 115-*x* at 2955.

At 2965, the first subset of UEs 115 (e.g., UE 115-*x*) may determine one or more target parameters for transmitting the broadcast transmissions to the second subset of UEs 115 (e.g., UE 115-*y*). Parameters for transmitting the broadcast transmissions to the second subset of UEs 115 may include, but are not limited to, a target data rate, a target MCS, or both. In some aspects, the UE 115-*x* may determine the one or more parameters based on the determined channel qualities between the UE 115-*x* and the second subset of UEs 115 (e.g., UE 115-*y*) determined at 2920.

For example, the UE 115-*x* may determine a target data rate for transmitting the sidelink transmissions to the second subset of UEs 115 (e.g., UE 115-*y*). The target data rate may include a data rate which satisfies a threshold data rate. By way of another example, the UE 115-*x* may determine a target MCS for transmitting the sidelink transmissions to the second subset of UEs 115 (e.g., UE 115-*y*). In this example, the target MCS may include an MCS which allows for sidelink communications with a threshold quantity and/or threshold percentage of UEs 115 within the second subset of UEs 115. In this regard, the UE 115-*x* may select the target MCS as a percentile of the MCS pool (e.g., a $50^{th}$ or $100^{th}$ percentile) of the second subset of UEs 115, thus allowing for sidelink communications with the determined percentile of the second subset of UEs 115. However, as noted previously herein, there may be a tradeoff between coverage and data rate, where a lower target MCS may improve coverage (e.g., due to increased redundancy in the packet transmission) but may reduce the data rate, while a higher target MCS may reduce coverage but may improve the data rate.

At 2970, the first subset of UEs 115 (e.g., UE 115-*x*) may determine a set of resources for transmitting the broadcast transmissions to the second subset of UEs 115 (e.g., UE 115-*y*). The set of resources (e.g., set of sidelink resources) may include a set of time resources, a set of frequency resources, a set of spatial resources, or any combination thereof. In some aspects, the first subset of UEs 115 (e.g., UE 115-*x*) may determine the set of resources for transmitting the broadcast transmissions to the second subset of UEs 115 (e.g., UE 115-*y*) based on determining the channel quality between respective UEs 115 at 2920, receiving the indications at 2950, receiving the resource allocations at 2955, receiving the broadcast transmissions at 2960, determining the target parameters at 2965, or any combination thereof.

For example, the UE 115-*x* may receive a resource allocation from the base station 105-*h* at 2955, where the resource allocation is to be used by the UE 115-*x* for transmitting the broadcast transmissions to the second subset of UEs 115 (e.g., UE 115-*y*). In this example, the UE 115-*x* may determine at least a subset of the resource allocation which may include (e.g., exhibit, match, exceed) the target data rate determined at 2965. In this regard, the UE 115-*x* may determine at least a subset of the resource allocation which includes a data rate which satisfies (e.g., is greater than or equal to) the determined target data rate. By way of another example, the UE 115-*x* may determine a channel quality between the UE 115-*x* and the UE 115-*y* at 2920. The channel quality may include a maximum MCS for communications between the UE 115-*x* and the UE 115-*y*. In this example, the UE 115-*x* may determine a set of sidelink resources for transmitting the broadcast transmissions to the UE 115-*y* based on the determined channel quality (e.g., determined maximum MCS).

At 2975, the first subset of UEs 115 (e.g., UE 115-*x*) may transmit sidelink transmissions including the broadcasts (e.g., broadcast information) received from the base station 105-*h* to the second subset of UEs 115 (e.g., UE 115-*y*) via sidelink communication links (e.g., sidelink connections 210, 310, and/or 410) between the respective UEs 115. In some aspects, the first subset of UEs 115 (e.g., UE 115 *p*) may transmit the sidelink transmissions including the broadcasts received from the base station 105-*h* via a sidelink communication link using unicast techniques, groupcast techniques, broadcast techniques, or any combination thereof. In some aspects, the first subset of UEs 115 may transmit the sidelink transmissions including the broadcasts, and the second subset of UEs 115 may receive the sidelink transmissions including the broadcasts, based on determining the channel quality between respective UEs 115 at 2920, receiving the indications at 2950, receiving the resource allocations at 2955, receiving the broadcast transmissions at 2960, determining the target parameters at 2965, determining the resources for the sidelink communications at 2970, or any combination thereof.

For example, the UE 115-*x* may determine a target data rate and/or target MCS at 2965, and may transmit the broadcast transmissions at 2975 based on (e.g., using, according to) the determined target data rate and/or target MCS. Similarly, the UE 115-*x* may determine at least a subset of resources (e.g., sidelink resources) of a resource allocation at 2970, and may transmit the broadcast transmissions at 2975 based on at least the subset of the resource allocation.

Techniques described herein may enable more efficient and reliable distribution of broadcast transmissions. In particular, by categorizing UEs 115 subscribed to receive broadcast transmissions according to traffic loads associated with the respective UEs 115, a base station 105 may be able to more efficiently balance data rates and coverage, thereby improving broadcast distribution. Moreover, by evaluating channel qualities associated with sidelink communication links between UEs 115, techniques described herein may enable UEs 115 to more effectively determine data rates and MCSs for transmitting broadcast transmissions to other UEs 115, further improving broadcast distribution.

It should be noted that the methods described herein describe possible implementations, and that the operations and the steps may be rearranged or otherwise modified and that other implementations are possible. Further, aspects from two or more of the methods may be combined.

Example 1: A method for wireless communications at a base station, comprising: identifying a plurality of user equipments (UEs) subscribed to receive broadcast transmissions from the base station; determining, based at least in part on a selection criteria, that a first subset of UEs of the plurality of UEs is to receive the broadcast transmissions via direct link communications from the base station and that a second subset of UEs of the plurality of UEs is to receive the broadcast transmissions via sidelink communications from the first subset of UEs; transmitting, to at least one of the first subset of UEs or the second subset of UEs, an indication that the broadcast transmissions are to be received via either the direct link communications or the sidelink communications; and transmitting the broadcast transmissions to the first subset of UEs.

Example 2: The method of example 1, further comprising: receiving, from each UE of the plurality of UEs, a report comprising a maximum modulation and coding scheme for communicating between the base station and respective UEs; and selecting, for the first subset of UEs, a minimum modulation and coding scheme from among the maximum modulation and coding schemes of each of the first subset of UEs.

Example 3: The method of examples 1 or 2, further comprising: determining the first subset of UEs based at least in part on the maximum modulation and coding scheme associated with each of the first subset of UEs, wherein the selection criteria comprises a threshold modulation and coding scheme.

Example 4: The method of any of examples 1 to 3, wherein determining the first subset of UEs further comprises: determining that a distance between each UE in the first subset of UEs and the base station satisfies a threshold distance, wherein the selection criteria comprises the threshold distance.

Example 5: The method of any of examples 1 to 4, wherein determining the first subset of UEs further comprises: determining a plurality of clusters of UEs of the plurality of UEs; and determining that a first UE of each cluster of UEs is included within the first subset of UEs, while a remainder of UEs within each cluster of UEs are included within the second sub set of UEs.

Example 6: The method of any of examples 1 to 5, wherein the plurality of clusters of UEs are determined based at least in part on a location of each UE of the plurality of UEs, and wherein the first UE of each cluster of UEs is a central UE to each cluster of UEs.

Example 7: The method of any of examples 1 to 6, wherein the plurality of clusters of UEs are determined based at least in part on a signal quality measured at each UE of the plurality of UEs, and wherein the first UE of each cluster of UEs has a signal quality better than an average signal quality determined based at least in part on the signal quality measured at each UE of the plurality of UEs.

Example 8: The method of any of examples 1 to 7, further comprising: receiving, from each UE of the plurality of UEs, a message comprising a power capability associated with the UE, wherein the power capability comprises a data rate, a processing power, a full duplex power, a half duplex power, a time division duplex power, a frequency division duplex power, or a combination thereof.

Example 9: The method of any of examples 1 to 8, wherein determining the first subset of UEs further comprises: determining that the power capability for each UE in the first subset of UEs satisfies a threshold power capability, wherein the selection criteria comprises the threshold power capability.

Example 10: The method of any of examples 1 to 9, further comprising: determining a traffic load for each UE of the plurality of UEs.

Example 11: The method of any of examples 1 to 10, wherein determining the first subset of UEs further comprises: determining that the traffic load for each UE of the first subset of UEs satisfies a threshold traffic load, wherein the selection criteria comprises the threshold traffic load.

Example 12: The method of any of example 1, wherein the selection criteria comprises a threshold modulation and coding scheme, a threshold distance, a threshold relative location, a threshold power capability, a threshold traffic load, or a combination thereof.

Example 13: The method of any of examples 1 to 12, wherein transmitting the indication further comprises: transmitting, to at least one of the first subset of UEs or the second subset of UEs, control information via a media access control-control element, downlink control information, a wakeup signal, or a combination thereof, the control information corresponding to the broadcast transmissions.

Example 14: A method for wireless communications at a user equipment (UE), comprising: subscribing, to a base station, to receive broadcast transmissions from the base station; receiving, from the base station, an indication that the broadcast transmissions are to be received via either direct link communications from the base station or via sidelink communications from a first subset of UEs receiving the broadcast transmissions via the direct link communications from the base station; and receiving the broadcast transmissions in accordance with the indication.

Example 15: The method example 14, wherein the indication indicates that the UE is in the first subset of UEs, the method further comprising: receiving, from the base station, the broadcast transmissions via the direct link communications based at least in part on the indication.

Example 16: The method of examples 14 or 15, further comprising: transmitting, to one or more UEs, the broadcast transmissions via the sidelink communications using a unicast transmission technique, a groupcast transmission technique, a broadcast transmission technique, or a combination.

Example 17: The method of any of examples 14 to 16, wherein the indication indicates that the UE is in the second subset of UEs, the method further comprising: receiving, from a UE in the first subset of UEs, the broadcast transmissions via the sidelink communications.

Example 18: The method of any of examples 14 to 17, wherein: transmitting, to the base station, a report comprising a maximum modulation and coding scheme for communicating between the base station and the UE.

Example 19: The method of any of examples 14 to 18, further comprising: receiving the broadcast transmissions based at least in part on the reported modulation and coding scheme.

Example 20: The method of any of examples 14 to 19, further comprising: transmitting, to the base station, a message comprising a power capability associated with the UE, wherein the power capability comprises a data rate, a processing power, a full duplex power, a half duplex power, a time division duplex power, a frequency division duplex power, or a combination thereof.

Example 21: The method of any of examples 14 to 20, wherein receiving the indication further comprises: receiving, from the base station, control information via a media access control-control element, downlink control information, a wakeup signal, or a combination thereof, the control information corresponding to the broadcast transmissions.

Example 22: An apparatus for wireless communications comprising a processor; memory coupled with the processor; and instructions stored in the memory and executable by the processor to cause the apparatus to perform a method of any of examples 1 to 13.

Example 23: An apparatus for wireless communications comprising a processor; and memory coupled to the processor, the processor and memory configured to perform a method of any of examples 14 to 21.

Example 24: An apparatus comprising at least one means for performing a method of any of examples 1 to 13.

Example 25: An apparatus comprising at least one means for performing a method of any of examples 14 to 21.

Example 26: A non-transitory computer-readable medium storing code for wireless communications, the code comprising instructions executable by a processor to perform a method of any of examples 1 to 13.

Example 27: A non-transitory computer-readable medium storing code for wireless communications, the code comprising instructions executable by a processor to perform a method of any of examples 14 to 21.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a network device, comprising:
   identifying a plurality of user equipments (UEs) subscribed to receive broadcast transmissions from the network device;
   determining, based at least in part on a selection criteria associated with the plurality of UEs, that a first subset of UEs of the plurality of UEs is to receive the broadcast transmissions via direct link communications from the network device and that a second subset of UEs of the plurality of UEs is to receive the broadcast transmissions via sidelink communications from the first subset of UEs;
   transmitting, to at least one of the first subset of UEs or the second subset of UEs, an indication that the broadcast transmissions are to be received via either the direct link communications or the sidelink communications or according to an opportunistic reception mode; and
   transmitting the broadcast transmissions to the first subset of UEs.

2. The method of claim 1, wherein transmitting the indication comprises:
   transmitting a control message indicating for the at least one of the first subset of UEs to enter a sleep mode;
   receiving, from the at least one of the first subset of UEs, a request to enter the opportunistic reception mode based at least in part on the opportunistic reception mode being configured at the at least one of the first subset of UEs; and
   transmitting a response message indicating that the at least one of the first subset of UEs is authorized for the opportunistic reception mode, wherein transmitting the broadcast transmissions is based at least in part on the response message.

3. The method of claim 1, wherein transmitting the indication comprises:
   transmitting a control message indicating for the at least one of the first subset of UEs to enter a sleep mode;
   receiving, from the at least one of the first subset of UEs, a request to enter the opportunistic reception mode based at least in part on the opportunistic reception mode being configured at the at least one of the first subset of UEs; and
   transmitting a response message indicating that the at least one of the first subset of UEs is not authorized for the opportunistic reception mode, wherein transmitting the broadcast transmissions is based at least in part on the response message.

4. The method of claim 1, further comprising:
   transmitting, to the at least one of the first subset of UEs, an opportunistic reception mode configuration message indicating a listening frequency and a listening time duration for use by the at least one of the first subset of UEs in the opportunistic reception mode, wherein the broadcast transmissions are transmitted according to the listening frequency and for the listening time duration.

5. The method of claim 4, further comprising:
   transmitting, to the at least one of the first subset of UEs, an opportunistic reception mode configuration update message indicating a new or updated listening frequency and a new or updated listening time duration for use by the at least one of the first subset of UEs in the opportunistic reception mode.

6. The method of claim 1, further comprising:
   determining, for each UE of the plurality of UEs, a maximum modulation and coding scheme for communications between the network device and each UE of the plurality of UEs; and
   categorizing the plurality of UEs into the first subset of UEs and into the second subset of UEs based at least in part on the maximum modulation and coding scheme associated with each UE of the plurality of UEs.

7. The method of claim 6, further comprising:
   receiving, from each UE of the plurality of UEs, a report comprising the maximum modulation and coding scheme associated with each UE of the plurality of UEs for communicating between the network device and each UE of the plurality of UEs; and
   selecting, for the first subset of UEs, a minimum modulation and coding scheme from among one or more maximum modulation and coding schemes associated with the first subset of UEs.

8. The method of claim 7, further comprising:
determining the first subset of UEs based at least in part on the maximum modulation and coding scheme associated with each of the first subset of UEs, wherein the selection criteria comprises a threshold modulation and coding scheme.

9. The method of claim 1, wherein determining the first subset of UEs further comprises:
determining that a distance between each UE in the first subset of UEs and the network device satisfies a threshold distance, wherein the selection criteria comprises the threshold distance.

10. The method of claim 1, wherein determining the first subset of UEs further comprises:
organizing the plurality of UEs into a plurality of UE clusters, each UE cluster comprising one or more UEs of the plurality of UEs; and
categorizing the one or more UEs of each UE cluster into the first subset of UEs and into the second subset of UEs.

11. The method of claim 10, wherein the plurality of UE clusters are determined based at least in part on a location of each UE of the plurality of UEs, and a first UE of each UE cluster is a central UE to each UE cluster of.

12. The method of claim 10, wherein the plurality of UE clusters are determined based at least in part on a signal quality measured at each UE of the plurality of UEs, and a first UE of each UE cluster has a first signal quality better than an average signal quality determined based at least in part on the signal quality measured at each UE of the plurality of UEs.

13. The method of claim 1, further comprising:
receiving, for each UE of the plurality of UEs, an indication of a UE capability associated with the broadcast transmissions; and
categorizing each of the plurality of UEs into the first subset of UEs and into the second subset of UEs based at least in part on the UE capability associated with each UE of the plurality of UEs.

14. The method of claim 13, further comprising:
receiving, from each UE of the plurality of UEs, a message comprising a power capability associated with each UE of the plurality of UEs, wherein the power capability comprises a data rate, a processing power, a full duplex power, a half duplex power, a time division duplex power, a frequency division duplex power, or a combination thereof.

15. The method of claim 14, wherein determining the first subset of UEs further comprises:
determining that the power capability for each UE in the first subset of UEs satisfies a threshold power capability, wherein the selection criteria comprises the threshold power capability.

16. The method of claim 1, further comprising:
receiving, for each UE of the plurality of UEs, an indication of a traffic load corresponding to the wireless communications; and
categorizing each UE of the plurality of UEs into the first subset of UEs and into the second subset of UEs based at least in part on the traffic load associated with each UE of the plurality of UEs.

17. The method of claim 16, wherein determining the first subset of UEs further comprises:
determining that the traffic load for each UE of the first subset of UEs satisfies a threshold traffic load, wherein the selection criteria comprises the threshold traffic load.

18. The method of claim 1, wherein the selection criteria comprises a threshold modulation and coding scheme, a threshold distance, a threshold relative location, a threshold power capability, a threshold traffic load, or a combination thereof.

19. The method of claim 1, wherein transmitting the indication further comprises:
transmitting, to at least one of the first subset of UEs or the second subset of UEs, control information via a media access control-control element, downlink control information, a wakeup signal, or a combination thereof, the control information corresponding to the broadcast transmissions.

20. A method for wireless communications at a user equipment (UE), comprising:
subscribing to receive broadcast transmissions from a network device;
receiving an indication that the broadcast transmissions are to be received via either direct link communications from the network device or via sidelink communications from a first subset of UEs receiving the broadcast transmissions via the direct link communications from the network device based at least in part on a selection criteria associated with the UE, wherein a second subset of UEs comprise the UEs receiving the broadcast transmissions via the sidelink communications; and
receiving the broadcast transmissions in accordance with the indication or an opportunistic reception mode.

21. The method of claim 20, wherein receiving the indication comprises:
receiving a control message indicating for the UE to enter a sleep mode, wherein the first subset of UEs comprises the UE;
transmitting a request to enter the opportunistic reception mode based at least in part on the opportunistic reception mode being configured at the UE; and
receiving a response message indicating that the UE is authorized for the opportunistic reception mode, wherein receiving the broadcast transmissions is based at least in part on the response message.

22. The method of claim 20, wherein receiving the indication comprises:
receiving a control message indicating for the UE to enter a sleep mode, wherein the first subset of UEs comprises the UE;
transmitting a request to enter the opportunistic reception mode based at least in part on the opportunistic reception mode being configured at the UE;
receiving a response message indicating that the UE is not authorized for the opportunistic reception mode; and
entering the sleep mode during one or more slots dedicated to the broadcast transmissions.

23. The method of claim 20, wherein the indication indicates that the UE is in the first subset of UEs, the method further comprising:
receiving the broadcast transmissions via the direct link communications based at least in part on the indication.

24. The method of claim 23, further comprising:
transmitting, to one or more UEs, the broadcast transmissions via the sidelink communications using a unicast transmission technique, a groupcast transmission technique, a broadcast transmission technique, or a combination.

25. The method of claim 20, wherein the indication indicates that the UE is in the second subset of UEs, the method further comprising:
receiving, from a UE in the first subset of UEs, the broadcast transmissions via the sidelink communications.

26. The method of claim 20, further comprising:
transmitting a report comprising a maximum modulation and coding scheme for communicating between the network device and the UE, wherein the broadcast transmissions are received based at least in part on the reported modulation and coding scheme.

27. The method of claim 20, further comprising:
transmitting a message comprising a power capability associated with the UE, wherein the power capability comprises a data rate, a processing power, a full duplex power, a half duplex power, a time division duplex power, a frequency division duplex power, or a combination thereof.

28. The method of claim 20, wherein receiving the indication further comprises:
receiving control information via a media access control-control element, downlink control information, a wakeup signal, or a combination thereof, the control information corresponding to the broadcast transmissions.

29. An apparatus for wireless communications at a network device, comprising:
a processor,
memory coupled with the processor; and
instructions stored in the memory and executable by the processor to cause the apparatus to:
identify a plurality of user equipments (UEs) subscribed to receive broadcast transmissions from the network device;
determine, based at least in part on a selection criteria associated with the plurality of UEs, that a first subset of UEs of the plurality of UEs is to receive the broadcast transmissions via direct link communications from the network device and that a second subset of UEs of the plurality of UEs is to receive the broadcast transmissions via sidelink communications from the first subset of UEs;
transmit, to at least one of the first subset of UEs or the second subset of UEs, an indication that the broadcast transmissions are to be received via either the direct link communications or the sidelink communications or according to an opportunistic reception mode; and
transmit the broadcast transmissions to the first subset of UEs.

30. An apparatus for wireless communications at a user equipment (UE), comprising:
a processor,
memory coupled with the processor; and
instructions stored in the memory and executable by the processor to cause the apparatus to:
subscribe to receive broadcast transmissions from a network device;
receive an indication that the broadcast transmissions are to be received via either direct link communications from the network device or via sidelink communications from a first subset of UEs receiving the broadcast transmissions via the direct link communications from the network device based at least in part on a selection criteria associated with the UE, wherein a second subset of UEs comprise the UEs receiving the broadcast transmissions via the sidelink communications; and
receive the broadcast transmissions in accordance with the indication or an opportunistic reception mode.

\* \* \* \* \*